(12) United States Patent
Hagler

(10) Patent No.: US 7,466,468 B2
(45) Date of Patent: Dec. 16, 2008

(54) TWO-DIMENSIONAL SPATIAL RADIATION MODULATOR

(75) Inventor: Thomas W. Hagler, Grass Valley, CA (US)

(73) Assignee: Aspectrics, Inc., Pleasanton, CA (US)

( * ) Notice: Subject to any disclaimer, the term of this patent is extended or adjusted under 35 U.S.C. 154(b) by 8 days.

(21) Appl. No.: 11/925,115

(22) Filed: Oct. 26, 2007

(65) Prior Publication Data

US 2008/0043314 A1 Feb. 21, 2008

Related U.S. Application Data

(62) Division of application No. 11/265,874, filed on Nov. 2, 2005, which is a division of application No. 10/384,374, filed on Mar. 6, 2003, now Pat. No. 6,995,840.

(60) Provisional application No. 60/361,967, filed on Mar. 6, 2002, provisional application No. 60/413,424, filed on Sep. 25, 2002.

(51) Int. Cl.
*G02B 26/08* (2006.01)

(52) U.S. Cl. .................. 359/226; 359/224; 359/236

(58) Field of Classification Search ............... 359/224, 359/226, 236–238
See application file for complete search history.

(56) References Cited

U.S. PATENT DOCUMENTS

| 4,371,785 A | 2/1983 | Pedersen |
| 5,737,076 A | 4/1998 | Glaus et al. |
| 6,031,609 A | 2/2000 | Funk et al. |
| 6,271,917 B1 * | 8/2001 | Hagler ............... 356/310 |

OTHER PUBLICATIONS

The State Intellectual Property Office of the People's Republic of China, Notification of the First Office Action, Nov. 3, 2007, 9 pages.

* cited by examiner

*Primary Examiner*—Joseph Martinez
(74) *Attorney, Agent, or Firm*—Fenwick & West LLP

(57) ABSTRACT

A two dimensional spatial radiation modulator rotated about a rotation axis to modulate components of an incident radiation beam to encode the beam. The modulator includes sub-regions in a first annular segment being patterned to form a pair of radiation filters having substantially complementary modulation functions. The pair of radiation filters produces a first encoded component with a characteristic determined by the relative intensities of radiation from the beam incident on the pair of filters. The modulator also includes sub-regions in a second annular segment being patterned to form a filter that produces a second encoded component with a characteristic determined by the total intensity of radiation from the beam incident on the filter.

3 Claims, 32 Drawing Sheets

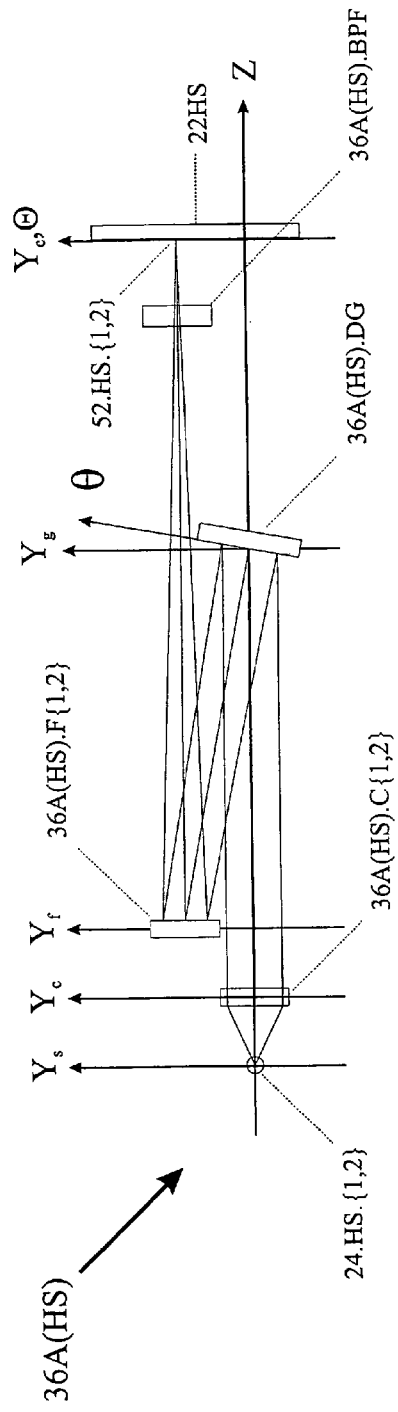
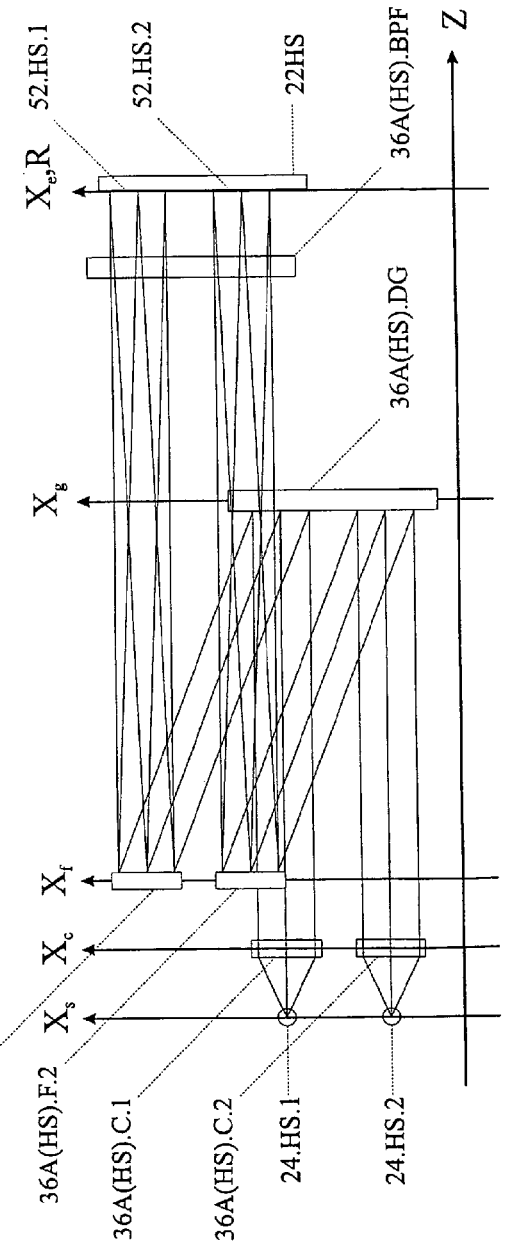
Fig. 12B
Fig. 12A

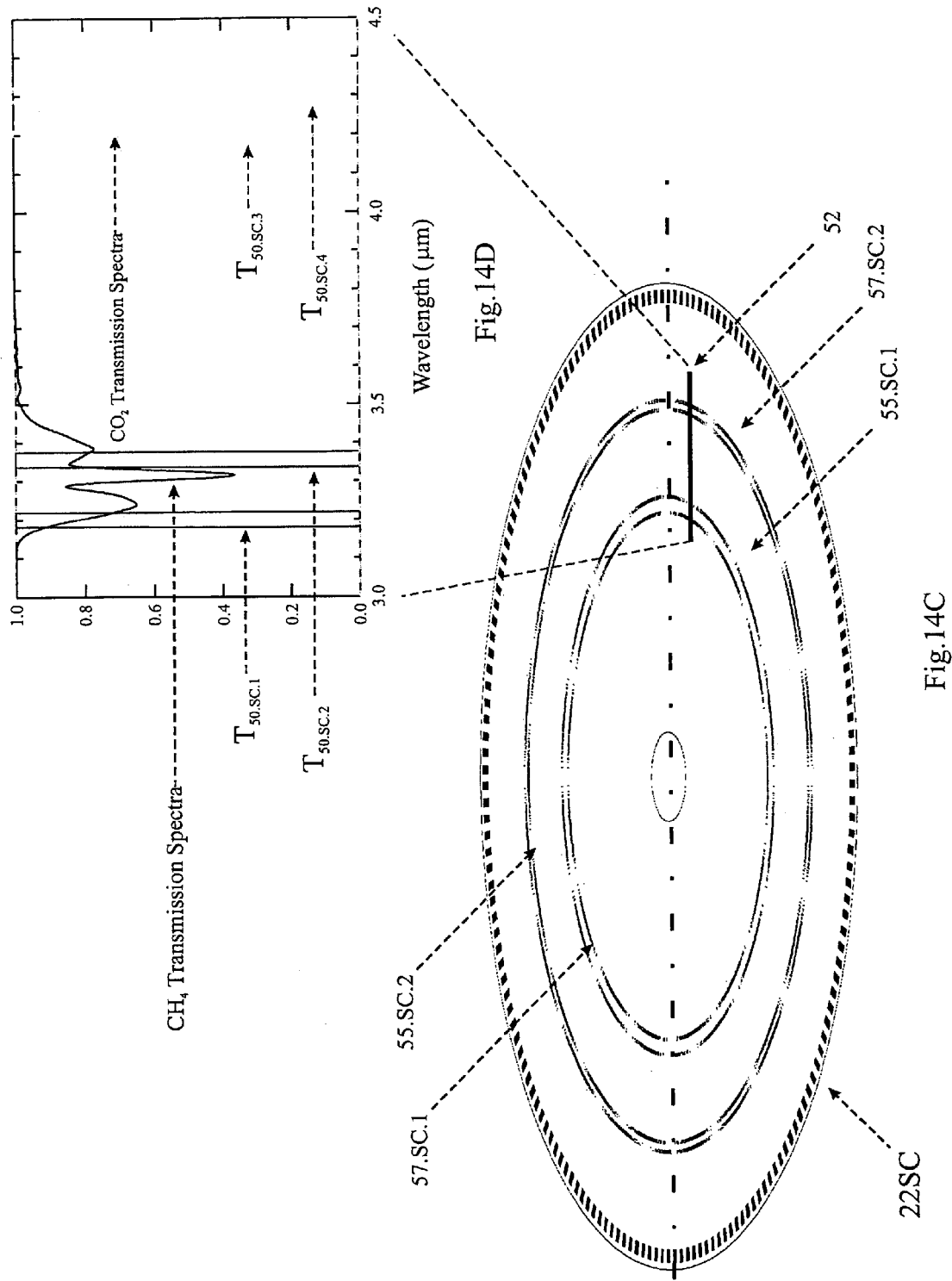

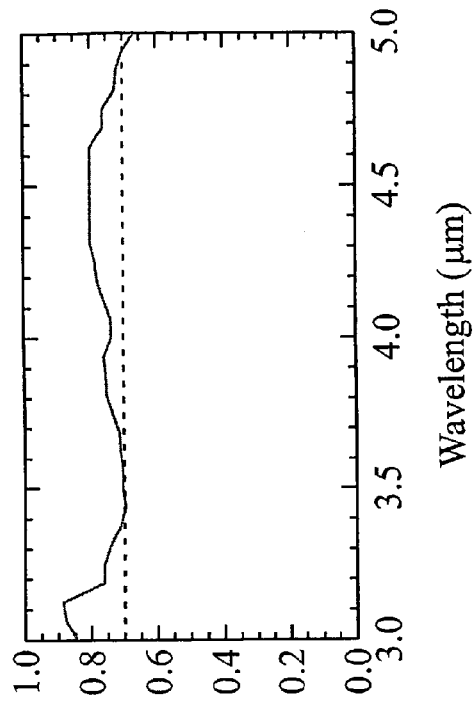
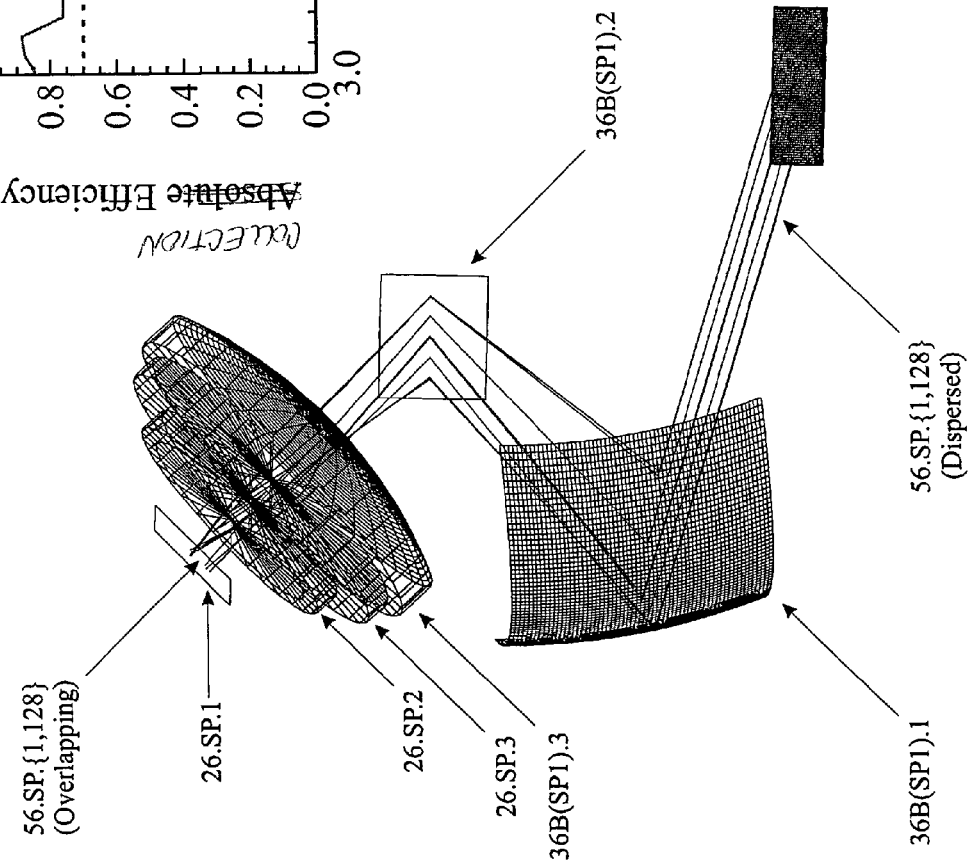
Fig.16B
Fig.16A

TWO-DIMENSIONAL SPATIAL RADIATION MODULATOR

CROSS REFERENCE TO RELATED APPLICATIONS

This application is a division of U.S. application Ser. No. 11/265,874, filed Nov. 2, 2005, which is incorporated herein by reference and which is a division of U.S. application Ser. No. 10/384,374 now U.S. Pat No. 6,995,840, filed Mar. 6, 2003, which is incorporated herein by reference and which claims the benefit of U.S. Provisional Application No. 60/361,967, filed Mar. 6, 2002, and U.S. Provisional Application No. 60/413,424, filed Sep. 25, 2002.

BACKGROUND OF THE INVENTION

This invention relates in general to radiation spectrum analyzers and radiation image analyzers, and in particular, to radiation analyzers and encoders employing the spatial modulation of radiation dispersed by wavelength or imaged along a line.

Radiation spectral analysis is presently carried out in a number of ways. Dispersive and Fourier transform based analyzers are for high resolution and can be used for many different applications so that they are more versatile than existing application-specific instruments and procedures. While these analyzers offer superior spectral performance, they tend to be expensive, large, heavy and non-portable. For most applications, these instruments offer a spectral resolution that is largely unnecessary. Many analytical computations can be made using relatively few spectral measurements. The processing of the additional, unnecessary optical data reduces the speed and compromises the photometric accuracy of these instruments.

In contrast, a non-dispersive approach to spectral analysis employs a radiation source filtered by one or more bandpass to provide input to a specific analytical function. The bandpass filters are used to select one or more specific spectral components, which are characterized by a center wavelength and bandwidth. One of the principal advantages of the non-dispersive approach is the ability to individually specify the center wavelength and bandwidth of the bandpass filters to optimize the instrument for a particular application. However, if the analytical function requires a significant number of bandpass filters, the system's signal-to-noise ratio is reduced as the total energy measured in a given filter over time is inversely related to the number of filters. Furthermore, if a spectrum analyzer using this approach is configured for a first application, the filters used in the device may have to be replaced, or the number of filters changed, in order to adapt the analyzer to a second application. As a consequence, the non-dispersive approach has clear limitation in adaptability and the number of spectral components that can be analyzed.

Another type of optical spectrum analyzer, which is best described as a hybrid between dispersive and non-dispersive instruments, is the Hadamard spectrometer. The Hadamard spectrometer includes a spatial radiation modulator, comprising a disc made of an opaque material with slots therein that reflect or transmit radiation, where the slots have uniform transmittance or reflectance. A radiation beam is dispersed according to wavelength onto the disc and the slots are selectively spaced at different radii from the axis to form a number of different optical channels for detecting corresponding spectral components of the beam. The disc is rotated about the axis and the slots selectively encode the corresponding spectral components with a binary amplitude modulation. The encoded beam is then directed to a detector. In order to differentiate the intensity of the spectral component transmitted or reflected by one slot from that of another, the disc is sequentially stepped through a specific number of steps, each step comprising a binary pattern of open or closed optical channels, which defines one equation in a system of simultaneous equations for the amplitudes of the spectral components. This set of simultaneous equations is then solved to yield the intensity for each channel prior to any specific analytical function, an approach which is time consuming and prone to errors. For example, as a direct consequence of the binary encoding approach, there is no mechanism by which one can recover the actual signal levels if any one of the signal levels changes substantially over the period of rotation. It should be noted that the system of equation can be simplified if the slots are patterned such that the radiation is transmitted or blocked one spectral component at a time (e.g., a filter-wheel photometer). However, this approach changes the optical duty cycle of each of the spectral components from its optimum value of 50%, thereby degrading the signal to noise ratio. Finally, if a Hadamard analyzer is configured for a first application, and the number of slots is changed to adapt the analyzer to a second application, the data acquisition and decoding algorithms must be changed as well, which significantly limits the instrument's adaptability.

Radiation imaging is primarily carried out using detector arrays and Charge Couple Devices (CCDs). Much of the data analysis employed by these techniques involves the mapping of the image onto a regular array of detector elements. A significant reduction in data analysis would be realized if the detector array elements could be configured for the specific image measured in the application. Infrared detector arrays are susceptible to background radiation, inter-detector-element drift and 1/f noise. Imaging systems based on infrared detector arrays typically need a large Thermo-Electric (TE) cooler and are very expensive. Because of their modest sensitivity, CCD-based imaging systems typically need a TE cooler and long exposure times in low light level application such as fluorescence imaging. A significant performance advantage could be realized in fluorescence imaging if the pixels of the CCD camera could be replaced with individual, inter-calibrated Photo-Multiplier Tubes (PMTs). Unfortunately, a low-cost, high-density detector array based on a PMT simply does not exist.

None of the above approaches is entirely satisfactory. It is, therefore, desirable to provide improved spectrum and image analyzers where the above-noted disadvantages are avoided or significantly diminished, and where the encoding, data acquisition and decoding are both generalized and significantly simplified such that the details of the spectrum or image analyzer can be rendered to a single application specific hardware component.

SUMMARY OF THE INVENTION

This invention provides many advantages over the radiation analyzers described above. In some embodiments, the intensity of the incident radiation is modulated independent of the bandwidth and that the amplitude of the modulated signal is a smooth function or changes between three or more distinct levels of contrast as the modulator is rotated about an axis or otherwise reciprocated. One can implement a multi-channel orthogonal encoding scheme for arbitrary center wavelengths and bandwidths and arbitrary radial intensity distributions. In this manner, the center wavelengths and bandwidths of the encoded channels can be independently optimized for a specific application. The before mentioned optical encoding scheme is combined with imaging optics so that radiation from an extended source or collection of discrete samples can be imaged using a single detector. This allows one to control the modulation depth on a channel-by-channel basis independent of the bandwidth, a design strategy which may be useful for balancing signal levels in systems where one or more channels have a disproportionately large fraction of the total incident radiation. This allows one to group modulation channels into complementary pairs where the amplitude and phase of the resulting encoded component are determined by the relative portion of radiation incident on the two filters comprising the pair. In this manner, intensity differences, wavelength derivatives, and the radial position of the center of an intensity distribution can be measured directly. This allows one to use one or more complementary filter pairs in conjunction with an expected radiation component for calibration and alignment purposes. One may also use a dedicated light source and detector and a series of marks on the modulator to detect spindle wobble, vibrations or a misaligned modulator pattern on the modulator substrate for calibration and alignment purposes. One can also measure a plurality of response radiation components as a function of two or more excitation components substantially simultaneously, enabling a fast, compact fluorescence, Raman or photo-refractive excitation/response analyzer. It is possible to use modulation functions which are based on incomplete periods of the rotation of the modulator, which can be used to eliminate various hardware items, free up micro-processor resources, synchronize the movements of external mechanical devices, measure both the radial position and the intensity of an imaged radiation component, and increase the spatial or spectral resolution of the analyzer. Finally, one may measure a plurality of spectral components individually selected from a collection of radiation emitting samples substantially simultaneously using a one-dimensional hyper-spectral imaging optic and a single channel detector.

In one embodiment of the invention, a spectrum analyzer comprising at least one source providing radiation having at least one selected spectral component, the spectral component having an intensity, a center wavelength and a bandwidth. A first optic is used to collect, disperse and focus the radiation to form an image dispersed by wavelength along an encoding axis onto an encoding plane. A two-dimensional spatial radiation modulator is rotated about a rotation axis and positioned in the encoding plane so that the encoding axis is substantially along a radial axis of the modulator. The modulator has at least one radiation filter at a radius from the rotation axis having a radial width substantially defining the bandwidth of a corresponding spectral component of the radiation. The filter modulates the intensity of the corresponding spectral component substantially independent of the bandwidth to provide an encoded beam comprising at least one encoded component, wherein the amplitude of the encoded component is a smooth function or changes between three or more substantially distinct levels of contrast as the modulator is rotated about the rotation axis. Preferably, at least two of the filters have substantially orthogonal modulation functions along an azimuthal axis. Most preferably, at least one of the filters modulates the intensity of a spectral component substantially according to a digitized replica (e.g., a halftone representation) of a function of the form $\sin^2(m\theta+p\pi/4)$, where $\theta$ is the rotation angle of the modulator about the axis and m is an integer. A second optic is used to collect and direct the encoded beam onto a detector, and a computer is used to analyze the signals generated by the detector in response to the encoded beam. Preferably, the computer uses a decoding algorithm to compute the amplitude of at least one encoded component from the signals generated by the detector in response to the encoded beam. If radiation in two or more spectral ranges is to be analyzed simultaneously, a number of dichroic mirrors can be used to focus two or more dispersed images onto the modulator and two or more detectors can be used to detect the encoded radiation.

In another embodiment of the invention, an image analyzer for analyzing the radiation from an extended source having at least two spatial components that emit, transmit or reflect radiation, comprises a first optic collecting and focusing radiation from the extended source to form at least two corresponding images along an encoding axis onto an encoding plane. One example of an extended source is a collection of different samples which emit, scatter, transmit or reflect radiation. In this case the individual samples are imaged along an encoding axis onto an encoding plane, such that each sample is focused at a substantially different point along the encoding axis. Another example of an extended source is one or more radiation sources which is filtered by two or more bandpass filters. In this case the radiation transmitted through (or, alternatively, reflected from) the collection of bandpass filters is imaged along an encoding axis onto an encoding plane, such that the radiation filtered by each bandpass filter is focused at a substantially different point along the encoding axis. Another example of an extended source is a radiation source combined with an optical system (e.g., comprising one or more diffractive, beam splitting, or lens array elements— or various combinations thereof) to produce a plurality of substantially identical sub-images substantially separated from one another along one or more spatial axes. A two-dimensional spatial radiation modulator is rotated about a rotation axis and positioned in the encoding plane so that the encoding axis is along a radial axis. The modulator has at least one radiation filter at a radius from the rotation axis for modulating the intensity of a corresponding spatial component to provide an encoded beam comprising at least one encoded component. Preferably, the amplitude of the encoded component is a smooth function or changes between three or more substantially distinct levels of contrast as the modulator is rotated about the rotation axis. Most preferably, at least one of the filters modulates the intensity of a spectral component substantially according to a digitized replica (e.g., a halftone representation) of a function of the form $\sin^2(m\theta+p\pi/4)$, where $\theta$ is the rotation angle of the modulator about the axis and m is an integer. A second optic is used to collect and direct the encoded beam onto a detector, and a computer is used to analyze the signals generated by the detector in response to the encoded beam. Preferably, the computer uses a decoding algorithm to compute the amplitude of at least one encoded component from the signals generated by the detector in response to the encoded beam. If radiation from two or more extended sources of radiation are to be analyzed simultaneously, the images from the extended sources can be focused onto different surfaces or different radial axes of the modulator and one or more detectors can be used to detect the radiation. In the preferred embodiment of the image analyzer, the extended source will contain a number of reference spatial components and the modulator will contain a number of dedicated filters to provide feedback for the alignment of the image onto the modulator pattern. For some applications, it may be desirable to further analyze the spatially encoded radiation from the extend source for one or more spectral properties. This may be performed by inserting a spectrum analyzer or other wavelength filtering device between the modulator and the detector.

In the preferred embodiment of the spectrum and imaging analyzers described above, the two-dimensional spatial radiation modulator contains a series of timing marks and the analyzer has a number of optical switches which are triggered by the timing marks to establish the absolute angle of rotation for decoding purposes. Most preferably, the timing marks will also trigger the data acquisition (DAQ) from the detector and the decoding algorithm, which in turn, will substantially relax any stability requirements of the modulators rotational period. Preferably, the analyzer will have a dedicated radiation source and an analog detector which is partially interrupted by the timing marks and/or other marks located on the modulator or spindle to detect spindle wobble or a misaligned pattern on the modulator. More preferably, the signal generated by the analog detector are processed by the computer to provide the decoding algorithm and/or the analytical function with one or more calibration coefficients used to compensate for the undesired effects of spindle wobble or a misaligned pattern. Most preferably, the signal generated by the analog detector are processed by the computer to provide a control signal to position of one or more optical elements to keep the image or dispersed image centered on the modulator pattern.

In the preferred embodiment of the spectrum and imaging analyzers described above, the analyzers computer will include a transient-signal algorithm that will detect transients in the amplitudes of the encoded components which occur during a rotational period of the modulator. Preferably, the computer will analyze the transient signal to determine its harmonic content. More preferably, the harmonic content will be used by the decoding algorithm to compensate for transient-induced harmonic interference. Preferably, the transient-signal algorithm will include a feedback mechanism to increase the motor speed in response to the detection of sub-rotational-period signal transients and decrease the motor speed in response to extended periods of time where the amplitudes are stable.

Another aspect of the invention and useful for the above-described spectrum and image analyzers is a spatial radiation modulator adapted to be rotated about a rotation axis to modulate at least one component of an incident radiation beam to provide an encoded beam. The modulator comprises a substrate and at least one radiation filter located at a radius from the rotation axis. The filter comprises an annular region substantially encompassing a plurality of pixels having optical characteristics substantially different from the substrate. The pixels are patterned substantially within the annular region to modulate the intensity of a corresponding radiation component predominantly along an azimuthal axis to provide an encoded component such that the amplitude of the encoded component changes between three or more substantially distinct levels of contrast as the substrate is rotated about the rotation axis. Preferably, the density of the pixels is used to control the modulation depth of the encoded component. In this manner, the amplitudes of two or more encoded components can be balanced when one of the components has a disproportionate fraction of the total incident radiation.

Another aspect of the invention and useful for the above-described spectrum and image analyzers is a two-dimensional radiation modulator adapted to be rotated about a rotation axis to modulate at least one component of an incident radiation beam to provide an encoded beam. The modulator is comprised a substrate and at least one radiation filter located at a radius from the rotation axis. The filter has substantially continuously variable optical characteristics along an azimuthal axis, and the optical characteristics are continuously varied to modulate the intensity of a corresponding radiation component as a substantially smooth function of a rotation angle of the modulator about the rotation axis.

Another aspect of the invention and useful for the above-described spectrum and image analyzers is a two dimensional spatial radiation modulator adapted to be rotated about a rotation axis, or otherwise reciprocated in a direction. The modulator includes at least one radiation filter pair for modulating the intensity of an incident radiation beam to provide an encoded beam comprising at least one encoded component. The pair comprises two radiation filters located at different radii from the rotation axis and having modulation functions that are complementary to each other so that the amplitude and phase of the resulting encoded component is determined by the relative proportion of radiation incident on the two filters. In that manner, the difference in the radiation intensity incident on the two filters can be measured directly rather than inferring the difference by subtraction, an inefficient approach which is prone to errors and which wastes the dynamic range of the detector signal. Preferably, the modulation functions are smooth functions or digitized replicas of smooth functions having three or more distinct levels of contrast. More preferably, the modulation functions of two filter pairs for modulating two different radiation component differences are substantially orthogonal to one another.

Another aspect of the invention and useful for the above-described spectrum and image analyzers is a two dimensional spatial radiation modulator adapted to be rotated about a rotation axis, or otherwise reciprocated in a direction. The modulator includes at least one radiation filter pair for measuring the difference in the radiation intensity incident on the two filters comprising the pair and a third radiation filter for measuring the sum of the radiation intensity incident on the two filters. In this manner, both the radial position of the center of the intensity distribution and the total intensity can be measured substantially simultaneously.

In some applications, it may be desirable to measure a samples response to two or more different excitation components substantially simultaneously. For example, some samples are altered by the excitation radiation such that the results of the measurements may differ depending upon which excitation component is first used in a series of measurements employing different excitation components. Another example where it may be desirable to measure a samples response to two or more different excitation components substantially simultaneously is a sample which is flowing in a process stream where the dwell time of the sample at the location of the measurement is insufficient to make the excitation measurements in sequence. In another embodiment of the invention, one or more excitation sources provide excitation radiation comprising two or more distinct excitation components. For example, a diffractive or refractive optic may be used to spatially separate the spectral lines of a multi-line laser. The excitation components (e.g., the spectral lines) are directed to the sample substantially in sequence. In response to excitation radiation, the sample emits a response beam of radiation comprising at least one response component emitted, transmitted, reflected or scattered in response to the excitation radiation. The response beam of radiation is collected and an image or a dispersed image is formed along an encoding axis in an encoding plane. A two-dimensional spatial radiation modulator rotated about a rotation axis and positioned in the encoding plane so that the encoding axis is along a radial axis. The modulator has at least one radiation filter at a radius from the rotation axis. The radiation filter modulates the intensity of a corresponding response component to provide an encoded response beam comprising at least one encoded response component. Preferably, the modulation functions of the modulator that encode the response components are smooth functions or are digitized replicas of smooth functions having three or more distinct levels of contrast. The encoded response beam is collected and directed to a detector and the resulting signal is analyzed by a computer to computes the amplitude of at least one encoded response component as a function of the two or more excitation components. Preferably, the modulator used to encoded the response components is also used for directing the components of excitation radiation to the sample substantially in sequence. Preferably, the excitation sequence is synchronized with the data acquisition of the encoded response beam so that the response components corresponding to one excitation component may be distinguished from those corresponding to other excitation components. More preferably, the time-based detector signal is sorted into sub-signals, where each sub-signal corresponds to the encoded response components corresponding to only one of the excitation components.

In another embodiment of the invention, an analyzer for monitoring radiation from at least one radiation source comprises an input beam comprising at least one radiation component corresponding to a distinct radiation source and having an intensity and a center wavelength. The input beam is collected and dispersed to form at least one image along an encoding axis onto an encoding plane, where the image corresponds to the component. A two-dimensional spatial radiation modulator rotated about a rotation axis and positioned in the encoding plane so that the encoding axis is substantially along a radial axis such that a change in the center wavelength of the component will cause the corresponding image to move substantially along the radial axis. The modulator has at least one radiation filter pair for modulating the intensity of a corresponding component to provide an encoded beam comprising at least one encoded component. The filter pair comprises two radiation filters located at different radii from the rotation axis and having modulation functions that are complementary or out of phase so that the amplitude and phase of the encoded component is determined by the relative proportion of radiation incident on the two filters. Preferably, the radiation filters comprising the pair are substantially adjacent to one another. More preferably, the border between the adjacent radiation filters is substantially located at the radius which correspond to the nominal or desired center wavelength for the radiation source. The encoded beam is collected and directed to a detector and a computer analyzes the signals generated by the detector in response to the encoded beam. Preferably, the computer computes the amplitudes and phases of at least one encoded component from the signals generated by the detector in response to the encoded beam. More preferably, the computer generates at least one control signal for adjusting the center wavelength of at least one source in response to the signals generated by the detector to tune the source. Preferably, at least two of the encoded components are encoded with substantially orthogonal modulation functions, and computer computes the amplitude and phase of at least one of the encoded component. Preferably, each of the modulation functions is a smooth function or a digitized replica of a smooth function having three or more distinct levels of contrast. Preferably, the analyzer will have one or more optical elements on movable stages such that the images can be collectively displaced along the radial axis of the modulator. In this manner, the instrument can be calibrated, and periodically, the source images can be purposely offset with respect to the filter pairs on the modulator in order to measure the intensity of the radiation sources. More preferably, the modulator can be segregated into two halves, the first half containing complementary pairs for monitoring the wavelength and the second half containing individual filters to measure the intensity. In this manner, the analyzer can provide a control signal to stabilize the sources wavelength and measure the sources intensity. By adding addition filter pairs that are orthogonal to other filter pairs, more than one radiation source may be monitored at the same time.

In the embodiments below, radiation provided by a source is directed to form images along an image axis onto a plane. A two dimensional spatial radiation modulator is rotated about a rotation axis and positioned in the plane so that the image axis is substantially along an encoding axis of the modulator, the modulator modulating the intensity of the spectral components to provide an encoded beam comprising at least two encoded component, where the encoding axis is substantially along a radial axis. The modulator has at least two radiation encoding filters at different radii from the rotation axis for modulating intensities of radiation from the source as the modulator is rotated about the rotation axis.

In one embodiment, a radiation spectrum analyzer employs a bi-conic optical element to reduce the optical path length between the modulator and the detector, and/or to increase the collection efficiency. The curvature of the bi-conic optical element may be chosen so as to increase the collection efficiency.

In another embodiment, radiation is dispersed by wavelength according to a dispersion function on the modulator. The modulator has filters thereon with radial positions and radial widths that are functions of the spectral properties of certain analytes and the dispersion function. Radiation modulated by the filters can be analyzed to determine presence of one or more of the analytes. The modulator can be designed by constructing a chemometric matrix to relate concentrations of the analytes to intensities of spectral components in the radiation, deriving from the chemometric matrix optimized spectral windows, and translating the optimized spectral windows into a corresponding optimized annular region or annular segment on the modulator using the dispersion function.

In still another embodiment, filters on the modulator have substantially complementary modulation functions so that each pair of complementary radiation filters produces a single encoded calibration component where at least one characteristic of the encoded calibration component is determined by the relative intensities of radiation from a beam incident on the two filters, wherein the radial position and radial width of the annular regions are such that a predetermined value for the single encoded calibration component is produced as the modulator is rotated about the rotation axis. The encoded calibration component(s) are detected for gauging the displacement of position of a known spectral feature in the dispersed image from an aligned position along the encoding axis.

In yet another embodiment, the modulator has at least two radiation filters substantially occupying a common annular region at a radius from a rotation axis. The filters modulate the intensity of substantially equal portions of corresponding radiation components of a beam at different modulating frequencies to provide an encoded beam comprising at least two encoded calibration components as the modulator is rotated about the rotation axis, the encoded calibration components having substantially different frequencies. The encoded calibration components are detected to determine frequency dependence of a detection system.

In still another embodiment, an encoded filter-correlation radiometer includes at least two target wavelength filters, the target wavelength filters having substantial optical absorbance in the spectral range and at least one reference wavelength filters, each of the reference wavelength filters having substantially less optical absorbance in the spectral range as compared to the target analytes. Radiation separately passing through the filters are used to measure a sample, and detected to measure characteristics of the sample.

In one more embodiment, an encoded filter-correlation radiometer for measuring a sample comprises at least one target and reference wavelength filter pair, the target wavelength filter in the at least one pair having substantial optical absorbance in the spectral range and the reference wavelength filter in the at least one pair having substantially less optical absorbance in the spectral range as compared to the target analytes. Radiation transmitted separately through the target wavelength filter and the reference wavelength filter is incident on a modulator of the type described as the modulator is rotated about the rotation axis and is detected. Radiation that is so detected in an optical path in which a sample is placed is useful for measuring a sample.

In still one more embodiment, optics providing in response to an encoded beam a substantially collimated encoded beam is used so that large or distant objects and media can be measured.

In one more embodiment, radiation in different spectral ranges is modulated by a modulator of the type described above and detected separately. Such scheme is useful for measuring samples.

Yet another embodiment is directed to a two dimensional spatial radiation modulator adapted to be rotated about a rotation axis to modulate at least one component of an incident radiation beam to encode the beam, the modulator comprising:

a substrate and at least one annular region substantially encompassing a plurality of non-contiguous sub-regions having optical characteristics substantially different from the substrate, the annular region comprising at least two annular segments, each the segment comprising a fractional rotation period of the modulator, the sub-regions in a first annular segment being patterned to form at least one pair of radiation filters located at different radii from the rotation axis and having substantially complementary modulation functions, the pair producing in response to the beam a first encoded component with a characteristic determined by the relative intensities of radiation from the beam incident on the at least one pair of filters;

the sub-regions in a second annular segment being patterned to form at least one radiation filter that produces in response to the beam a second encoded component with a characteristic determined by the total intensity of radiation from the beam incident on the at least one radiation filter.

One more embodiment employs a modulator having at least one annular region comprising at least two annular segments, each segment comprising a fractional rotation period of the modulator, wherein the sub-regions within the segment of the at least one radiation filter are being patterned to modulate the intensity of a corresponding radiation component in a beam with a periodic function directed to the modulator to provide an encoded beam comprising at least one encoded component as the modulator is rotated about the rotation axis, the periodic function comprising substantially a harmonic of the active sub-period. The modulator has at least another one of the segments being substantially optically passive when interacting with the beam during a passive sub-period of the rotation period.

In still one more embodiment, rotation frequency of a modulator of the type described above is controlled. Signals generated by a detector detecting modulated signals are analyzed, wherein the analyzing includes decoding at least one noise tracking signal originating from a periodic noise source. The rotation frequency of the modulator is varied to maximize an amplitude of the noise tracking signal and thereby minimize the effect of the periodic noise source on the decoded amplitudes of certain encoded components.

In yet another embodiment, a modulator has a complementary pair having substantially complementary modulation functions so that an encoded beam obtained by directing a beam of radiation to the modulator comprises a component with a characteristic determined by the relative intensities of radiation from the beam incident on the two filters. The encoded beam is detected and the result analyzed to determine the characteristic as a function of the rotation angle of the modulator about the rotation axis to gauge the concentricity of the annular segment or region with respect to the rotation axis.

BRIEF DESCRIPTION OF THE DRAWINGS

FIG. 12A is a first schematic side view of embodiment HS of pre-encoder optic 36A of FIG. 1A.

FIG. 12B is a second schematic side view of embodiment HS of pre-encoder optic 36A of FIG. 1A.

FIG. 13C shows the respective transmission spectra of five hydrocarbons, and the corresponding optimized spectral windows for use in the Multivariate Chemometric Analyzer embodiment of analyzer 100.

FIG. 14C shows embodiment 22SC of modulator 22, for use in the Spectral-Calibration Analyzer embodiment of analyzer 100.

FIG. 14D illustrates the relation between the transmission spectra of methane and carbon dioxide and the optimized calibration spectral windows $T_{SC.1}$ through $T_{SC.4}$, for use in the Spectral-Calibration Analyzer embodiment of analyzer 100.

FIG. 16A is a schematic of the SP1 (Short-Path, Post-Encoder Optic) embodiment of post-encoder optic 36B of FIG. 1.

FIG. 16B is a graph of the encoded-component collection efficiency for the SP1 (Short-Path, Post-Encoder Optic) embodiment of post-encoder optic 36B of FIG. 1.

Figures 1A, 1B:
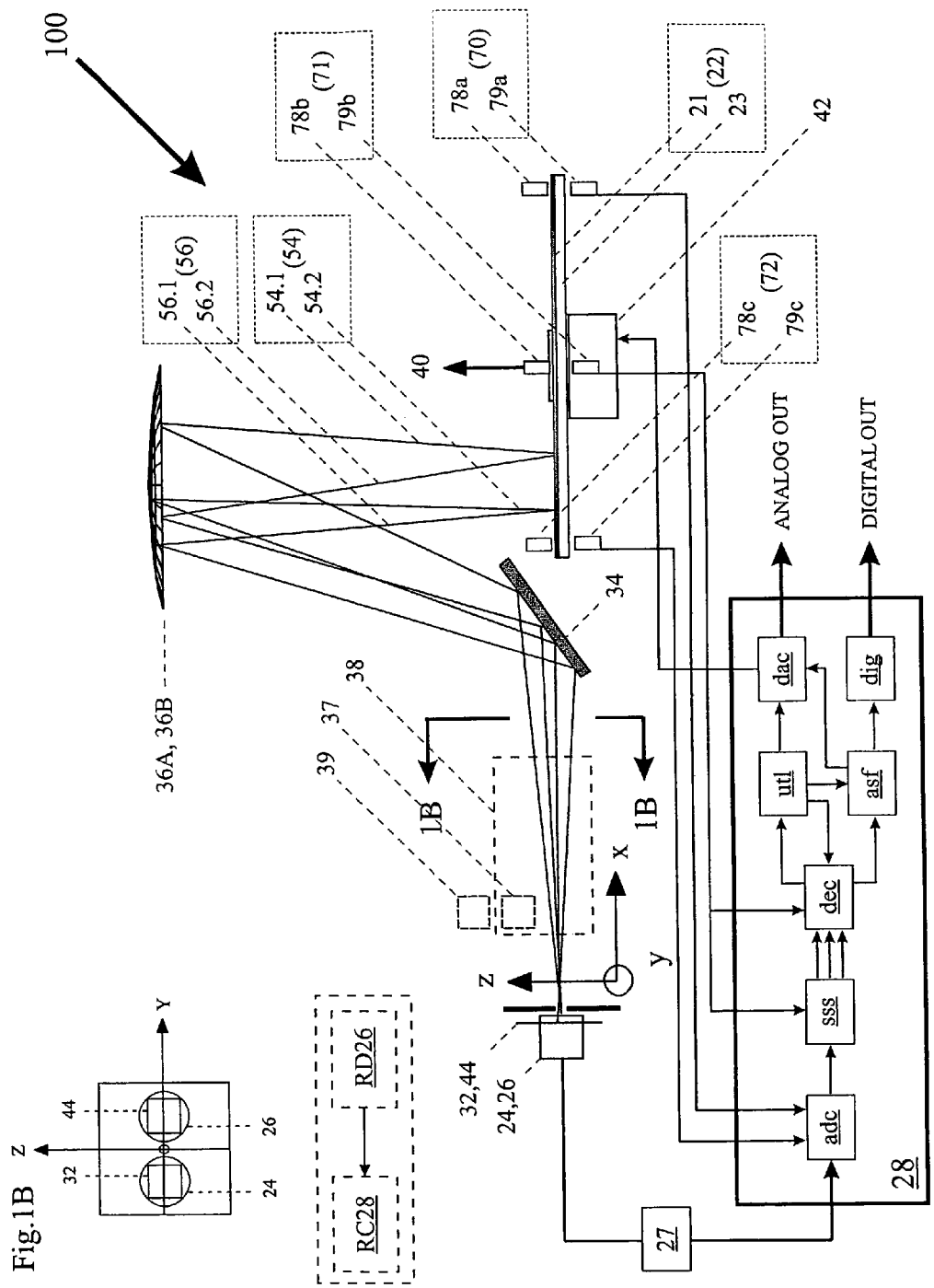
FIG. 1A is a schematic side view of multi-purpose radiation analyzer 100 to illustrate the preferred embodiment of the invention.
FIG. 1B is a schematic view illustrating a view along the line 1B-1B in FIG. 1A of a portion of the analyzer in FIG. 1A.

For easier reference, embodiments described below in the examples of a particular element or system in the figures herein are typically given composite symbols, such as the number of the element in the figures herein, followed by a decimal point and a number or followed by letters. For example, 100.1 is the number in an example below of one embodiment of the analyzer 100, where this embodiment is different from another embodiment 100.2 of the analyzer 100. 36A(HS) is an embodiment of the pre-encode optic 36A. Where an embodiment includes more than one components, the composite symbol comprises the number of the element in FIG. 1A or other figures herein, followed by a decimal point, a first number or letters indicating an embodiment of the element, and followed by another decimal point and a second number to indicate a particular component of such embodiment. In example 1, for example, 36B.1.1 and 36B.1.2 indicate the first and the second components respectively of the first embodiment of post-encoder optic 36B in FIG. 1A or other figures herein. These composite symbols are not shown in FIG. 1A or other figures herein to simplify the figures. Additional components introduced by the examples will be given unique symbols.

DETAILED DESCRIPTION OF THE PREFERRED EMBODIMENT

Because the present invention can be configured as a spectrum analyzer, as an image analyzer, or as a hyper-spectral image analyzer, it is convenient to generalize certain terms and phrases used in the descriptions that follow. In the descriptions of the present invention that follow we shall use the following multi-purpose notation for brevity:

1. radiation source: radiation sources having spectral components, radiation sources having spatial components, or radiation sources having both spectral and spatial components. The radiation source can be a sample or collection of samples that emit, scatter, transmit or reflect radiation in response to one or more components of excitation and/or probing radiation.
2. radiation components: portions of the radiation from the radiation source having spectral information, portions of the radiation from the radiation source having spatial information, or portions of the radiation from the radiation source having both spectral and spatial information.
3. pre-encoder optics: one or more optical elements which form one or more images, or one or more dispersed images on a surface of the modulator. The pre-encoder optic may include one or more optical fibers, wave guides, or light pipes, for coupling radiation from one or more remote sources to the analyzer. The pre-encoder optic may include one or more open paths and one or more remote reflectors. The pre-encoder optic may include microscope or telescope optics.
4. post-encoder optics: one or more optical elements which collect the encoded radiation from the modulator and direct and focus the encoded beam onto one or more radiation detectors. The post-encoder optic may include one or more optical fibers, wave guides, or light pipes, for coupling encoded radiation from the instrument to one or more remote sampling stations. The post-encoder optic may include one or more open paths and one or more remote reflectors. The post-encoder optic may include microscope or telescope optics.
5. target image: an image comprising two or more radiation components substantially separated from one another along an encoding axis. The width of the target image is the spatial extent perpendicular to the encoding axis.
6. imaging: collecting and focusing the source radiation to form one or more images, one or more hyper-spectral images, or collecting, dispersing and focusing the source radiation to form one or more dispersed images along a common axis.
7. alignment components: anticipated or engineered radiation components which are used in conjunction with dedicated filters and/or complementary filter pairs to gauge the alignment of the target image onto the modulator pattern.

8. detector: one or more radiation detectors and associated electronics. The associated electronics may include bias electronics, programmable gain, and one or more analog filter networks (e.g., anti-aliasing filters).

9. sample: can be any solid, liquid or gas, such as one or more gasses, liquids and/or solids that absorb, transmit, or scatter (e.g., reflect, Raman scatter, Raleigh scatter) incident radiation. Samples may emit one or more response components of radiation in response to one or more components of excitation radiation. Samples may be confined by a vessel or cell or may be unbounded (e.g., the atmosphere).

Radiation Analyzer/Encoder 100

FIG. 1A is a schematic side-view of multi-purpose radiation analyzer 100 (which can be configured as a spectrum analyzer, an image analyzer, a hyper-spectral imaging analyzer, or an encoded source of excitation or probing radiation), to illustrate a preferred embodiment of the invention where the encoding of the selected spectral or spatial components is achieved by spatially varying the reflectance properties of a rotating spatial radiation modulator. As shown in FIG. 1A, analyzer 100 includes a spatial radiation modulator 22, which comprises pattern 21 formed on a surface of modulator substrate 23, for encoding radiation from a source 24, which may be a broadband or multiple wavelength source containing spectral information, an extended source containing spatial information, or any combination thereof. The input radiation beam 54 from source 24 is preferable passed through an entrance aperture 32 to a folding mirror 34 which reflects the radiation to pre-encoder optic 36A which images the input radiation to form target image 52 onto modulator 22 such that the radiation components of 52 are focused at substantially different points along a radial axis of modulator 22. If more than one target image is to be encoded substantially simultaneously, additional optical elements (not shown) can be used to focus two or more target images onto modulator 22 and collect and direct the encoded beams onto one or more radiation detectors.

Modulator substrate 23 rotates on a motorized spindle 42 about a rotation axis 40 in the encoding plane. Preferably, modulator 22 contains a sub-pattern of timing and/or location marks that interrupt the optical switches described below for timing and alignment purposes. More preferably, this sub-pattern includes at least two series of marks confined to annular regions at different radii, one series having marks at regular angular intervals and the other series having marks at non-regular angular intervals. In this manner, the exact rotation angle of modulator can be established by computer 28 for decoding purposes. Modulator 22 has at least one radiation filter at a radius from rotation axis 40 which modulates (or encodes) the intensity of a corresponding radiation component to provide an encoded beam comprising at least one encoded component 56 (e.g., 56.1), wherein the amplitude of the encoded component is a smooth function or changes between three or more substantially distinct levels of contrast as the modulator is rotated about rotation axis 40. For convenience in description, the spatial radiation filters on modulator 22 are described to reflect radiation, it being understood that spatial radiation filters that transmit instead of reflect radiation may be used instead in each of the embodiments herein and such variations are within the scope of the invention. The encoded radiation beam 56 (shown in FIG. 1 to be reflected by modulator 22) is collected, directed and focused by post-encoder optic 36B towards folding mirror 34, which reflects encoded beam 56 towards an exit aperture 44 onto detector 26. Preferably, the encoded components (e.g., 56.1 and 56.2) substantially overlap one another on the surface of detector 26. Detector 26 detects the total intensity of the different encoded radiation components in the encoded beam to provide detector output 27 to computer 28.

As shown in FIG. 1A, in many embodiments of analyzer 100, sample 38 is inserted in the optical path between source 24 and detector 26. In a number of embodiments, sample 38 is a sample cell filled with a sample gas or liquid. In some embodiments, sample cell 38 comprises one or more absorbing media 37, which collect analytes adsorbed over time. Absorbing media 37 can be augmented with heater 39, which heats absorbing media 37 to desorb one or more adsorbed analytes. If the analytes desorbed from absorbing media 37 by heater 39 are confined by sample cell 38, the concentration of analytes in sample cell 38 is enriched. Examples of sample 38, absorbing media 37, and heater 39 are described below.

As an option, analyzer 100 includes remote detector RD26 and remote computer RD28 for use in applications described below. Remote detector RD26 and remote computer RD28 are similar to detector 26 and computer 28, respectively, but are located at one or more remote locations.

The optical geometry illustrated in FIG. 1A was chosen for clarity, as it has a small number of optical components. For example, as shown in FIG. 1A, pre-encoder optic 36A and post-encoder optic 36B are combined into a single optical element. Other optical geometries which involve separate, and more elaborate optical systems to collect and focus the input radiation onto modulator 22 and to collect and focus the encoded beam from modulator 22 onto detector 26 may be used instead in each of the embodiments herein and such variations are within the scope of the invention.

In embodiments of analyzer 100 that excite radiation emitting or radiation scattering samples, a second post-encoder optic (e.g., 36B is replaced by 36B.1 and 36B.2, not shown in FIG. 1A) may be useful. For example 36B.1 is used to collect encoded excitation radiation and direct the encoded excitation beam onto one or more samples. In response to the excitation radiation, the samples emit or scatter one or more components of response radiation, and 36B.2 is used to collect the encoded response radiation from the excited sample(s) and direct the encoded response beam onto detector 26. Such and other variations are within the scope of the invention.

Preferably, additional optical elements (e.g., fold mirrors) that substantially confine the optical components to one or more planes parallel to the plane of modulator 22 are useful for reducing the size of the instrument. More preferably, the optical elements of the invention are substantially confined two planes substantially parallel to the plane of said modulator. In this manner, the assembly and the optical alignment procedures are simplified. More preferably, in each of the two planes, the individual optical elements are combined into a single monolithic optic (e.g., by injection molding) to further simplify the alignment procedure and reduce cost.

In another embodiment of the present invention, detector 26 can be replaced with an optical fiber bundle and a number of remote sampling stations which include detector RD26 and computer RC28. In this manner, a number of remote measurements can be made substantially simultaneously by propagating the encoded beam to the remote measurement sites using the optical fibers or other suitable means. Preferably, the timing signals generated by the optical switches described below are dispatched along with the encoded beam such that the data acquired at the remote locations can be properly analyzed.

FIG. 1B is a view of the entrance and exit apertures 32, 34 along the arrow 1B-1B in FIG. 1A. Also shown in FIG. 1A is an xyz axis, so that the view along the arrow 1B-1B is along the negative x axis. A sample and/or optical fiber (not shown) may be placed between the source and the entrance aperture or between the exit aperture 44 and the detector 26 for analysis.

Computer 28 includes an analog to digital converter 28.adc, a sub-signal separator algorithm 28.sss (described below), a decoding algorithm 28.dec, an application specific analytical function 28.asf, and both analog and digital outputs, 28.dac and 28.dig, respectively. Preferably, the detectors analog output is sampled by Analog-to-Digital Converter (ADC) 28.adc which is triggered by a first optical switch, 70, comprising radiation source 78a and photodetector 79a. A second optical switch, 71, comprising radiation source 78b and photodetector 79b, provides the computer with a reference of 0 degrees to synchronize the output of 28.adc with the decoding algorithm. Preferably, the analog outputs of computer are used to interface to existing analytical instrument interface protocols. More preferably, the digital output of computer 28 includes a connection to the Internet, a local area network or a wireless network so that a number of remote instruments can be monitored from a central location. As will be described below, as taught by this invention, the filters in or on modulator 22 are such that the optimum 50% duty cycle is retained and computer 28 can determine the amplitude of each radiation component encoded by modulator 22, without having to solve a simultaneous system of equations for arbitrary radial intensity distributions in target image 52.

Computer 28 also includes set of utility algorithms 28.utl, including Motor Control Algorithm (MCA), Motorized Stage Control (MSC), Transient Signal Algorithm (TSA), Alignment Calibration Algorithm (ACA), Alignment Tracking Algorithm (ATA), Frequency Compensation Algorithm (FCA), Noise Search Algorithm (NSA), Noise Phase Locking Algorithm (NPL), and Pattern Concentricity Analysis (PCA). These algorithms are described below.

An alignment probe, 72, shown in FIG. 1A, comprising radiation source 78c and photodetector 79c, is positioned such that the alignment beam emitted by 78c and collected by 79c is partially interrupted by the timing marks and/or additional location marks (not shown) on modulator 22. Preferably, the alignment beam is positioned such that the marks at regular angular intervals obscure roughly half of the alignment beam and the marks at non-regular angular intervals obscure roughly the other half of the alignment beam. More preferably, the alignment beam is substantially centered one or more complementary filter pairs (described below), such that the magnitude and phase of the signal produced by photodetector 79c is directly related to the concentricity of modulator pattern 21 with respect to axis of rotation 40. Most preferably, the magnitude and phase of photodetector 79c are used as feedback in the manufacturing process to properly align modulator 22 onto motorized spindle 42. The analog output of alignment probe 72 is analyzed by Alignment Tracking Algorithm to gauge the error in the absolute position of the radiation filters with respect to the axis of rotation. This positional error can arise from the manufacturing process of the modulator (e.g., the modulator pattern is printed off center on the substrate, resulting in a periodic error), from the wobble of the spindle (resulting in a dynamic, periodic or non-periodic error), or from the thermal expansion of the substrate (resulting in a static radial error). Preferably, the output of Alignment Tracking Algorithm is used as input to the application specific analytical function 28.asf to compensate for the effects of the error in the absolute position of the radiation filters with respect to the axis of rotation. More preferably, the output of Alignment Tracking Algorithm is used in Alignment Calibration and Tracking Analyzer (shown below in FIG. 9B), which dynamically positions one or more optical elements to keep target image 52 properly aligned on modulator 22 as substrate 23 rotates about axis 40.

In some applications it is useful to analyze radiation in two or more distinct spectral ranges. For example, in the analysis of chemical compositions, improved specificity (or discrimination) can be achieved by looking at a number of spectral features in two or more distinct spectral ranges. Examples of distinct spectral ranges include spectral ranges where a first detector type (e.g., PbSe) is optimized for radiation detection in the first spectral range (e.g., 3 to 5 microns), and a second detector type (e.g., HgCdTe) is optimized for radiation detection in a second spectral range (8 to 12 microns). Other examples of distinct spectral ranges include spectral ranges which are subject to interference to one or more interfering gasses and vapors (or liquids) which can unpredictably affect the accuracy of the spectral measurements. Ambient carbon dioxide ($CO_2$) is a well know case in point.

Figure 1C:
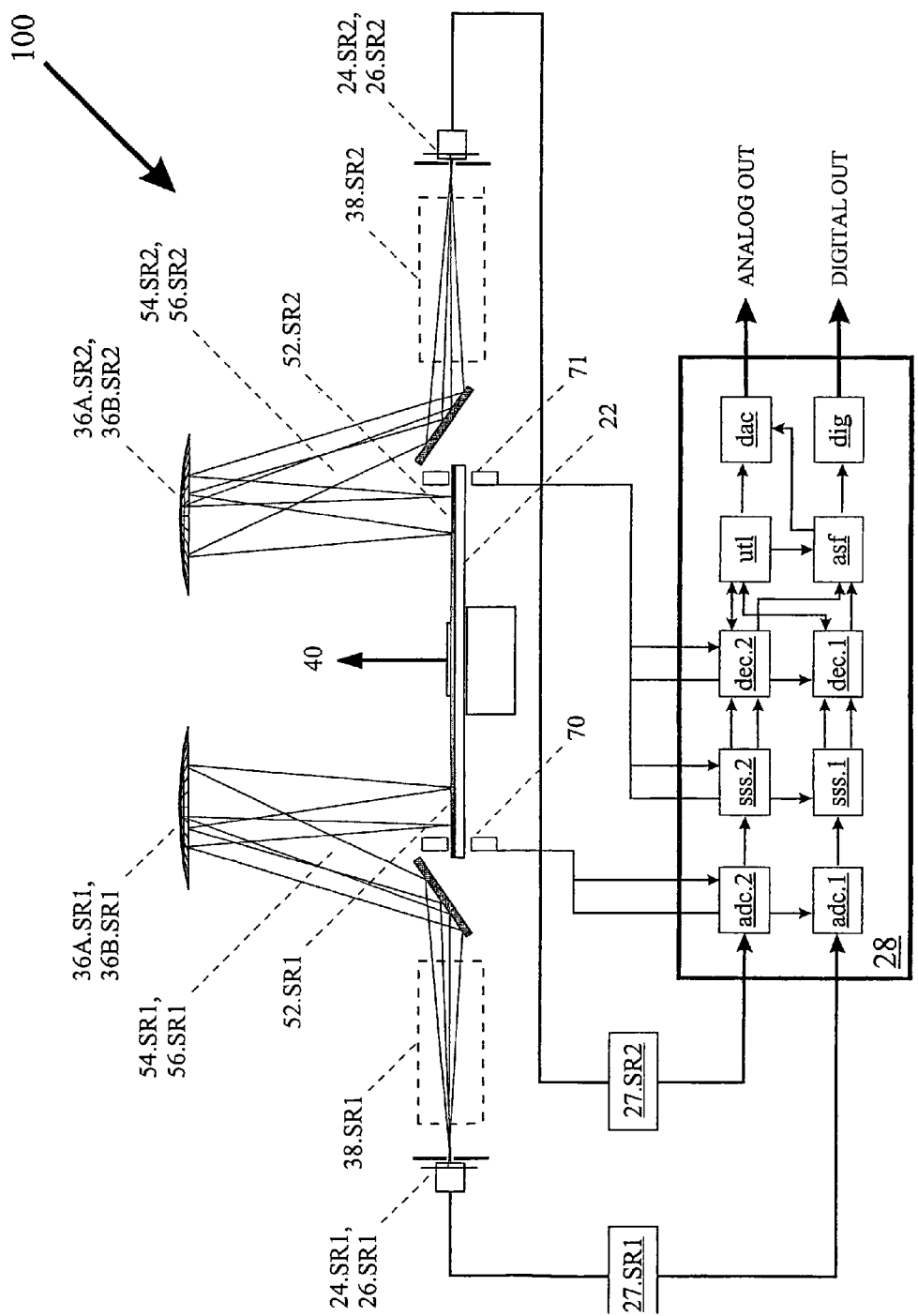
FIG. 1C is a schematic view illustrating an embodiment of analyzer 100 that encodes and analyzes radiation in two distinct spectral ranges.

FIG. 1C is a schematic view of an embodiment of analyzer 100 that encodes and analyzes radiation in two distinct spectral ranges. Radiation source 24.SR1 provides radiation in a first spectral range. Pre-encoder optic 36A.SR1 collects radiation 54.SR1 from source 24.SR1, and forms target image 52.SR1 on a first surface of modulator 22. Post-encoder optic 36B.SR1 collects and directs encoded beam 56.SR1 onto detector 26.SR1, which provides signal 27.SR1 in response to 56.SR1. Detector signal 27.SR1 is sampled by 28.adc.1 and decoded by 28.dec.1. In a similar fashion, radiation source 24.SR2 provides radiation in a second spectral range. Pre-encoder optic 36A.SR2 collects radiation 54.SR2 from source 24.SR2, and forms target image 52.SR2 on a second surface of modulator 22. Post-encoder optic 36B.SR2 collects and directs encoded beam 56.SR2 onto detector 26.SR2, which provides signal 27.SR2 in response to 56.SR2. Detector signal 27.SR2 is sampled by 28.adc.2 and decoded by 28.dec.2. The decoded components from both 56.SR1 and 56.S2 are used as input to 28.utl and 28.asf.

As shown in FIG. 1C, sample 38.SR1 is probed with encoded radiation in the first spectral range, and sample 38.SR2 is probed with radiation in the second spectral range. In some instances, it may be useful to probe the same sample with radiation in both spectral ranges. Such and other variations are within the scope of the invention.

Figure 2:
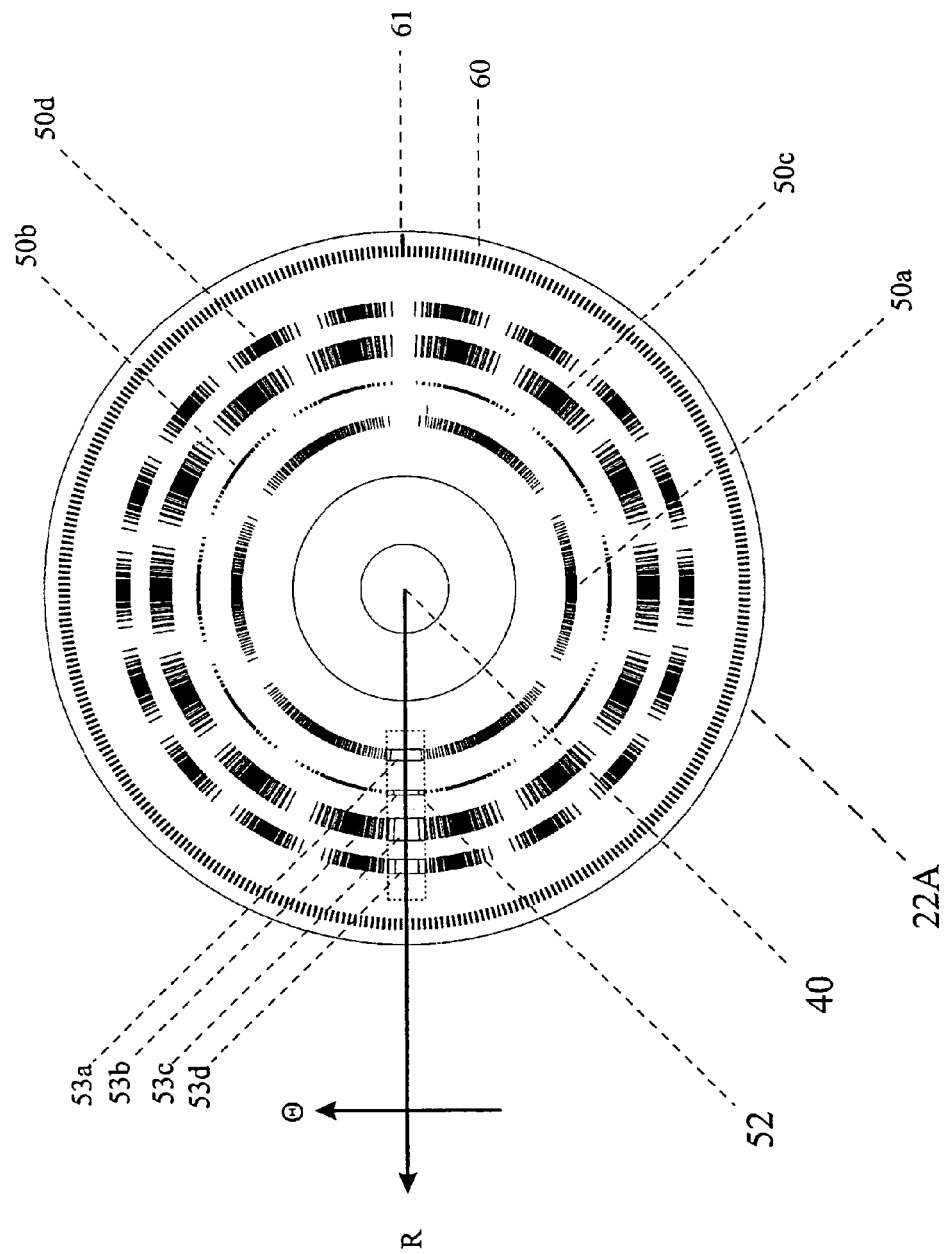
FIG. 2 is a top view of embodiment 22A of modulator 22, suitable for use in analyzer 100 of FIG. 1 to illustrate an embodiment of the invention.

FIG. 2 is a top view of a radiation modulator with four different radiation intensity filters thereon to illustrate an embodiment of the invention. As shown in FIG. 2, modulator 22A includes four radiation filters 50a, 50b, 50c and 50d. These filters may be formed as a patterned layer of radiation reflective material on top of a non reflective substrate, or as a patterned layer of non-reflective material on top of a reflective substrate; alternatively, these filters may be formed as patterned radiation transmissive areas in an opaque substrate or as a patterned layer of opaque material on a transmissive substrate. For convenience in description, the radiation intensity filters are described to reflect radiation, it being understood that radiation intensity filters that transmit instead of reflect radiation or introduce a phase difference may be used instead in each of the embodiments herein and such variations are within the scope of the invention. In modulator 22A, the four radiation filters 50a, 50b, 50c and 50d are centered at non-regular intervals along the radial axis and have different radial widths. In the preferred embodiment, the radial position, radial width and modulation depth of the radiation filters are individually optimized for a particular analytical function 28.asf. Modulator 22A also includes a number of timing marks at regular angular intervals 60 and one or more timing marks at non-regular angular intervals 61.

Preferably, the timing marks are reflective and the sources 78a, 78b and 78c and the photodetectors 79a, 79b and 79c are located on the same side of the modulator. In this manner, sources 78a, 78b and 78c and the photodetectors 79a, 79b and 79c can be mounted on the same PC board. Alternately, the substrate is transmissive to the timing beam and timing marks obstruct the timing beam or the substrate is opaque to the timing signal and timing marks are milled or etched through substrate. Therefore, the output of photodetector 79b may supply through a connection to computer 28 to mark the zero rotational angle mark 61, and 79a may supply through a connection to also mark the instances of the passage of each of the timing marks 60. Such instances may be utilized by computer 28 for the phase-sensitive sampling of the output from detector 26 as modulator 22 is rotated about rotation axis 40.

More preferably, timing marks 60 and 61 and optical switches 70 and 71 are replaced with a commercially available Incremental Rotary Encoder (IRE) mounted co-axially with modulator 22 along rotation axis 40. The synchronization of the signals from the IRE to the rotation of modulator 22 is described below.

Radiation Intensity Filters

In the preferred embodiment, the radiation filters of the present invention have modulation functions that are digitized approximations, or replicas (e.g., a halftone representation) of the functions $\sin^2(m\theta+p\pi/4)$, wherein m is an integer. Filter 50a, for example, is a digitized approximation of the modulation function $\sin^2(3\theta)$, filter 50b that of modulation function $\sin^2(5\theta)$, filter 50c that of $\sin^2(7\theta)$ and filter 50d that of $\sin^2(9\theta)$. As shown in FIG. 2, the reflectance or transmittance of each of the radiation filters 50a-50d varies as a distinct function of the rotational angle θ of modulator 22A around the rotational axis 40. At any given rotational angle of modulator 22A with respect to the target image 50, the amplitude of the modulated radiation is given by the fraction of radiation that is reflected by (or transmitted through) the non-contiguous radiation filter. As modulator 22A is rotated about axis 40 radiation component 52a is focused onto different portions of radiation filter 50a. Thus, as the modulator 22A is rotated, radiation component 52a is encoded by the angle-dependent reflectance of radiation filter 50a.

As shown in FIG. 2, active area 53a comprises the overlap of target image 52 and the annular region encompassing radiation filter 50a. The relative intensity of encoded component 56a (reflected or transmitted) is given by the ratio of the sum of the areas of the non-contiguous regions of 50a within 53a to the total area of 53a (appropriately weighted by the intensity distribution of radiation component 52a). If the width of the smallest non-contiguous region, the bit-region (i.e., pixel or dots), of 50a along the azimuthal axis, Θ, is equal to or less than one-half the width of target image along the azimuthal axis, the intensity of the incident radiation can be modulated with three substantially distinct levels of contrast as zero, one, or two adjacent bit-regions (forming a second non-contiguous region with twice the area of the bit-region) are moved under target image 52. This is analogous to a two-bit halftone, which has reflectance (or transmission) values of {0,0.5,1}. By using non-contiguous regions with smaller widths relative to the target image width the number of substantially distinct levels of contrast can be increased.

As shown in FIG. 2, radiation intensity filters 50a-50d of modulator 22A resemble concentric barcodes along the azimuthal axis, which are individually engineered to encode a section of target image 52 as a digitized approximation or replica (e.g., a halftone representation) of $\sin^2(m\theta)$ as modulator 22 is rotated about axis 40. Radiation filters 50a-50d comprise a plurality of non-contiguous regions having optical properties substantially different from substrate 23, including a number having a spatial extent along the azimuthal axis, Θ, which is substantially smaller the width of the target image 52 along the azimuthal axis. As shown in FIG. 2, the total number of non-contiguous regions comprising the radiation filters of the present invention is greater than the number of local maxima present in the substantially smooth function being replicated. For example, the function $\sin^2(m\theta)$ has 2m local maxima (i.e., where $\sin^2(m\theta)=1$) over the range $\{0,2\pi\}$, but the radiation filters of the best-mode of the present invention have a minimum of 4m non-contiguous regions of at least two different sizes, and with at least two different inter-region spacings, to provide a halftone representation of $\sin^2(m\theta)$ over the same interval. The number of levels of contrast or gray scale is substantially equal to one plus the ratio of the target image width to the width of the smallest non-contiguous region (e.g., the minimum feature size of the chosen lithography) along the azimuthal axis, Θ.

The modulation function of the filters on modulator 22A can change in both the radial and azimuthal directions. In the embodiment of FIG. 2, the modulation functions of the filters 50a-50d change only in the azimuthal direction and not in the radial direction. Each of the filters 50a-50d occupies a two-dimensional annular area having a substantially constant radial width. The radiation filters shown in FIG. 2 modulate the intensity of the incident radiation uniformly across the radial width of the encoding channel. As a result, the present invention is immune to modulation waveform distortion resulting from arbitrary radial intensity distributions. If the target image 52 is a dispersed image, the intensities of the spectral components encoded by filters 50a-50d are modulated independent of the bandwidth. If the target image 52 is an image of an extended source, the intensities of the spectral components encoded by filters 50a-50d are modulated independent of the spatial resolution (or field of view) along the axis of the extended source which is projected along the radial axis of modulator 22.

In another embodiment of the invention, the "barcode" like structures shown in 50a-50d, which are shown to extend continuously across the radial width of the radiation filter, are broken up to control the modulation depth and/or to increase the number of distinct levels of contrast available. This embodiment may be useful for improving orthogonality or to control the modulation depth on a channel-by-channel basis independent of the bandwidth (or field of view/field of illumination), which may be useful for balancing signal levels in systems where one or more channels have a disproportionately large fraction of the total incident radiation. Preferably, sequential "barcode" like structures in the radiation filter will be broken up in a "checker-board" like pattern to control the modulation depth and/or increase the number of available levels of contrast while substantially precluding waveform distortion (of an encoded component) resulting from arbitrary radial (and/or azimuthal) intensity distributions.

In the preferred embodiment, the radiation filters 50a-50d on modulator 22A comprise an annular region substantially encompassing a plurality of pixels having optical characteristics substantially different from the substrate. The pixels are patterned substantially within the annular region to modulate the intensity of a corresponding component predominantly along an azimuthal axis to provide an encoded component, wherein the amplitude of the encoded component changes between three or more substantially distinct levels of contrast as the substrate is rotated about rotation axis 40. Instead of using a substrate with low reflectivity or transmission and a patterned layer of high reflectively material on the substrate as described above, (or forming patterned transmissive areas in an opaque substrate), the radiation filters may be constructed in a different manner. Thus a substrate with moderate reflectivity or transmission may be employed instead. Then in areas of the filters requiring high reflectivity or transmission, an area having such characteristics is formed (by deposit of a reflective layer or formation of transmissive area), and a layer of low reflectivity or opaque material may be deposited in areas of the filter calling for such characteristics.

Instead of using patterns of alternating high and low reflectance or transmission, it is also possible to construct the modulators with substantially orthogonal modulation functions that are not digitized but are "analog" in nature. Thus neutral density filters may be used for this purpose, where the filters are formed by sputtering a radiation reflective material onto a non-reflective or transparent substrate. Depending on the thickness of the material sputtered (or the doping concentration in one or more semiconductor substrate layers; e.g., Si, Ge, GaAs), the amount of transmission or reflection can be controlled to achieve a substantially continuous and smooth intensity modulation function. In this embodiment, the radiation filters have substantially continuously variable optical characteristics along an azimuthal axis, and the optical characteristics are continuously varied to modulate the intensity of a corresponding component as a substantially smooth function of a rotation angle of the modulator about the rotation axis.

Figure 3A:
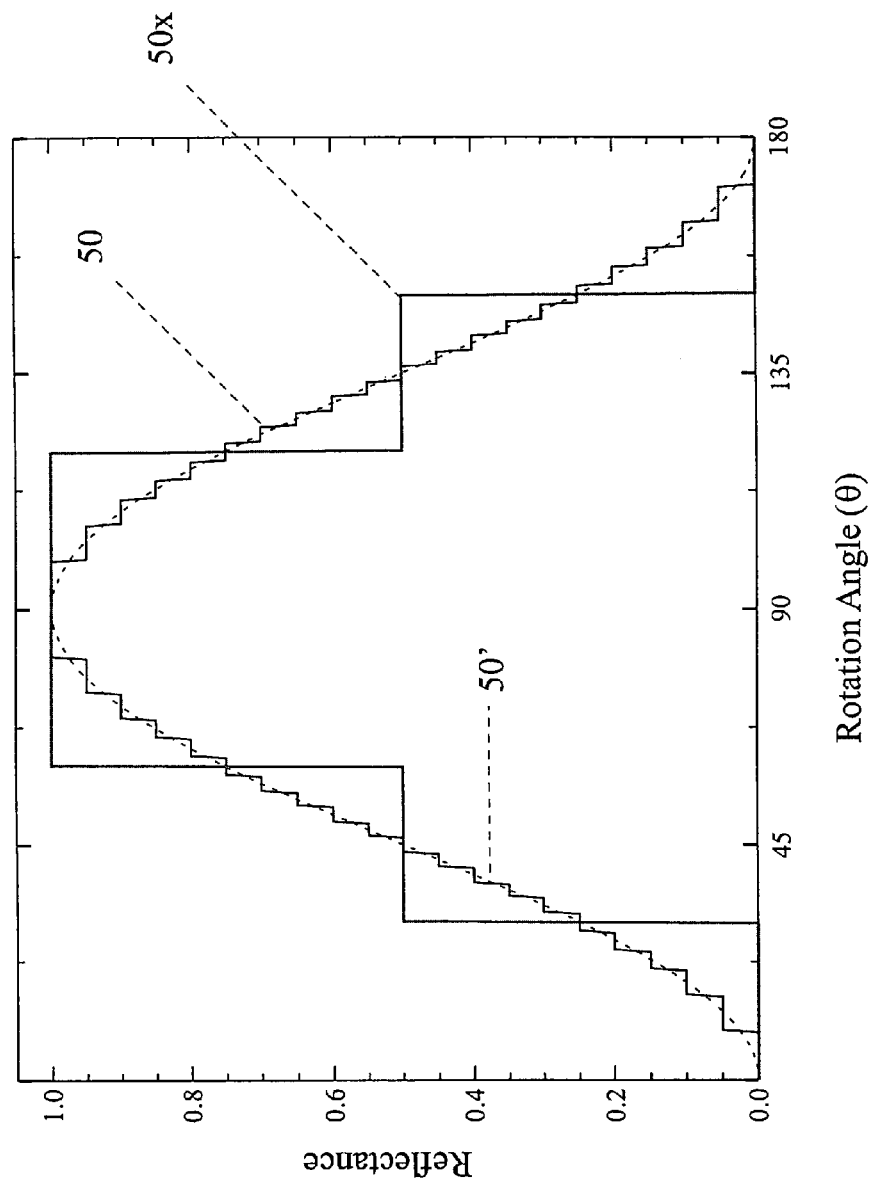
FIG. 3A is a graphical plot of a digitized replica of a smooth modulation function illustrating one embodiment one of the radiation filters of FIG. 2.

FIG. 3A illustrates one possible digitized approximation 51 to the $\sin^2(m\theta+p\pi/4)$ function with m=1 and p=0 which is obtained by rounding $\sin^2(\theta)$ up or down using 20 levels of contrast or gray scale. Also shown is the digitized approximation to the $\sin^2\theta$ with three levels of gray scale, 51x. In general, the more levels of gray scale the closer is the digitized approximation to the idealized modulation function $\sin^2(\theta)$ which is shown in dotted line 50'. Obviously, other digitized approximations of the idealized function 50' may be employed and are within the scope of the invention. The digitized approximations are adequate when it is possible to differentiate the contribution to the detector signal caused by the various encoded components without having to solve a simultaneous system of equations, and may include a small but finite number of corrections to compensate for the effects of digitization.

Figure 3B:
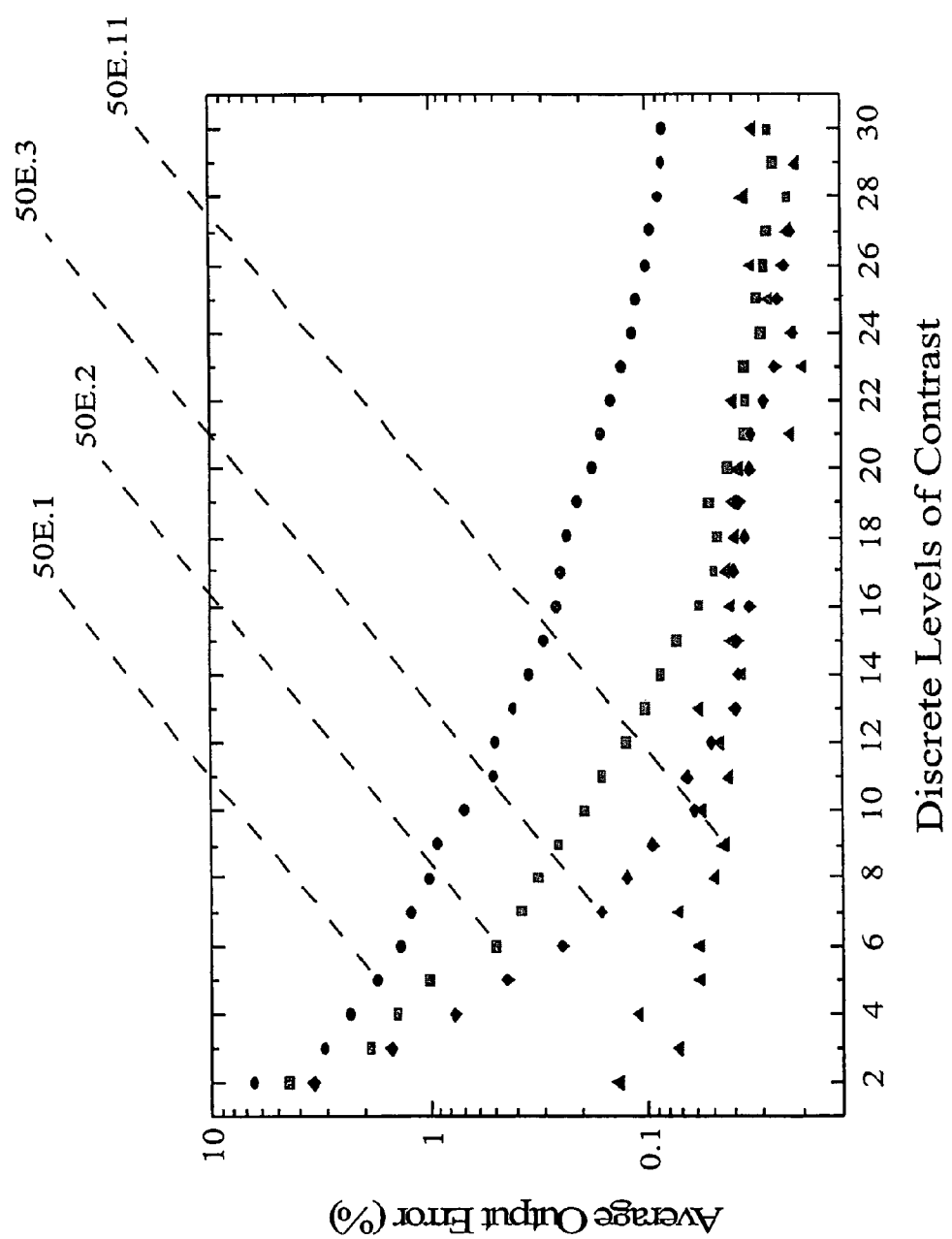
FIG. 3B is a plot showing the effects of finite digitization on the nominally orthogonal amplitude wavefunctions.

FIG. 3B is a plot showing the effects of finite digitization on the nominally orthogonal amplitude wavefunctions, $\sin^2(m\theta+p\pi/4)$. The data points were obtained for a twenty-five channel system, where p=0, and m=1-25. A difference in the decoded amplitudes is defined by normalizing the twenty-five amplitudes to unity, decoding the amplitudes a first time, and then varying the amplitude of a single channel and decoding the amplitudes a second time. The average output error is given by the sum of the absolute difference in the first and second decoded amplitudes divided by the number of channels. In the figure, 50E.1, 50E.2 and 50E.3 are the resulting errors for varying the amplitude of the fundamental, m=1, the first harmonic, m=2, and the second harmonic, m=3 by +/−100%. The error for varying the amplitude of the m=11 term is also shown by 50E.11. The figure clearly illustrates the effects of finite digitization on the orthogonality of the modulation wavefunctions. Low end applications may only need 3-10 levels of contrast to meet a given accuracy specification, but high-end systems, where a premium is placed on photometric accuracy, may need 100 or more levels of contrast. For the most demanding applications, the first-order amplitude correction described below may be used to correct the decoded amplitudes for the interference.

As noted above, many of the advantages of the invention stem from the fact that it is possible to choose filter modulation functions that retain the optimum 50% duty cycle and to decode the detector signal to obtain the respective amplitudes of two or more encoded components without having to solve a simultaneous system of equations. For many applications, this is possible where the modulation functions are roughly orthogonal. For some applications requiring very high accuracy, it may be useful to define substantial orthogonality as follows. The modulation functions of two radiation filters may be considered to be substantially orthogonal to each other when changing the amplitude of the first (second) encoded component by 100% results in an error in the decoded amplitude of the second (first) component of less than one part in 100 after applying the first-order amplitude correction as described below.

Target Images

Figure 4A:
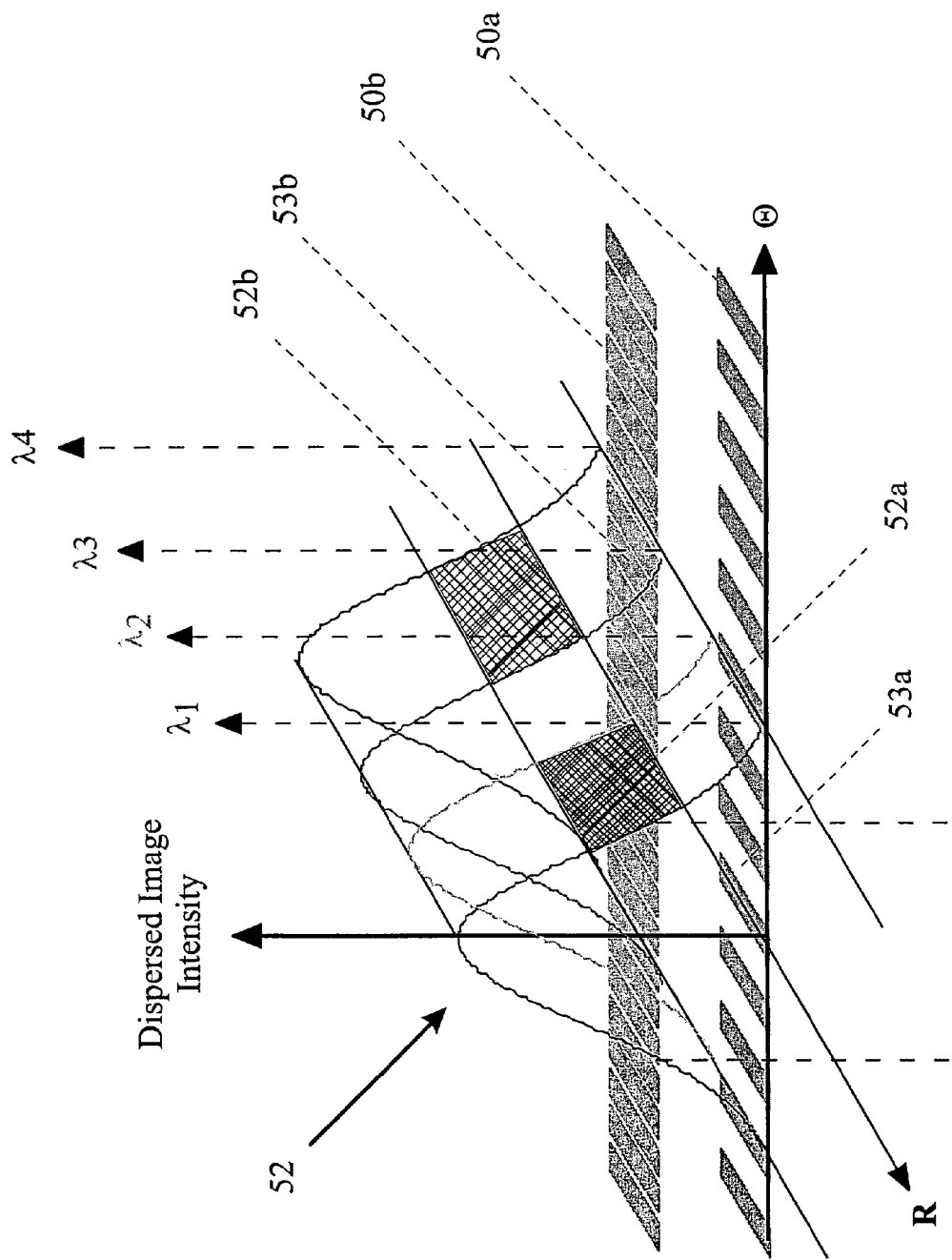
FIG. 4A is an illustration of the focal plane of the spectrum analyzer embodiment of analyzer 100 of FIG. 1A.
Figure 4B:
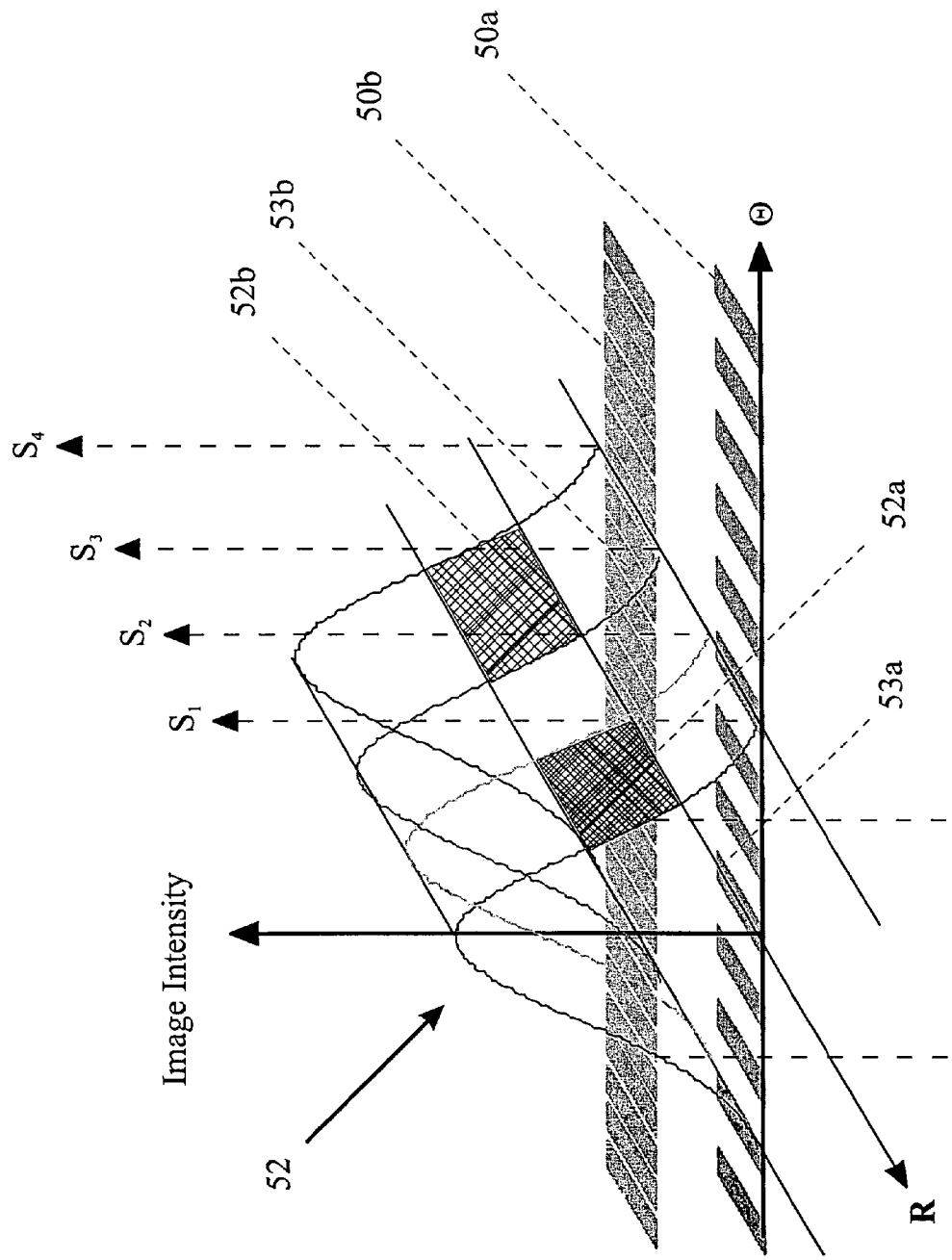
FIG. 4B is an illustration of the focal plane of the image analyzer embodiment of analyzer 100 of FIG. 1A.

FIG. 4A and FIG. 4B are illustrations of target image 52 which is formed by pre-encoder optic 36A of FIG. 1A onto modulator 22 to illustrate the invention. As noted above, the target image is either a dispersed image with different spectral components focused at different points along an encoding axis, or a extended image with different spatial components focused at different points along an encoding axis. For simplicity, only filters 50a and 50b of FIG. 2 are shown schematically in FIG. 4A and FIG. 4B. Preferably, as shown in FIG. 4, the encoding axis is substantially along the radial axis, R, of modulator 22. The target image width is defined as the spatial extent perpendicular to the encoding axis.

In FIG. 4A we illustrate the case where target image 52 is a dispersed image of a broadband or multiple wavelength source with its dispersion axis along the radial axis, R. Two different spectral components, 52a and 52b, which are encoded by modulator 22B, are shown by different cross-hatching in FIG. 4A. Spectral component 52a is characterized by a center wavelength $(\lambda_2+\lambda_1)/2$ and a bandwidth $(\lambda_2-\lambda_1)$. Similarly, spectral component 52b is characterized by a center wavelength $(\lambda_4+\lambda_3)/2$ and a bandwidth $(\lambda_4-\lambda_3)$. Examples of broadband or multiple wavelength radiation sources include blackbody radiators, incandescent lamps, light-emitting diodes, low-pressure gas lamps, optically, biologically or chemically excited samples, fluorescent-labeled beads dispersed in a fluid, dye lasers, semiconductor lasers, glass lasers, gas lasers, multi-wavelength optical fibers, hot gas and/or vapor streams, furnaces, plasmas, corona discharges, atomic emissions, and reflected or filtered sunlight.

In FIG. 4B we illustrate the case where target image 52 is an extended image (i.e., the image of an extended source). In this case we simplify identify 52a and 52b as two different spatial components of the extended source and S1 and S2 define the spatial boundaries (i.e., the field of view) of 52a, and $S_3$ and $S_4$ define the spatial boundaries (i.e., the field of view) of 52b. One example of an extended source is a collection of different samples which emit, scatter, transmit or reflect radiation in response to an excitation. In this case, the spatial components 52a and 52b correspond to the radiation emitted, scattered, transmitted or reflected by a particular sample in the collection. A second example of an extended source is a linear array of optical fibers. In this case, the spatial components 52a and 52b correspond to the radiation emitted or reflected by a particular fiber in the array. A third example of an extended source is radiation transmitted through a collection of bandpass filters and/or dichroic mirrors, a linear variable filter, or a collection of correlation radiometry cells. In this case, spatial components 52a and 52b correspond to radiation transmitted through or reflected from two different bandpass filters in the collection or two different portions of the linear variable filter (or two different correlation radiometry cells). A fourth example of an extended source is a collection of radiation sources, (e.g., a linear array light emitting diodes or laser diodes). In this case, the spatial components 52a and 52b correspond to the radiation emitted by the individual sources comprising the collection. A fifth example of an extended source is one or more excitation sources combined with one or more refractive or reflective optical elements (e.g., a series of beam splitters) to produce a plurality of substantially identical sub-images. Other examples of extended sources include semiconductor wafers and circuits, mechanical assemblies, a multi-mode optical fiber, a multi-lane electrophoresis, an interference pattern (e.g., one or more excitation sources combined with a diffractive optic to produce multiple sub-images of each excitation source), and reflected or filtered sunlight collected over an extended area.

Decoding Algorithm

At any given rotation angle, the total signal incident on detector 26 in FIG. 1A is given by the sum of the sub-signals arising from the selected radiation components, 52a-52d, independently encoded by the angle-dependent reflectance of their corresponding radiation filters, 50a-50d, on modulator 22. In general, the radiation filters can be defined by specifying the values for m and p in the expression $\sin^2(m\theta+p\pi/4)$, where m is an integer or half-integer. Thus in general, the intensity of the encoded beam detected by detector 26 in FIG. 1A from a radiation modulator such as modulators 22A or other modulators described in this application can be given in general by the following equation:

$$S(\theta) = \sum_m \sum_p a_{m,p} \sin^2\left(m\theta + \frac{p\pi}{4}\right) \quad (1)$$

where $S(\theta)$ is the intensity detected by the detector 26, and the summations include all of the m and p values corresponding to the filters present in a given modulator design. In equation (1), $a_{m,p}$ is the amplitude of the encoded component that has been encoded by the radiation filter having a modulation function which is a digitized approximation or replica (e.g., a halftone representation) of $\sin^2(m\theta+p\pi/4)$. This invention permits one to retain the optimum 50% duty cycle and to determine the amplitudes of the encoded components without solving a simultaneous system of equations for encoding channels having arbitrary radial width and target images having arbitrary radial intensity distributions. In the summation process in equation (1), the filters present in a particular modulator may not include filters corresponding to all combinations of m and p values. This is exemplified in the modulator 22A of FIG. 2 where p takes on only the value 0, and in the modulator 22B of FIG. 5 where m takes on the value 3 throughout all the filters. In such event, the amplitude $a_{m,p}$ for filters that are not present in the modulator is simply 0. Preferable, decoding algorithm 28.dec is provided with a list of the m and p values patterned onto the modulator and the summation in equation (1) is restricted to the list. More preferably, the list is encoded onto the disc so that the correct list is always used by 28.dec to decode the detector signal.

As a further benefit, the present invention enables the use of generalized approaches for the modulator drive system, data acquisition and the decoding algorithms. For example, motorized spindle 42 is rotated at a roughly constant frequency (as opposed to being stepped), the detectors analog output is sampled by Analog-to-Digital Converter (ADC) 28.adc which is triggered by optical switch 70 in response to timing marks 60. Optical switch 71 responding to timing mark(s) at non-regular angular intervals 61, provides computer 28 with a reference of 0 degrees to synchronize the output of 28.adc with the decoding algorithm 28.dec. Hence, the decoding algorithm is compatible with any function defined in equation (1), and the number and identity {m,p} of the modulated components, and the specific analytic functions to be performed on the decoded data are defined in application specific software. Preferably, the list of {m,p} values corresponding to the radiation filters on the modulator are encoded onto the disc.

If p and q are integers, the trigonometric functions $\sin^2(m\theta+p\pi/4)$ obey the following orthonormal relation.

$$\int_0^{2\pi} d\theta \cos\left(2m\theta + \frac{p\pi}{2}\right)\sin^2\left(n\theta + \frac{q\pi}{4}\right) = -\frac{\pi}{2}\delta_{m,n}(\delta_{p,q} - \delta_{p,q\pm 2}) \quad (2)$$

The amplitudes $a_{m,p}$ of the encoded spectral components may be determined using the orthogonal properties of the trigonometric functions in accordance with equation (3) below:

$$a_{m,p} = -\frac{2}{\pi}\int_0^{2\pi} d\theta \cos\left(2m\theta + \frac{p\pi}{2}\right)S(\theta) \quad (3)$$

First-Order Amplitude Correction

One complication introduced by the use of digitized approximations or replicas of the trigonometric functions $\sin^2(m\theta+p\pi/4)$, is that the orthogonality described by equation (2) and used in equation (3) above is inexact. As a result, in some applications it may be necessary for the interference terms to be accounted for and the individual amplitudes corrected for the interference resulting from the other channels, which naturally leads to a series of successively higher-order correction terms:

$$a_{m,p} = a_{m,p}^{(0)} + a_{m,p}^{(1)} + \ldots \quad (4)$$

where the zero-order amplitude coefficients are determined from $$a_{m,p}^{(0)} = -\frac{2}{\pi}\int_0^{2\pi} d\theta \cos\left(2m\theta + \frac{p\pi}{2}\right)S(\theta) \quad (5)$$

The first-order amplitude correction is given by $$a_{m,p}^{(1)} = \sum_n \sum_q A_{m,p}^{n,q} a_{n,q}^{(0)} \qquad (6)$$

where it is understood that in the summation over patterned radiation filters, the term where n=m and q=p is excluded.

In equation (6), the matrix elements are determined by sequentially decreasing or enhancing the amplitudes of the $a_{n,q}$ and measuring the changes in $a_{m,p}^{(0)}$. For example, if we identify $\delta a_{m,p}^{(0)}$ as the observed change in $a_{m,p}^{(0)}$ resulting from $a_{m,p}^{(0)}$, the imposed change on $a_{n,q}^{(0)}$, the corresponding matrix element is given by $$A_{m,p}^{n,q} = \frac{\delta a_{m,p}^{(0)}}{\Delta a_{n,q}^{(0)}} \qquad (7)$$

Preferably, the imposed change on $a_{n,q}^{(0)}$ is facilitated by a movable mask having an aperture or obscuration which is comparable in size to the radial width of the radiation filters, where the mask is translated along the radial axis of modulator 22 such that the incident radiation is selectively transmitted or blocked from the radiation filters in sequence. For example, a disc with a SP1ral aperture or obscuration which is mounted in a plane parallel to modulator 22, directly above or below modulator 22, and is stepped about rotation axis 40. More preferably, the imposed change on $a_{n,q}^{(0)}$ is facilitated by a dedicated radiation source and detector, which are independently or collectively translated along the radial axis of modulator 22 such that the incident radiation is selectively modulated by the radiation filters in sequence. Most preferably, the beam size of the dedicated radiation source along the radial axis is substantially smaller than the radial width of the narrowest radiation filter on modulator 22. In this manner, the modulated components can be isolated from one another to more accurately determine their respective harmonic contents. Such a device for illuminating and/or isolating specific radiation filters can also be used to produce a known encoding signal for the Secondary Encoder Timing Signal Synchronization described below.

In practice, the integral shown in equation (5) is replaced with a discrete summation over M, the number of Data Acquisition (DAQ) events (or intervals, steps or cycles) per rotation. On start-up, a set of decoding coefficients (e.g., a trigonometric look-up table), is defined and initialized with the values of $\cos(2m\theta + p\pi/2)$ evaluated at the DAQ intervals for rotation $$T_{m,p}^j \equiv -\frac{2}{\pi M} \cos\left(\frac{4jm\pi}{M} + \frac{p\pi}{2}\right) \qquad (8)$$

The zeroth-order amplitude coefficients are given by a summation of the discrete signal measurements multiplied by the corresponding decoding coefficients $$a_{m,p}^{(0)} = \sum_{j=1}^{M} T_{m,p}^j S(j) \qquad (9)$$

where S(j) is the ADC reading from the detector at the jth DAQ step; i.e., the output from 28.adc. At the end of a complete rotation, the first-order amplitude corrections are evaluated if necessary for a given application:

$$a_{m,p}^{(1)} = \sum_n \sum_q A_{m,p}^{n,q} a_{n,q}^{(0)} \qquad (10)$$

where it is understood that the term in the summation where n=m and q=p is excluded. Note that if the amplitudes have not changed significantly since the last time the corrections were evaluated, the corrections need not be re-evaluated.

Transient Signal Detection

Preferably, computer 28 in FIG. 1 includes a Transient Signal Algorithm, 28.utl(TSA) to detect transients in the amplitudes of the encoded components that occur during a rotational period of modulator 22. More preferably, the computer will analyze the transient signal to determine its harmonic content. At each DAQ step j, 28.utl(TSA) subtracts the detector signal from one or more previous detector signals or the expected signal calculated using the last calculated zeroth-order amplitude coefficients defined by equation (9) above:

$$\Delta S^k(j) = S^k(j) - \left\{ \sum_m \sum_p a_{m,p}^{(k-1)} \sin^2\left(\frac{2jm\pi}{M} + \frac{p\pi}{4}\right) \right\} \qquad (11)$$

where $S^k(j)$ is the output from 28.adc (i.e., the detector signal) measured at the jth step on the kth rotational period and the $a_{m,p}^{(k-1)}$ are the zeroth-order amplitude coefficients calculated for the (k−1)th rotational period. The magnitude of $\Delta S^k(j)$ is used to detect amplitude transients in one or more encoded components that occur on a sub-rotational-period time scale. Preferably, when the magnitude of $\Delta S^k(j)$ exceeds a predefined threshold, 28.utl(TSA) directs the analyzers operating system to increase the speed of the motorized spindle 42, and when the magnitude of $\Delta S^k(j)$ drops below a second predefined threshold for a predefined extended period of time, 28.utl(TSA) directs the analyzers operating system to decrease the speed of the motorized spindle 42. In that way, the motorized spindle 42 can be run a slow as possible, thereby increasing the operating life. Most preferably, $\Delta S^k(j)$ is analyzed by 28.utl(TSA) over a sufficient number of DAQ cycles to determine its harmonic content, which in turn will be used as input by the decoding algorithm to compensate for the harmonic interference resulting from sub-period signal transients. Control of motorized spindle 42 may be accomplished by means of 28.utl(MCA) and 28.dac via a control signal line to motorized spindle 42.

Modulator Patterns

Figure 5:
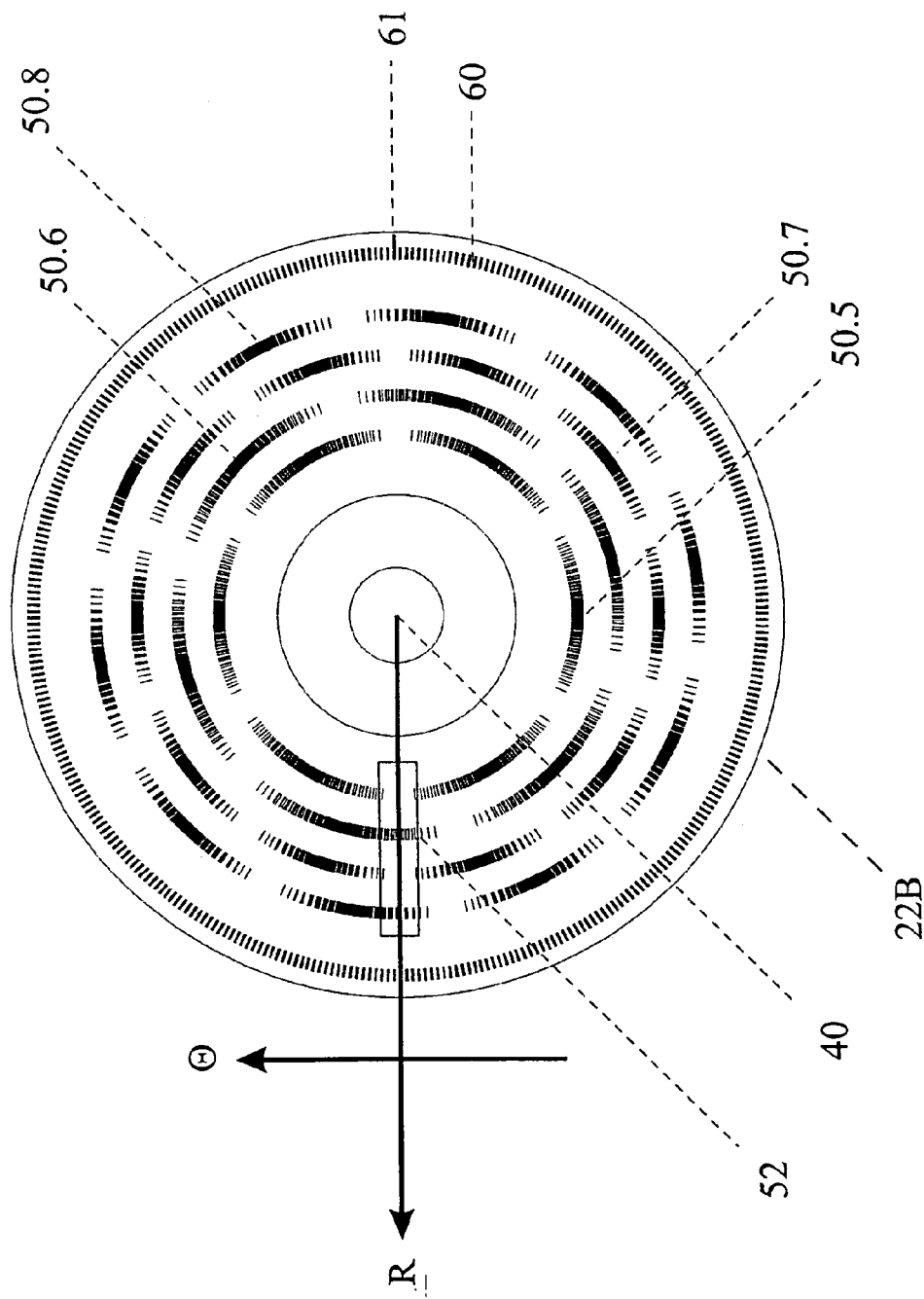
FIG. 5 is a top view of embodiment 22B of modulator 22, suitable for use in analyzer 100 of FIG. 1 to illustrate an embodiment of the invention.

FIG. 5 is a top view of a radiation modulator 22B to illustrate another aspect of the invention. Modulator 22B is provided with four radiation filters 50.5, 50.6, 50.7 and 50.8, where the modulation functions of the four filters are all digitized approximations of the function of the general form $\sin^2(m\theta + p\pi/4)$ described above in reference to modulator 22A of FIG. 2. In modulator 22B of FIG. 5, radiation filters 50.5 and 50.6 both have m values of 3, but p values of 0 and 1, respectively. Similarly, filters 50.7 and 50.8 both have m values of 5, but p values of 0 and 1, respectively. By inspection of the orthogonality relation defined in equation (2), it is clear that all four radiation filters on modulator 22B are substantially orthogonal to one another. The highest harmonic (m value) that can be patterned on modulator 22 is governed by the width of target image 52 along the azimuthal axis and the circumference of modulator 22 at the chosen radius. By using filter pairs with the same m values but having p values that differ by an odd integer, the number of orthogonal filters up to any given harmonic can be doubled.

Figure 6:
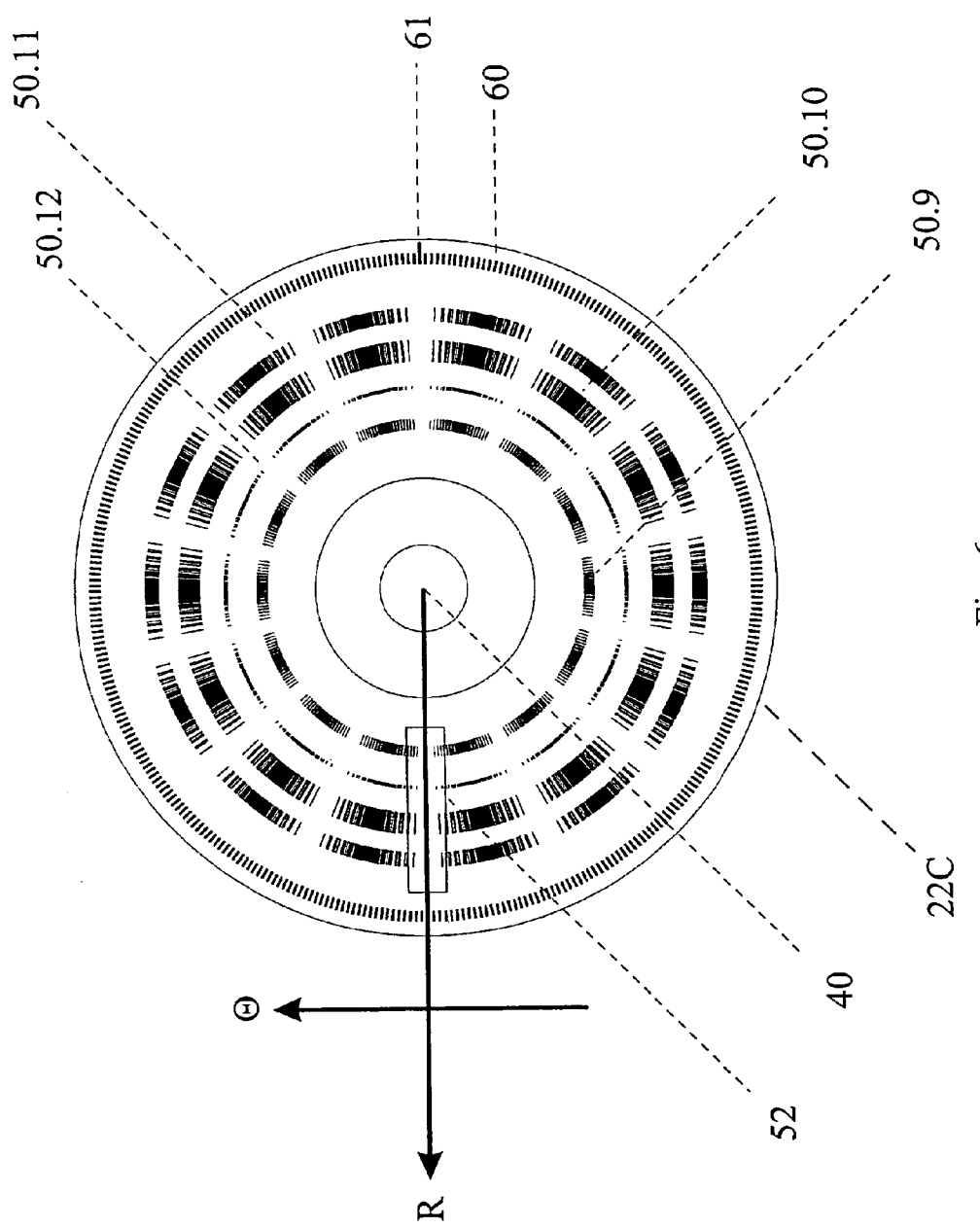
FIG. 6 is a top view of embodiment 22C of modulator 22, suitable for use in analyzer 100 of FIG. 1 to illustrate an embodiment of the invention.

FIG. 6 is a top view of a radiation modulator 22C to illustrate another aspect of the invention. Modulator 22C is patterned with four radiation filters, 50.9, 50.10, 50.11 and 50.12, having the same modulation function (i.e., $\sin^2(m\theta+p\pi/4)$ with identical m and p values), but located at different radii from the rotational axis 40 and separated from one another for encoding different radiation components. In this manner, groups of non-contiguous radiation components can be collectively modulated to enhance the signal-to-noise ratio of the analyzer.

Figure 7:
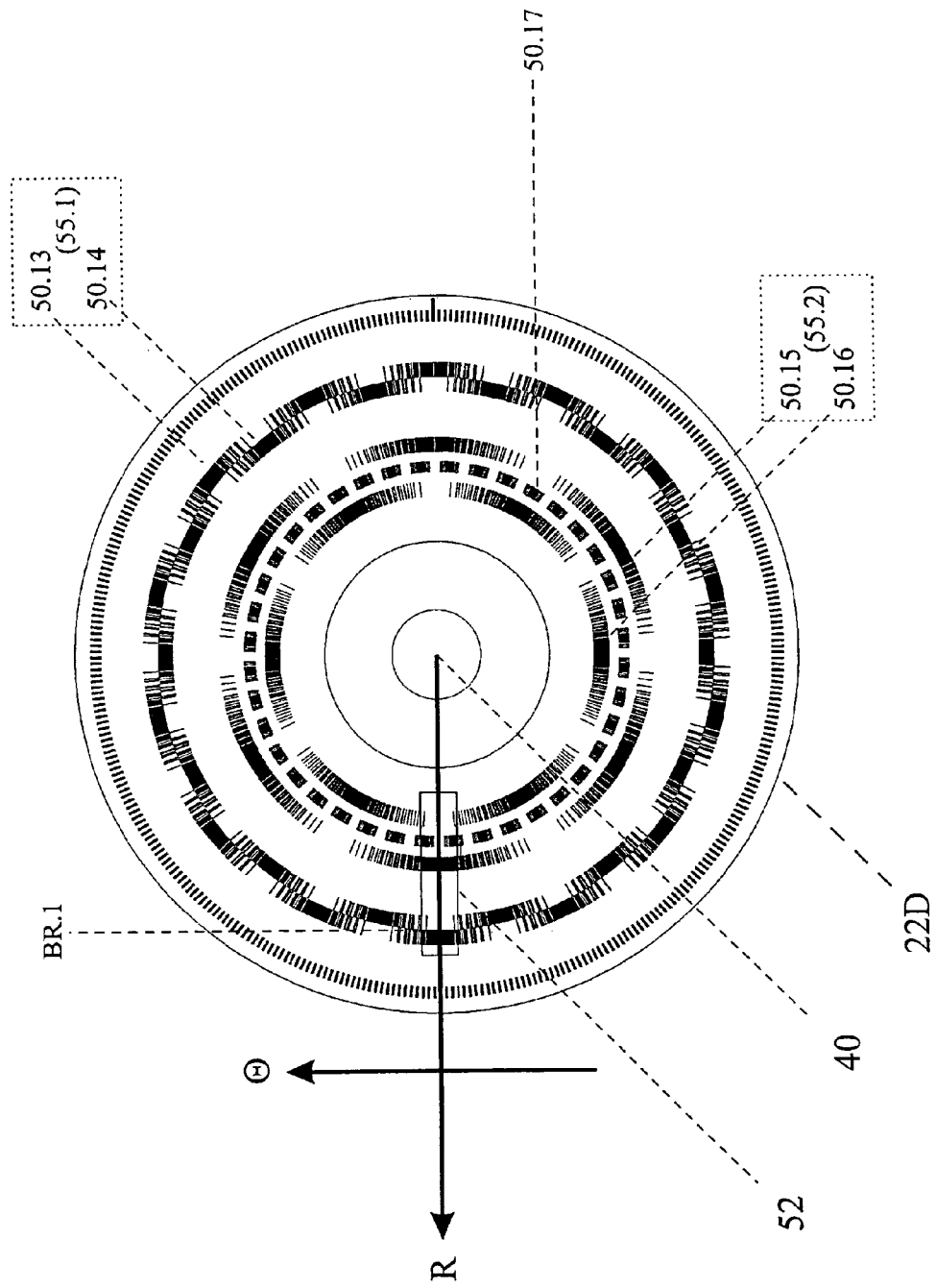
FIG. 7 is a top view of embodiment 22D of modulator 22, suitable for use in analyzer 100 of FIG. 1 to illustrate an embodiment of the invention.

FIG. 7 is a top view of a radiation modulator 22D to illustrate another aspect of the invention. Modulator 22D is patterned with two radiation filter pairs, 55.1 comprising radiation filters {50.13,50.14}, and 55.2 comprising radiation filters {50.15,50.16}, and a single non-paired radiation filter 50.17. In modulator 22D, filter pairs 55.1 and 55.2 are designed to measure the difference in radiation intensity incident on the two filters comprising the pair, {50.13,50.14} and {50.15,50.16}, respectively. The modulation functions of the filters comprising each filter pair are complementary or out of phase so that the amplitude and phase of the encoded component are determined by the relative proportion of radiation incident on the two filters. In modulator 22D, the modulation functions of the filters are all digitized approximations of the general form $\sin^2(m\theta+p\pi/4)$. For modulation functions of the form $\sin^2(m\theta+p\pi/4)$, the complementary configuration is where both filters comprising the pair have the same m value, but different p values, where the difference in p values is an even integer.

In reference to 55.1 of FIG. 7, filters 50.13 and 50.14 are adjacent to one another. In this manner, the resulting signal from 55.1 is substantially equivalent to the derivative of the intensity distribution with respect to radial position evaluated at the border radius, BR.1. In one embodiment, the amplitude of the encoded component resulting from filter pair 50.17 is nulled or zeroed by balancing the intensity of the radiation which is incident on 50.13 and 50.14.

In reference to 55.2 in FIG. 7, filters 50.15 and 50.16 are separated from one another along the radial axis. The amplitude and phase of the resulting encoded component is determined by the relative proportion of the radiation incident on the two filters. In this manner, the difference in intensity of two radiation components which are separated along the radial axis can be measured directly. In many applications, analytical function 28.asf normalizes one or more intensity differences by a corresponding absolute intensity. In modulator 22D, filter 50.17 is designed to provide the absolute intensity at the midpoint between 50.15 and 50.16. The modulation frequency (m value) of 50.17 is chosen to be much higher than the modulation frequency of 55.2 so that the signal originating from 50.17 can be filtered out using an appropriate electronic bandpass filter 28.bpf between the detector 26 and the analog to digital converter 28.adc. Preferably, the electronic bandpass filter 28.bpf in FIG. 1 has a programmable passband such that the signal originating from 50.17 can be switched in and out of the signal path to 28.adc as needed. In this manner, the absolute intensity of radiation encoded by filter 50.17 can be measured during a calibration cycle and subsequently, used to normalize the intensity difference encoded by complementary pair 55.2 (e.g., to enhance the instruments speed, resolution, and/or preserve the dynamic range of 28.adc). In the alternative, the signal from detector 26 can be split into two signal paths with different electronic bandpass filter, and a first ADC can be used to measure the component encoded by 55.2 and a second ADC can be used to measure the component encoded by 50.17.

Figure 8:
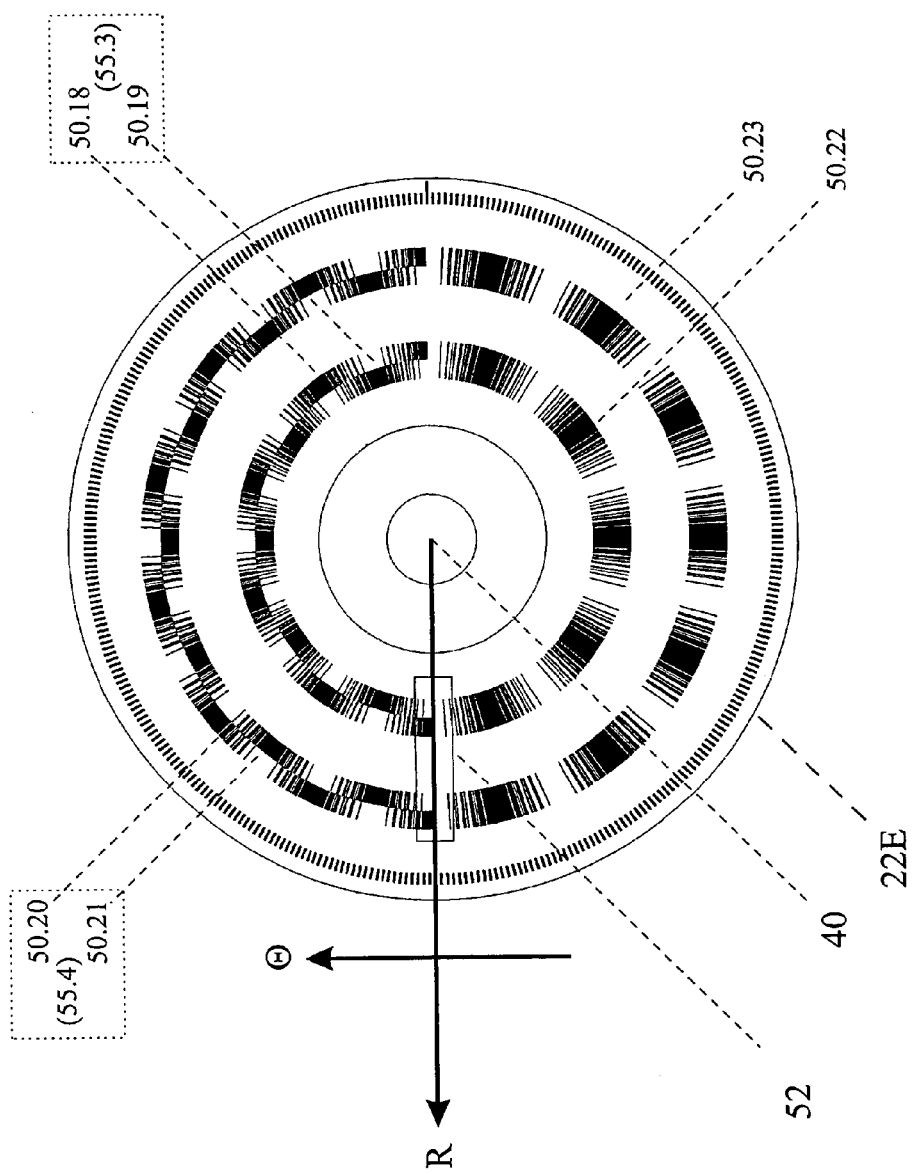
FIG. 8 is a top view of embodiment 22E of modulator 22, suitable for use in analyzer 100 of FIG. 1 to illustrate an embodiment of the invention.

FIG. 8 is a top view of a radiation modulator 22E to illustrate another aspect of the invention. Modulator 22E is provided with two radiation filter pairs, 55.3 and 55.4, for measuring the difference in the radiation intensity incident on the two filters comprising the pair. Modulator 22E is also provided with two non-paired radiation filters, 50.22 and 50.23, for measuring the sum of the radiation intensity incident on the annular region encompassing 55.3 and 55.4, respectively. The encoded components resulting from 55.3 and 55.4 are orthogonal to one another, and the encoded components resulting from 50.22 and 50.23 are also orthogonal to one another. In FIG. 8, 55.3 and 50.22 occupy different annular segments of the same annular region, with 55.3 occupying the upper half of modulator 22E (i.e., the annular segment between 0 and 180 degrees), and 50.22 occupying the lower half of modulator 22E (i.e., the annular segment between 180 and 360 degrees). Similarly, 55.4 and 50.23 occupy different annular segments of the same annular region, with 55.4 occupying the upper half of the modulator 22E and 50.23 occupying the lower half of the modulator. As modulator 22E is rotated counter-clockwise, the target image 52 is encoded by 55.3 and 55.4 for the first half period of rotation and by 50.22 and 50.23 for the second half period of rotation. Preferably, computer 28 uses sub-signal separator algorithm 28.sss to separate the detector signal into two sub-signals corresponding to {55.3,55.4} and {50.22,50.23}, respectively. These two sub-signals would be processed by decoding algorithm 28.dec to determine the amplitudes of the encoded components. More preferably, the two filter pairs (55.3 and 55.4) and the two non-paired radiation filters (50.22 and 50.23) are each encoded with unique encoding functions to provide four substantially orthogonal encoded components with 25% duty cycles. In this manner, both the derivative of the intensity distribution with respect to radial position evaluated at the border radius and the total intensity of each encoded radiation component can be measured substantially simultaneously. Modulator 22E incorporates a special case of modulation functions based on one or more incomplete rotation periods of modulator 22 (see description below).

The configuration of the annular regions, annular segments, and the radiation filters and filter pairs of modulator 22E where chosen for illustrative purposes, and are not meant to limit the scope of the invention. Other configurations that contain different annular regions, different annular segments, different radial positions, and/or radial widths for the radiation filters and filter pairs are within the scope of the invention.

Alignment Calibration and Tracking Analyzer

Figure 9A:
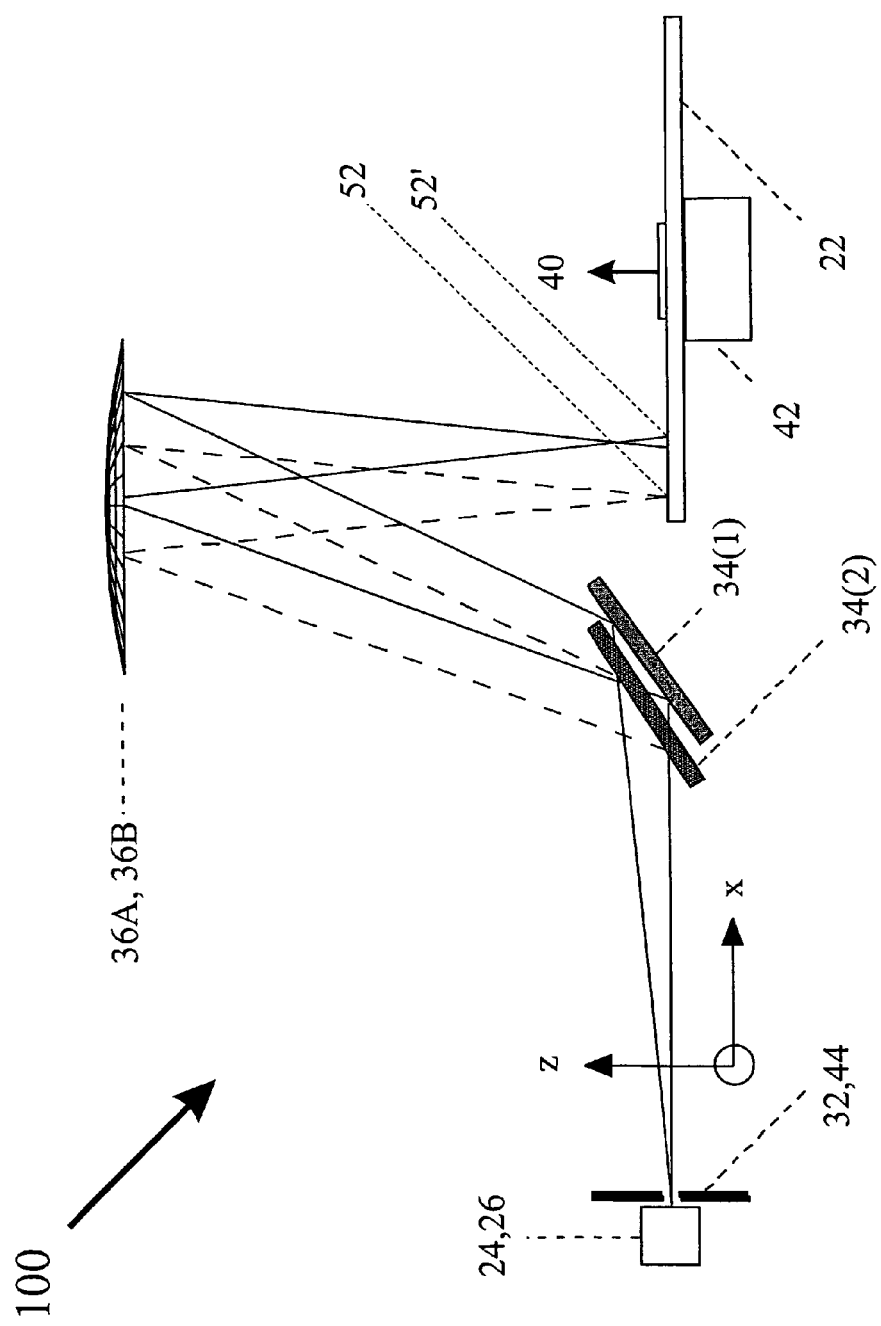
FIG. 9A is a schematic view of analyzer 100 that includes a folding mirror whose position is moveable to illustrate a preferred embodiment of the invention.

FIG. 9A is a schematic illustration of the effect of moving one or more elements of pre-encoder optic 36A on the focus and position of target image 52 on modulator 22. For brevity we define the "alignment of target image 52 onto modulator 22" to include both i) the focus of target image 52 onto the surface of substrate 23, and ii) the position of target image 52 onto modulator 22. Thus, as shown in FIG. 9A, when folding mirror 34 is in position 34(1), target image 52' is not properly aligned, but when folding mirror 34 is in position 34(2), target image 52 is properly aligned on the surface of modulator 22. An unwanted change in the alignment of target image 52 on the surface of modulator 22 can be caused by expansions or contractions of the various components and mounting fixtures of 36A in response to changes in ambient temperature. Another cause for the misalignment of target image 52 on the surface of modulator 22 is the change in modulator radius as a function of temperature.

In another embodiment of analyzer 100, Alignment Calibration and Tracking Analyzer, the position of one or more optical elements may be controlled to correct alignment errors in the system. For this purpose, the folding mirror 34 is mounted on a movable stage. Preferably, the movable stage controlled by one or more actuators driven by 28.dac for moving the folding mirror to position 34(2), so that target image 52 is properly aligned on modulator 22.

Figure 9B:
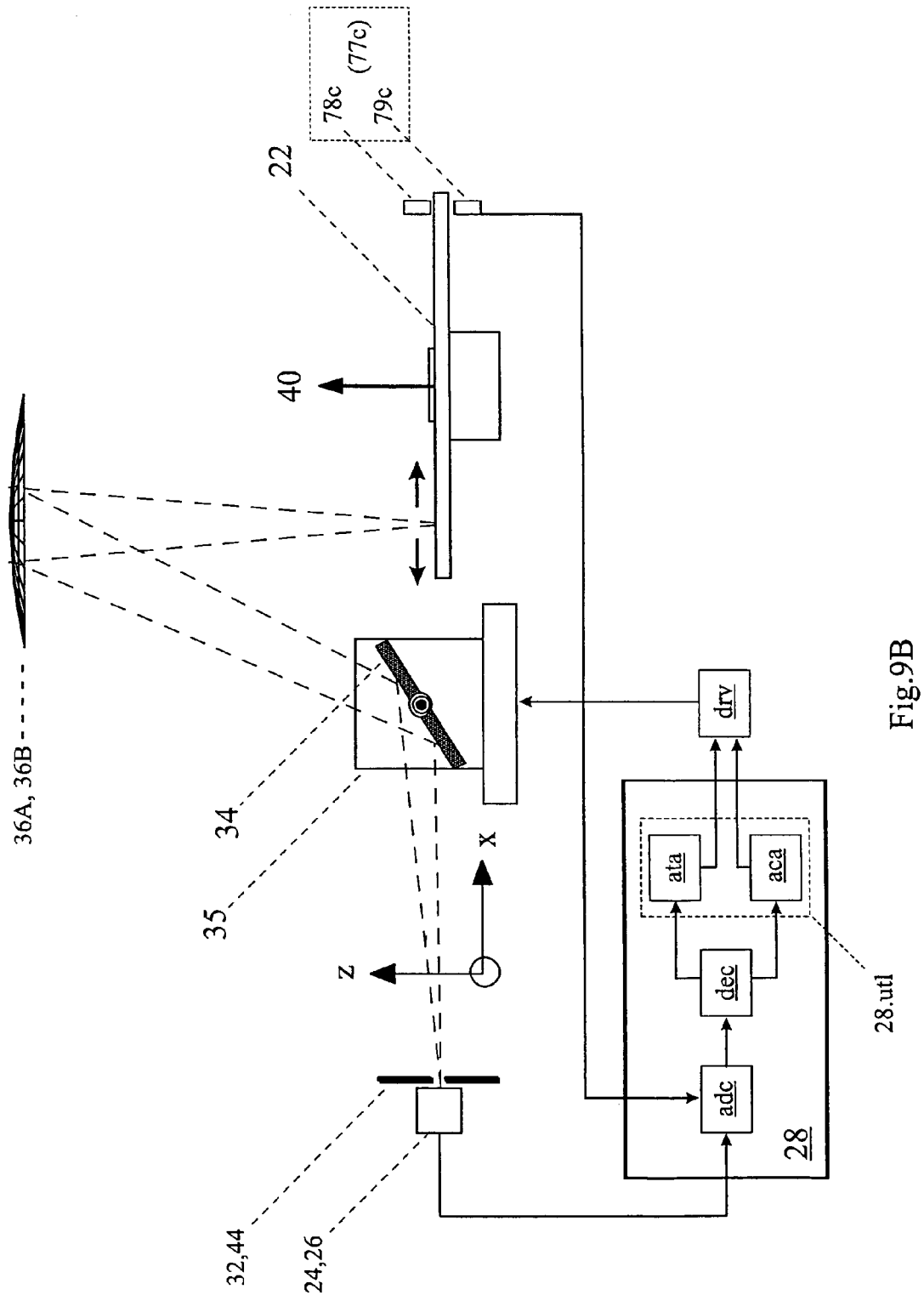
FIG. 9B is a schematic side view of the Alignment Calibration and Tracking Analyzer embodiment of analyzer 100.

FIG. 9B is a schematic view of Alignment Calibration and Tracking Analyzer where the position of folding mirror 34 is controlled by movable stage 35. Preferably, movable stage 35 incorporates one or more actuators to translate folding mirror 34 along one or more axes. More preferably, movable stage 35 incorporates two or more actuators to translate and/or rotate folding mirror 34 along and/or about one or more axes. In this manner, with appropriate control signals, moveable stage 35 can be used to position folding mirror 34 in order to properly align target image 52 onto modulator 22.

The Alignment Calibration Mechanism comprises the decoded amplitudes and phases of one or more alignment components (or channels), Alignment Calibration Algorithm 28.utl(ACA), one or more calibration curves relating the decoded amplitudes to the alignment of target image 52 on modulator 22, digital-to-analog converter 28.dac, voltage-controlled movable stage 35, and folding mirror 34.

The Alignment Tracking Mechanism comprises timing marks 60, and 61 and/or alignment marks 62, alignment probe 72, Alignment Tracking Algorithm 28.utl(ATA), hardware driver 28.drv, movable stage 35, and folding mirror 34. Preferably, folding mirror 34 is mounted on moveable stage 35 that incorporates one or more actuators to position folding mirror 34 to properly align target image 52 onto modulator 22.

The input for alignment tracking algorithm 28.utl(ATA) is the output of alignment probe 72 in response to timing/location marks 60, 61, and/or 62 (or more preferably, one or more complementary filter pairs described below), and the rotation of modulator 22. The alignment tracking algorithm 28.utl (ATA) analyzes the output of alignment probe 72 to detect spindle wobble, vibration or a misaligned modulator 22 on substrate 23. Preferably, alignment tracking algorithm 28.utl (ATA) generates (or calculates) one or more tracking coefficients which are then used by application specific function 28.asf to compensate for the detected spindle wobble, vibration or a misaligned modulator 22 on substrate 23. More preferably, alignment tracking algorithm 28.utl(ATA) generates a control signal for movable stage 35 to dynamically position fold mirror 34 (and/or other optical elements) to keep target image 52 properly aligned. Most preferably, the output of 28.utl(ATA) can be used to provide feedback to an assembly technician during the manufacturing process. In this manner, the concentricity of the encoding pattern on modulator 22 with respect to axis of rotation 40 may be optimized to the point where subsequent alignment tracking becomes unnecessary for a given application.

Figure 9C:
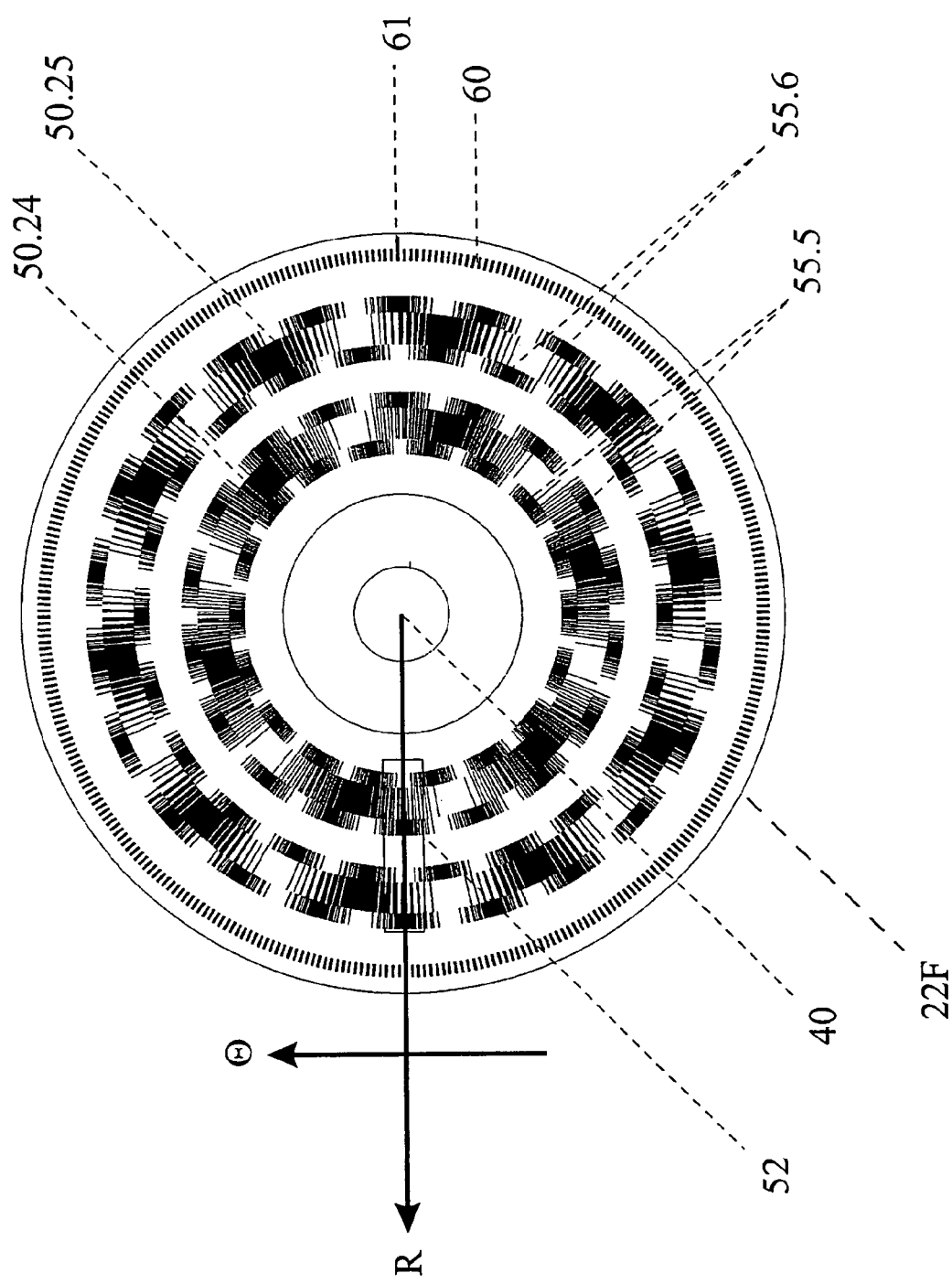
FIG. 9C is a top view of embodiment 22F of modulator 22, for use in the Alignment Calibration and Tracking Analyzer embodiment of analyzer 100.

The input for alignment calibration algorithm 28.utl(ACA) is the decoded amplitudes of one or more alignment components. Dedicated filters and complementary filter pairs organized into one or more alignment channels can be used in the analyzer depicted in FIG. 9 for alignment purposes. FIG. 9C illustrates one possible embodiment of modulator 22 with radiation filters and filter pairs comprising two signal channels and two alignment channels. In modulator 22F, the radial position of radiation filter 50.24 and 50.25 correspond to the nominal radial position of two expected alignment components in target image 52. Examples of alignment components include: the sub-images of two or more discrete fluorescent samples, dedicated reference fibers in an optical fiber array, dispersed or filtered spectral features of a sample, and dispersed or filtered spectral features in one or more optical elements (e.g., the edge of a filter). Radiation filters 50.24 and 50.25 are bounded by radiation filter pairs 55.5 and 55.6, respectively. Radiation filter pairs 55.5 and 55.6 are comprised of radiation filters with complementary (e.g., 180 degrees out of phase) modulation functions so that the amplitude and phase of the resulting encoded alignment component is determined by the relative proportion of radiation incident on the two filters. Preferably, the position and radial width of the filters comprising 55.5 and 55.6 are engineered to produce a characteristic amplitude and phase in the two encoded alignment components when target image 52 is properly aligned on modulator 22F. Most preferably, when target image 52 is properly aligned the intensity distributions across 55.5 and 55.6 zeros the amplitude of the encoded alignment components. Any error in the alignment of target image 52 results in a characteristic amplitude and phase in one or more of the encoded alignment components. In this manner, a the signals in 55.5 and 55.6 provide calibration data on the magnitude and direction of the focus error and position error of target image 52 on substrate 23 and modulator 22F, respectively. Preferably, one or more calibration curves are generated by precisely detuning the focus and position of target image 52 onto substrate 23 and modulator 22F, respectively, (e.g., using movable stage 35) and recording the resulting amplitude and phase of the encoded alignment components. More preferably, alignment calibration algorithm 28.utl(ACA) inputs the amplitudes and phases of the current alignment components and uses the calibration curves to generate one or more calibration coefficients which are then used by application specific function 28.asf to compensate for the effects of the alignment error. Most preferably, 28.utl(ACA) compares the current alignment to the calibration curves to generate a control signal for moveable stage 35 to position fold mirror 34 (and/or other optical elements) to keep target image 52 properly aligned. The output of the alignment calibration algorithm 28.utl(ACA) can also be used to provide feedback to an assembly technician during the manufacturing process. A proper alignment of target image 52 along the azimuthal axis of modulator 22 can be obtained by simply maximizing the amplitude of the encoded components resulting from 50.24 and 50.25.

The shared components of the Alignment Calibration Mechanism and the Alignment Tracking Mechanism shown in FIG. 9B were chosen for illustrative purposes and are not meant to limit the scope of the invention. Other configurations which utilize independent (or multiple independent) input sources, hardware drivers, movable stages, actuators, and optical components are within the scope of the invention. In the preceding description, folding mirror 34 was chosen for illustrative purposes, it being understood that the position of other optical elements, including various combinations of entrance aperture 32, exit aperture 44, pre-encoder optic 36A, post-encoder optic 36B, detector 26, and modulator 22, could be controlled for alignment purposes, and are within the scope of the invention. The radiation filters used in modulator 22F were chosen for illustrative purposes, it being understood that other filter pair and filter combinations are useful for alignment purposes and are within the scope of the invention. In particular, various aspects of the modulators 22D and 22E shown in FIG. 7 and FIG. 8, respectively are useful for alignment purposes. The calibration and alignment mechanisms described above are applicable to all of the embodiments of the present invention.

Interlaced Excitation Analyzer 300

In some applications, it may be desirable to measure a samples response to two or more different components of excitation radiation. Examples of components of excitation radiation include a collection of different lasers, a multi-line laser or low-pressure gas lamp combined with a diffractive or refractive optic to separate the emission lines, optical fibers, or lamp/filter combinations. Examples of samples include a multi-lane/multi-capillary electrophoresis, and a collection of distinct fluorescence emitting (or Raman scattering) samples arranged in a linear array. Such and other examples of excitation components and samples are within the scope of the invention. In some instances, it may also be desirable to measure a samples response to two or more different excitation components substantially simultaneously. For example, some samples are altered by the excitation radiation such that the results of a sequence of excitation/response measurements may differ depending upon the order of the applied excitation components. Another example is a sample that is flowing in a process stream (e.g., electrophoresis, flow cytometry, water, or natural gas) where the dwell time at the location of the measurement is insufficient to make the excitation measurements in series. Another example is the excitation analysis of samples undergoing chemical kinetics. The interlaced excitation analyzer described below, and shown in FIG. 10, permits the emitted, scattered, transmitted or reflected radiation from a sample in response to two or more different excitation components to be detected substantially simultaneously.

Figure 10A:
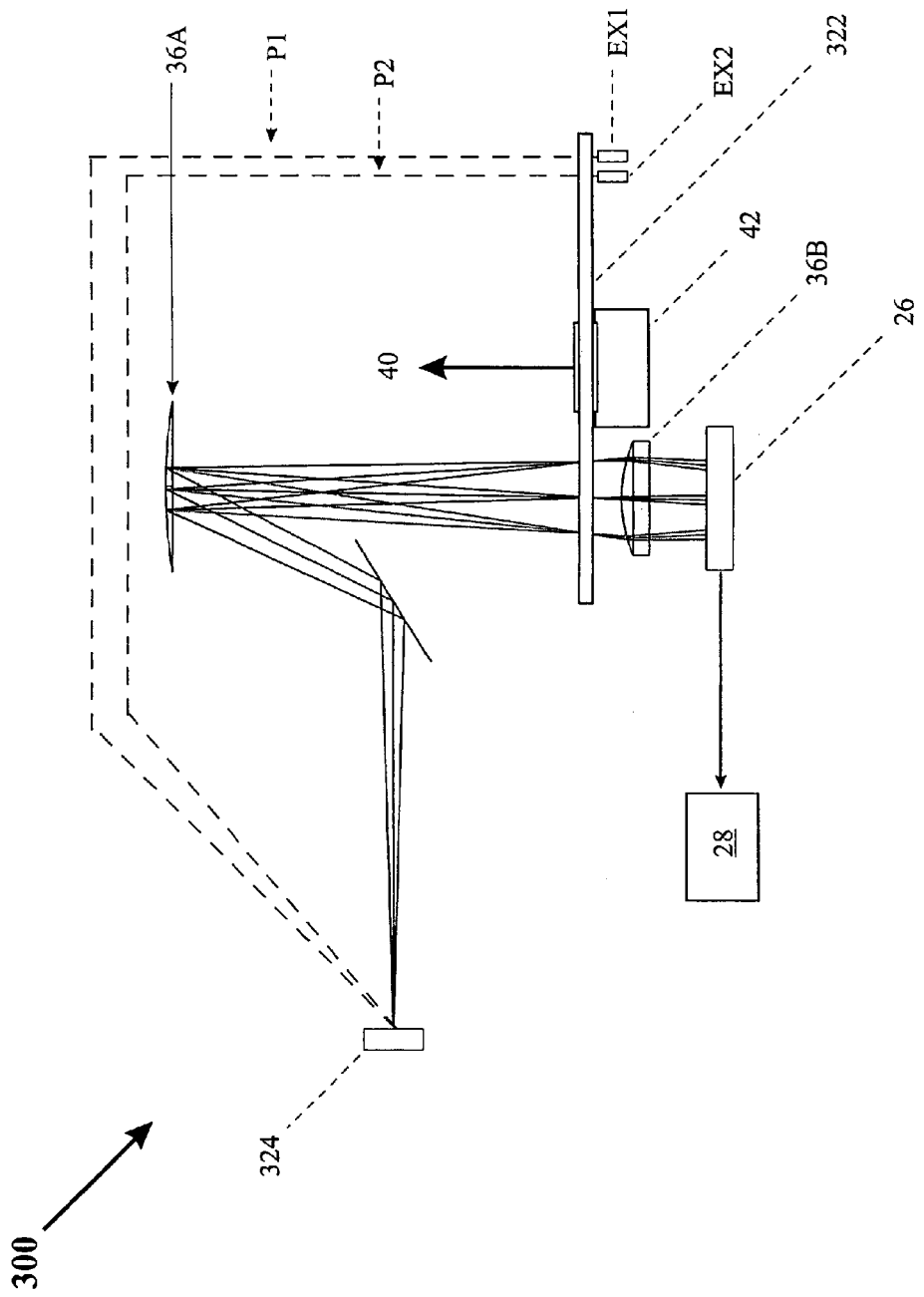
FIG. 10A is a schematic view of analyzer 300, useful for measuring the optical characteristics of a sample when excited by means of two distinct excitation sources.

FIG. 10A is a schematic view of analyzer 300, which comprises analyzer 100 of FIG. 1 and an interlacing mechanism to excite a radiation emitting sample with two or more distinct components of excitation radiation substantially simultaneously. In FIG. 10A, one or more excitation sources (not shown) provides excitation radiation comprising two distinct excitation components, EX1 and EX2. In analyzer 300, excitation components EX1 and EX2 are directed to sample 324 substantially in sequence (e.g., interlaced) along optical paths P1 and P2 as modulator 322 is rotated about rotation axis 340. Preferably, the excitation sequence substantially precludes more than one of the excitation components from reaching the sample 324 at any given time. Preferably, a variable attenuator may be used to precondition or preset the intensities of the excitation components. In response to the encoded excitation beam, sample 324 emits, transmits, reflects or scatters a response beam of radiation, which comprises at least two response components. The response beam is imaged by pre-encoder optic 36A to form a target image 352 with response components focused at substantially different points along the radial axis on modulator 322. Modulator 322 has at least two radiation filters at different radii from the rotation axis 340 for encoding the response components to provide an encoded response beam. Preferably, target image 352 is aligned with the radiation filters such that the encoded components have a substantially one to one correspondence with the response components. Preferably, the amplitudes of the encoded response components are substantially smooth functions or change between three or more substantially distinct levels of contrast as modulator 322 is rotated about the rotation axis 340. More preferably, the amplitudes of the encoded response components are substantially orthogonal to one another. Most preferably, the amplitudes of the encoded response components are all digitized approximations of the general form $\sin^2(m\theta+p\pi/4)$. The encoded response beam is collected, directed and focused by post-encoder optic 36B onto detector 26. In response to the encoded response beam, detector 26 provides an output to the analog-to-digital converter (ADC) 28.adc on computer 28. As shown in FIG. 1A, Computer 28 includes a sub-signal separator algorithm 28.sss, which is used by analyzer 300 to separate the time-based signal generated by detector 26 in response to the encoded response beam into two sub-signals which correspond to the encoded response beam resulting from EX1 or EX2, respectively. The sub-signals are then independently analyzed by decoding algorithm 28.dec to provide the amplitudes of the encoded response as a function of the excitation components.

If sample 324 is a single sample with a plurality of selected response components, analyzer 300 allows one to measure substantially the selected response components as a function of the excitation components substantially simultaneously. If sample 324 is a collection of samples and the response components are spatial components which also contain spectral information of interest (e.g., a multi-lane, multi-dye electrophoresis or multi-dye fluorescent assay), the spectral properties of the response components can be determined by inserting a spectrometer or other wavelength filtering device between optical element 36B and detector 26 and scanning the wavelength of the radiation transmitted to detector 26. More preferably, a spectrograph or other wavelength-separating device is used to direct a number of selected spectral components of the encoded beam to an equal number of detectors. Most preferably, computer 28 would include a sufficient number of analog-to-digital converters (ADCs) and decoding algorithms 28.dec such that the signals generated by the detectors in response to the encoded beam could be analyzed substantially simultaneously.

Figure 10B:
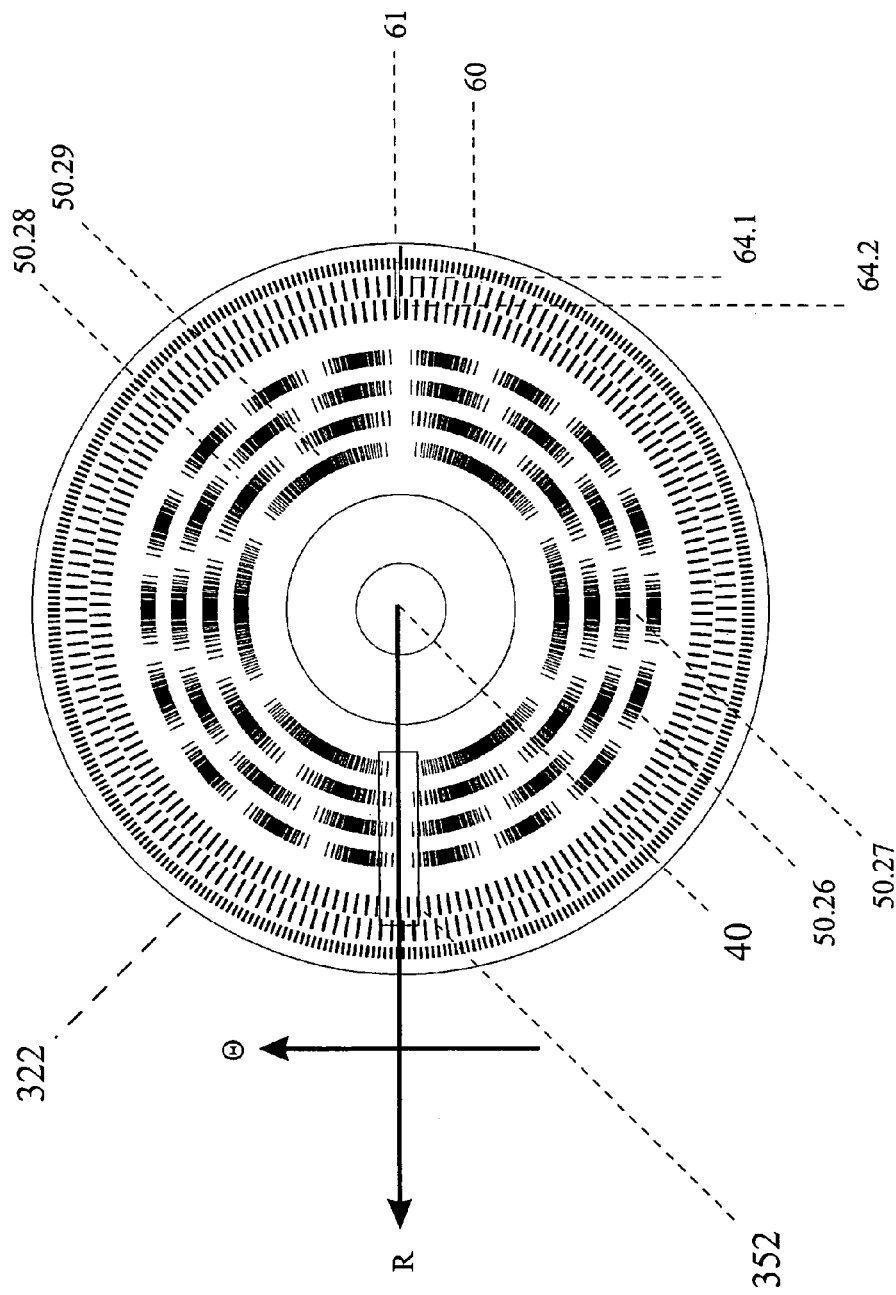
FIG. 10B is a top view of embodiment 322 of modulator 22, for use in analyzer 300 of FIG. 10A.

FIG. 10B illustrates one possible embodiment of modulator 22 for use with analyzer 300. Modulator 322 includes a series of staggered optical gates 64.1 and 64.2 centered at R1 and R2, respectively. 64.1 and 64.2 alternately permit the transmission of radiation components EX1 or EX2, such that radiation from only one of the excitation components is incident on the sample 324 at any given time. Preferably, the staggered optical gates have the same resolution as timing marks 60, where every other gate is open, and the relative phase of the open gates in the two annular regions are such that only one gate is open at a time. The gates may simply be transmissive areas in an opaque substrate or reflective areas in a non-reflective or transparent substrate. The response beam of radiation is collected and focused to form a target image 352 substantially along a radial axis of modulator 322 such that the response components are focused at substantially different points along the radial axis of modulator 322. The response components are encoded by the four spatial radiation filters, 50.26, 50.27, 50.28 and 50.29 on modulator 322 to provide an encoded response beam. Preferably, each of the modulation functions of 322 used to encode the response beam is a smooth function or a digitized replica of a smooth function having three or more distinct levels of contrast as modulator 322 is rotated about rotation axis 340. More preferably, the amplitudes of the encoded response components are substantially orthogonal to one another. Most preferably, the encoded response components are modulated substantially according to functions of the form $\sin^2(m\theta+p\pi/4)$.

In FIG. 10A and FIG. 10B, the optical geometry and the number of excitation components and encoding radiation filters was chosen for clarity, it being understood that arbitrary numbers of excitation components and radiation filters are within the scope of the invention. Other optical geometries which involve separate, more elaborate optical elements or optical system to collect and focus the input radiation onto modulator 322 and to collect and focus the encoded beam from modulator 322 onto detector 26 may be used instead in each of the embodiments herein and such variations are within the scope of the invention. The transmission mode of modulator 322 was chosen for clarity, it being understood that a similar device with a reflective modulator is within the scope of the invention.

In FIG. 10A and FIG. 10B, staggered optical gates, 64.1 and 64.2, of modulator 322 are used to direct the excitation components to sample 324 in an interlaced sequence. This interlacing mechanism could be replaced with by an interlaced sequence of control signals (not shown) from computer 28 to one or more controllable gating devices which direct the excitation components to 324. Examples of controllable gating devices include addressable optical shutters, movable mirrors and controllable power supplies. In this case, computer 28 would produce a sequence of control signals to a number of controllable gating sources in response to one or more optical switches (e.g., optical switch 70, 71, and/or 72) to direct the excitation components to sample 324 substantially in sequence.

In reference to FIG. 9, for analyzer 300 described above, the position one or more optical elements can be controlled to align target image 352 onto modulator 322. Preferably, sample 324 includes a number of alignment components (e.g., one or more known fluorescent species, one or more light-emitting diodes, or one or more optical fibers with know spectral output distributed at known spatial positions within 324) and modulator 322 includes a number of alignment channels to provide input to the alignment calibration algorithm 28.utl(ACA). Preferably, 28.utl(ACA) generates one or more calibration coefficients which are then used by application specific function 28.asf to compensate for the effects of the alignment error. More preferably, 28.utl(ACA) generates one or more control signals to position one or more optical elements to properly align target image 352 onto modulator 322. More preferably, the alignment spatial components would also have known spectral excitation/emission properties for calibrating the wavelength-filtering device or the wavelength-separating device.

Harmonics of Incomplete Rotation Periods

The encoding functions used in modulators 22A-22D are harmonics of the complete rotational period of substrate 23. In other embodiments, harmonics of incomplete rotational periods (e.g., radiation filters confined to an annular segment within an annular region) may be useful for eliminating various hardware items, freeing up micro-processor resources, synchronizing the movements of external mechanical devices, measuring the position and intensity of an intensity distribution, and increasing the spatial or spectral resolution of the analyzer. For the discussions that follow, we define harmonics of incomplete rotational periods to include encoding functions derived from radiation filters with substantially repeating patterns that have an integer number of periods (or half-periods) within a bounding annular segment. The general form for the harmonics of incomplete rotation periods is given by $\sin^2(m\theta+p\pi/4)$, where $\theta'$is the compressed angle relating the azimuthal length of the annular segment to the complete period of rotation of modulator 22. Modulator 22E of FIG. 8 is an example of using modulation functions based on two incomplete rotation periods to measure both the intensity and radial position (or intensity derivative along the radial axis of modulator 22E) of an imaged radiation distribution, thereby enhancing the measurement capability of analyzer 100. In the example shown in FIG. 8, the angle $\theta'$ is compressed by a factor of two as the annular segments are one-half the rotation period of modulator 22E.

Figure 11A:
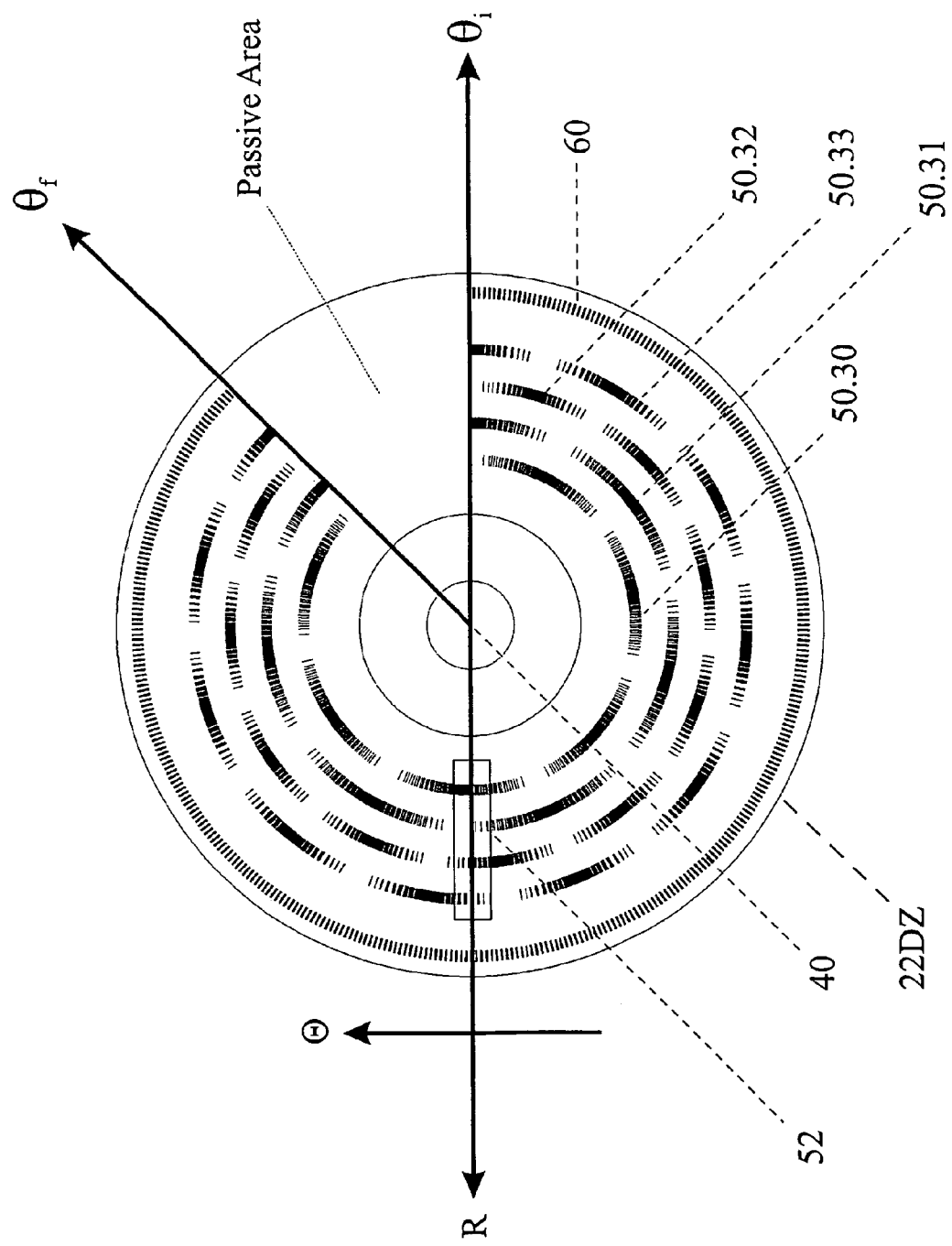
FIG. 11A is a top view of embodiment 22DZ of modulator 22, which incorporates radiation filters which are based on harmonics of an incomplete rotational period.

In another embodiment of modulator 22, harmonics of an incomplete rotation period may be used to eliminate timing mark(s) 61 on modulator 22 and optical switch 71, by replacing the signal from optical switch 71 with a simple time-out on the signal originating from optical switch 70. FIG. 11A is a top view of radiation modulator which incorporates radiation filters which are based on harmonics of an incomplete rotational period. As shown in FIG. 11, radiation modulator 22DZ has four radiation filters, 50.30, 50.31, 50.32 and 50.33, which are harmonics of the incomplete rotation period which starts at the rotation angle $\theta_i$ and ends at the rotation angle $\theta_f$ (i.e., $\theta_i$ and $\theta_f$ define the annular segments within the corresponding annular regions encompassing 50.30, 50.31, 50.32 and 50.33). Between $\theta_f$ and $\theta_i$, modulator 22DZ includes a passive area that is void of the radiation filters. For clarity, we define the active period as the fraction of a complete rotation period where target image 52 is being modulated by the radiation filters on modulator 22, and we define the passive period as the fraction of a complete rotation period where target image 52 is not being modulated by the radiation filters on modulator 22. Preferably, the timing marks 60 on modulator 22DZ are patterned such that during the passive period no ADC trigger events are generated by optical switch 70.

To use modulator 22DZ, the decoding algorithm 28.dec of radiation analyzer 100 would be modified to eliminate the input from optical switch 71 and include a timer which would provide a basis for measuring the elapsed time between ADC trigger events generated by optical switch 70 in response to timing marks 60. The elapsed time between ADC trigger events would be used to compute an average ADC trigger event period. Decoding algorithm 28.dec would include an function which would generate an ADC time-out event when the time elapsed since the last ADC trigger event is substantially greater than the average ADC trigger event period. Preferably, modulator 22DZ is patterned such that the ADC time-out event occurs during the passive period. The ADC time-out event is used by computer 28 to synchronize decoding algorithm 28.dec with the output from 28.adc. In this manner, the cost and complexity of radiation analyzer 100 is substantially reduced.

Harmonics of an incomplete rotation period in conjunction with a passive period may also be necessary when a computer-time-intensive algorithm is executed once per rotation period and would otherwise compromise the data collection and decoding efforts. For example, in analyzer 100 the data is acquired during an incomplete rotation period and the application-specific algorithm 28.asf is executed during the passive period. In this manner, 28.asf can be executed every rotation period without having to skip data acquisition cycles.

Harmonics of an incomplete rotational period in conjunction with a passive period may also be useful in applications where one or more optical elements are re-positioned every rotational period of modulator 22 to select amongst two or more distinct optical paths. For example, analyzer 100 is configured to measure the spatial components of an extended source and a spectrometer is inserted before detector 26 to isolate a specific spectral component of the spatially-encoded signal. The spectrometer grating is stepped once per rotation period to the next wavelength during the passive period. Preferably, the passive period is long enough such that any residual motion of the optical element(s) is damped to an acceptable level prior to re-starting the DAQ. In this manner, the spectral properties of each spatial component can be mapped out over a small number of rotation periods. Another example is where analyzer 100 is configured to measure the spectral components of an extended source and a mirror or other optical element is mounted on a movable stage to isolate specific portions of the extended source along one or more spatial axis. The movable stage is stepped once per rotation period during the passive period. In this manner, the spatial and spectral properties of an extended source can be mapped out over a small number of rotation periods. Another example is where analyzer 100 is configured to measure the spatial components of a two-dimensional extended source along a first spatial axis and a mirror or other optical element is mounted on a movable stage to isolate specific cross sections of the extended source along a second spatial axis. The movable stage is stepped once per rotation period to the isolate the next specific cross section of the extended source during the passive period. In this manner, a two-dimensional image of the extended source can be obtained over a small number of rotation periods.

Figure 11B:
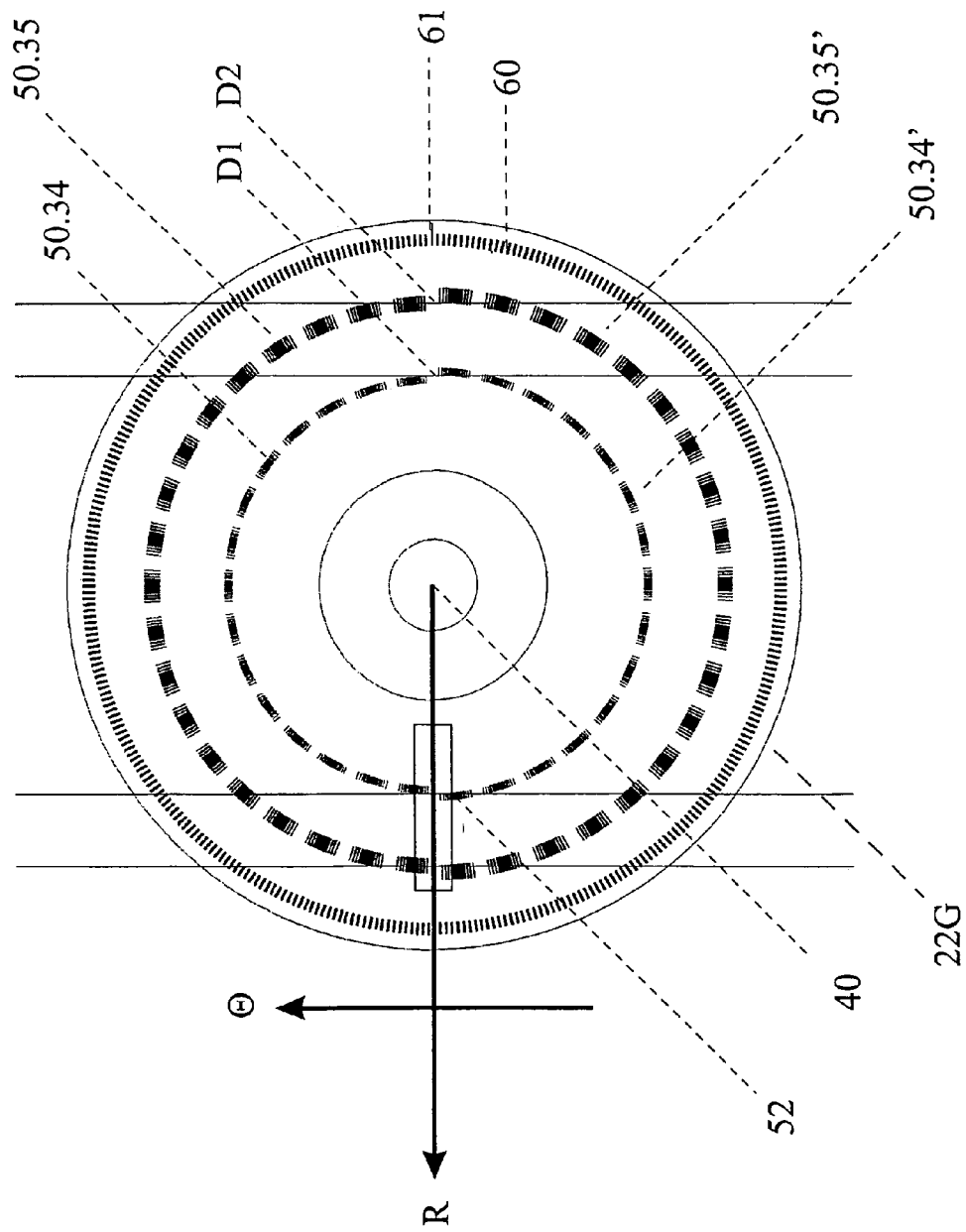
FIG. 11B is a top view of embodiment 22G of modulator 22, illustrating two methods to increase the spatial resolution of the encoding of target image 52.

In another embodiment of analyzer 100, harmonics of two or more incomplete rotation periods may be combined to increase the number of encoding channels without increasing the number of harmonics in the encoded beam. In this manner, the total modulation bandwidth of the encoded beam, and thereby the bandwidth of the signal generated by detector 26, can be minimized. FIG. 11B illustrates two methods to increase the spatial resolution of the encoding of target image 52. Modulator 22G comprises two set of radiation filters which are harmonics of incomplete rotational periods. Radiation filters 50.34 and 50.35 are harmonics of the first half of the rotation period, and radiation filters 50.34' and 50.35' are harmonics of the second half of the rotation period Radiation filters 50.34 and 50.34' (50.35 and 50.35') have the same phase and frequency. In addition, radiation filters 50.34 and 50.34' (50.35 and 50.35') have the same radial width. As seen in FIG. 11B, radiation filter 50.34' is displaced along the radial axis with respect to radiation filter 50.34 by a distance greater than or equal to the radial width, and radiation filter 50.35' is displaced along the radial axis with respect to radiation filter 50.35 by a distance less than the radial width. As such, the total number of distinct encoding channels is four and the total number of distinct encoding frequencies and phases is two. To use modulator 22G, the sub-signal separator 28.sss of radiation analyzer 100 would separate the encoded signal into two sub-signals, 27.1 and 27.2, corresponding to the first half and the second half of the rotation period of modulator 22G, respectively. 27.1 would be processed by decoding algorithm 28.dec to yield the amplitudes of the components encoded by 50.34 and 50.35, and 27.2 would be processed by decoding algorithm 28.dec to yield the amplitudes of the components encoded by 50.34' and 50.35'. In this manner, four radial sections of target image 52 can be determined using two encoding functions.

In the preceding discussion, the number of incomplete rotation periods and passive periods, the number of filters in each incomplete rotation period, and the configuration of annular segments comprising the incomplete rotation periods (e.g., the radial positions, radial widths and angles subtended) were chosen for clarity and are not meant to limit the scope of the invention.

Hyper-Spectral Imaging Analyzer

In some applications, it is necessary to measure a number of spectral components of a limited collection of discrete radiation emitting samples. Examples of collections of radiation emitting samples include multi-dye, multi-capillary (or multi-lane) electrophoresis, multi-dye, multi-sample fluorescent assay, and a linear array of optical fibers containing spectral components from a remote sampling location. Typically, a CCD camera in conjunction with optics that project spatial information along a first axis and spectral information along a second axis are used for this purpose. Significant advantages in cost and performance can be realized if the CCD camera is replaced by a single photo-multiplier tube (PMT) and a multi-channel optical encoder.

Another embodiment of analyzer 100 depicted in FIG. 1, Hyper-Spectral Imaging Analyzer is designed to measure a plurality of spectral components individually selected from two or more radiation emitting samples substantially simultaneously. Radiation source 24 is a collection of two or more radiation emitting samples, each said sample emitting radiation in a plurality of selected spectral components. Radiation emitted by source 24 is imaged by pre-encoder optic 36A, a one-dimensional hyper-spectral imaging optic, to form target image 52 on modulator 22. Target image 52 comprises a plurality of spectral components (individually selected from each of the radiation emitting samples), substantially separated from one another along a common radial axis of modulator 22. Modulator 22 includes a number of radiation filters to encode target image 52 to provide an encoded beam comprising two or more encoded components. Preferably, target image 52 is aligned with said radiation filters such that said encoded components have a substantially one to one correspondence with said selected spectral components. The encoded beam is collected, directed and focused with post-encoder optic 36B onto detector 26. Computer 28 then analyzes the signal generated by detector 26 in response to the encoded beam to determine the amplitudes of the encoded components.

FIG. 12A and FIG. 12B are a schematic top-view and a schematic side-view, respectively, of embodiment HS of pre-encoder optic 36A, 36A(HS), used to project dispersed spectral components of radiation emitting samples 24.HS.1 and 24.HS.2 along a common encoding axis, $X_e$. As shown in FIG. 12A and FIG. 12B, pre-encoder optic 36A(HS) comprises two collection lenses, 36A(HS).C.1 and 36A(HS).C.2, a single diffraction grating 36A(HS).DG, and two focusing lenses, 36A(HS).F.1 and 36A(HS).F.2. Collection lenses 36A(HS).C.1 and 36A(HS).C.2 are positioned along a substantially common collection axis, $X_c$. The collection lenses are positioned to collimate radiation emitted from two radiation emitting samples, 24.HS.1 and 24.HS.2, arrayed along a substantially common sample axis, $X_s$. The collimated radiation beams are diffracted by diffraction grating 36A(HS).DG, and focused by focusing lenses 36A(HS).F.1 and 36A(HS).F.2 (arrayed along a substantially common focusing axis, $X_f$), to form two dispersed images, 52.HS.1 and 52.HS.2, substantially in a common encoding plane, and with the respective dispersion axes substantially along a common encoding axis, $X_e$. Using pre-encoder optic 36A(HS), target image 52.HS comprises two dispersed images, 52.HS.1 and 52.HS.2, corresponding to radiation from samples 24.HS.1 and 24.HS.2, respectively, substantially separated from one another along encoding axis $X_e$, and each having the respective dispersion axis along encoding axis $X_e$.

Figure 12C:
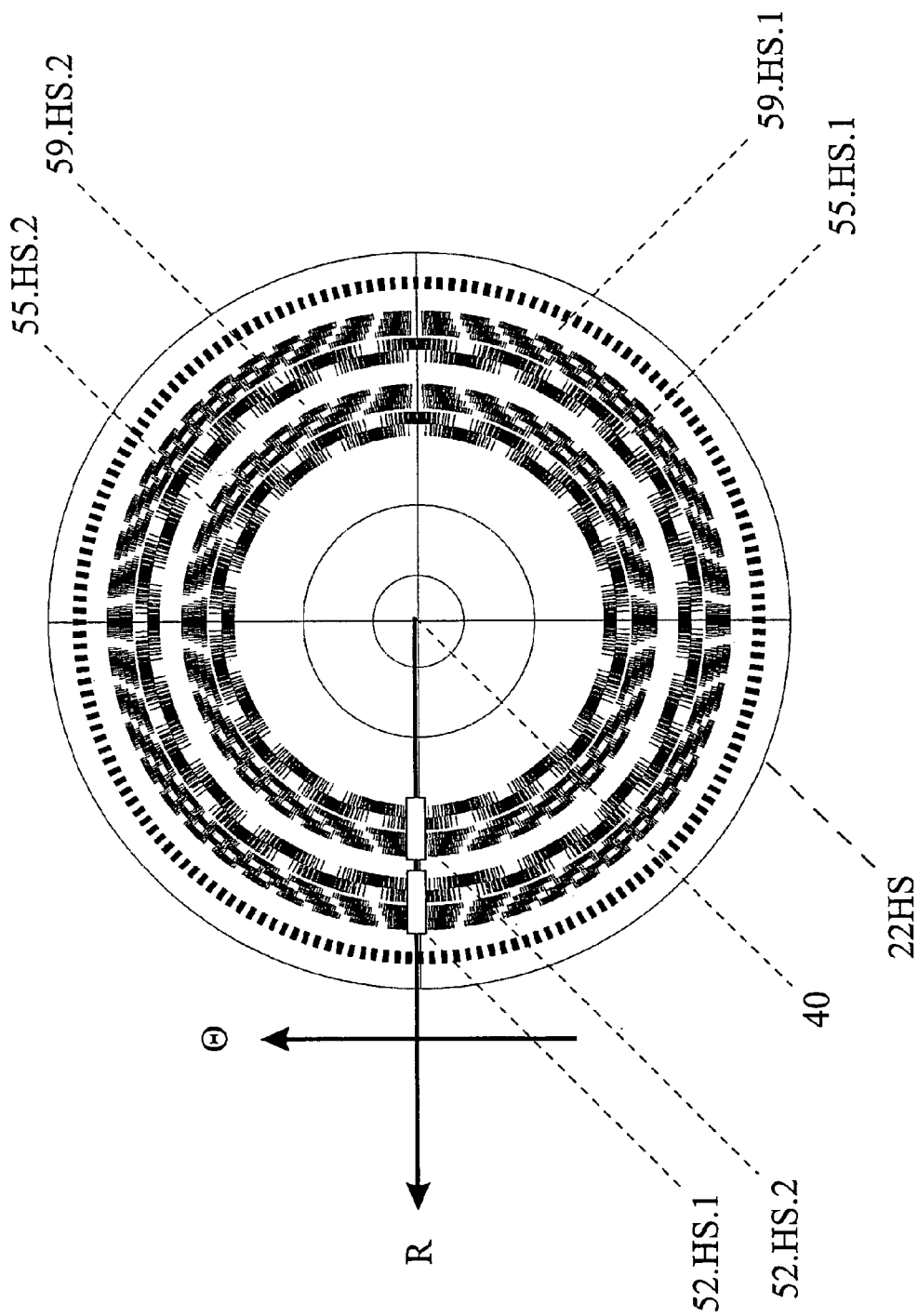
FIG. 12C is a top view of embodiment 22HS of modulator 22 to be used in the Hyper-Spectral Imaging Analyzer embodiment of analyzer 100.

As shown in FIG. 12B, the plane of diffraction grating 36A(HS).DG is tilted and the positions of focusing lenses 36A(HS).F.1 and 36A(HS).F.2 are engineered to direct zeroth-order, non-diffracted radiation out of the preferred beam path. As shown in FIG. 12A, pre-encoder optic 36A (HS) incorporates one or more bandpass filters 36A(HS).BPF to prevent the two dispersed images from overlapping one another. If samples 24.HS.1 and 24.HS.2 are excited with excitation radiation, it is preferable that bandpass filter 36A (HS).BPF has finite transmission at the wavelength(s) of the excitation radiation such that the sub-image of the excitation radiation can be used for alignment purposes. In the present invention, pre-encoder optic 36A(HS) is to be used with modulator 22HS shown below in FIG. 12C; i.e., encoding axis $X_e$ is in the plane and along a radial axis, R, of modulator 22HS. However, pre-encoder optic 36A(HS) can also be used with a linear detector array, a scanning aperture, or an addressable spatial light modulator. These and other variants and applications of pre-encoder optic 36A(HS) are within the scope of the invention.

FIG. 12C is a schematic of embodiment 22HS of modulator 22 to be used in Hyper-Spectral Imaging Analyzer with pre-encoder optic 36A(HS). Modulator 22HS includes two groups of radiation filters, 59.HS.1 and 59.HS.2, for encoding the dispersed images of the two radiation emitting samples, 24.HS.1 and 24.HS.2, respectively. Each sub-pattern includes a number of radiation filters for measuring selected spectral components from each sample. In addition, each sub-pattern includes a complementary filter pair positioned at the expected radial position for an alignment spectral component (expected in each radiation emitting sample) for calibration and alignment purposes. Examples of alignment components include scattered excitation energy, Raman lines, and spectral features in one or more optical elements. Preferably, the signals from the two filter pairs are used as input for the Alignment Calibration Algorithm 28.utl(ACA), which in turn, generates one or more control signals to position one or more optical elements to align target image 52 onto modulator 22HS.

In Hyper-Spectral Imaging Analyzer there are two obvious competing encoding strategies: 1) separating the sub-images to obtain higher signal levels at the expense of spectral resolution, or 2) interlacing the sub-images to obtain higher spectral resolution at the expense of signal level. If higher spectral resolution is needed, a multi-band-pass filter can be inserted between source 24.HS (comprising 24.HS.1 and 24.HS.2) and detector 26, thereby allowing the dispersed sub-images to be interlaced with a substantial increase in spectral resolution. However, this increased spectral resolution comes at the expense of signal level which is reduced by the multi-bandpass filter.

In FIG. 12A, FIG. 12B and FIG. 12C, the optical geometry and the number of radiation emitting samples, optical components, and the number and configuration of radiation filters (and filter pairs) was chosen for clarity, it being understood that arbitrary numbers of radiation emitting samples, optical components, radiation filters, and complementary filter pairs are within the scope of the invention.

Interlaced Excitation Encoder

In some applications, it may be desirable to measure a samples response to two or more different components of excitation radiation. Examples of excitation radiation sources include a collection of different lasers, a multi-line laser or low-pressure gas lamp combined with a diffractive or refractive optic to separate the emission lines, optical fibers, or lamp/filter combinations. Examples of samples include a multi-lane/multi-capillary electrophoresis, and a collection of distinct fluorescence emitting (or Raman scattering) samples arranged in a linear array. Such and other examples of excitation components and samples are within the scope of the invention. In some instances, it may also be desirable to measure a samples response to two or more different excitation components substantially simultaneously. For example, some samples are altered by the excitation radiation such that the results of a sequence of excitation/response measurements may differ depending upon the order of the applied excitation components. Another example is a sample which is flowing in a process stream (e.g., electrophoresis or cell flow cytometry) where the dwell time at the location of the measurement is insufficient to make the excitation measurements in series. The interlaced excitation encoder described below (provides groups of encoded excitation beams, comprising radiation from two or more excitation sources to a collection of samples) permits the emitted, scattered, transmitted or reflected radiation from a sample in response to two or more different excitation components to be detected substantially simultaneously.

Interlaced Excitation Encoder provides two or more excitation groups, comprising two or more encoded excitation beams, to two or more samples in a collection. Interlaced Excitation Encoder comprises the majority of the components of analyzer 100 and an Excitation Interlacing Optic. Excitation Interlacing Optic comprises a pre-encoder component and a post-encoder component. The pre-encoder component of Excitation Interlacing Optic uses one or more diffractive, refractive or reflective elements (or various combinations thereof) to produce (an array of sub-images from each radiation source) multiple sub-images of two or more radiation sources (e.g., laser lines, individual lasers, diodes, lamp/filter combinations), such that the sub-image arrays of said two or more radiation sources are interlaced along an encoding axis in an encoding plane (e.g., RGB-RGB-RGB-RGB, where R, G and B correspond to sub-images from a long, medium and short wavelength laser, respectively). A multi-channel encoder (e.g., analyzer/encoder 100) encodes each sub-image with a substantially unique modulation function to produce an encoded interlaced excitation beam comprising groups of encoded excitation components, wherein said groups comprises encoded components from each of said radiation sources (e.g., RGB comprises one group). Alternatively, one could also place the interlacing optic after the encoder. In this case one would encode RRRR-GGGG-BBBB and the interlacing optics would construct the excitation groups (RGB) out of the encoded beams. The post-encoder component of Excitation Interlacing Optic (e.g., a collection of objective lenses, wherein the number in the collection is substantially equal to the number of samples) focuses each said group onto a corresponding sample in a collection of samples. Preferably, the sub-images of the encoded beams comprising a given group are focused on a common spot on the corresponding sample. Preferably, the intensities of the sub-images are encoded without varying the focused spot size on the sample. More preferably, the intensities of the sub-images are encoded with a substantially uniform spatial illumination along one or more axes on the sample.

In response to the encoded excitation radiation, the samples in the collection emit, scatter, transmit or reflect response radiation. In most instances (e.g., in the linear approximation), the response radiation is encoded with an intensity modulation function that is substantially identical to that of the corresponding encoded excitation beam. In response to the excitation radiation, each said sample emits or scatters one or more response components (or beams) of radiation. Preferably, the array of groups of encoded excitation beams are aligned with the collection of samples such that a substantially one-to-one correspondence exists between a given encoded response component and a given sample/excitation combination (i.e., each sample emits or scatters one encoded response beam for each excitation source. Excitation cross-talk, resulting from an encoded excitation beam exciting more than one sample, is to be avoided. This could be accomplished by placing radiation-blocking obstructions between the samples in the collection.). The encoded response beams are collected, directed, and focused by post-encoded optic 36B onto detector 26, and the signals generated by the detector in response to the encoded response beams are analyzed by computer 28 to determine the amplitudes of the encoded components.

If called for by the application, the spectral properties of the encoded response components are measured by inserting a spectrometer or other wavelength filtering device between post-encoder optic 36B and the detector and scanning the wavelength of the radiation transmitted to the detector. More preferably, a spectrograph or other wavelength separating device is used to direct a number of selected spectral components of the encoded beam to an equal number of detectors. Most preferably, computer 28 would include a sufficient number of analog-to-digital converters (ADCs) such that the signals generated by the detectors in response to the encoded beam could be analyzed substantially simultaneously. In this manner, the spectral properties of the response of a collection of samples to one or more sources of excitation radiation can be measured substantially simultaneously.

Secondary Encoder Timing Signal Synchronization

It may be advantageous to replace the timing and reset signals generated by optical switches 70 and 71 in multipurpose radiation analyzer 100 with a commercially available Incremental Rotary Encoder (IRE). The IRE is a robust, well-established technology which provides both an incremental signal (event, interrupt) and a reset signal (event, interrupt) in response to rotation. The IRE would be mounted on spindle motor 42 and would be interfaced to computer 28 by providing the incremental signal and the reset signal of the IRE to a trigger mapping algorithm, 28.tma, which would output a software generated trigger event to 28.adc, and a decoding algorithm reset event to 28.dec. One complexity in such an approach is compensating for the relative angular offset between the reset signal of the IRE and the zero angle position of modulator 22; i.e., the relative position of zero degrees as defined by the pattern of modulator 22 and the reset position on the IRE. One solution to this problem is to use a one-bit function generator clocked by the IRE incremental signal (provides time base) and triggered by the IRE reset signal (defines the start of the generated function). The output of the one-bit function generator provides the trigger signal for 28.adc and the reset signal for 28.dec. The pattern of the one-bit function generator is determined by analyzing the waveform obtained by sampling the signal generated by detector 26 using the incremental output from the IRE as the trigger for 28.adc and the reset signal from the IRE to define the start and end of the data acquisition interval. The waveform (i.e., the output from detector 26 over a complete period of the rotation of modulator 22 sampled at the IRE interval) is analyzed by curve fitting to an expected waveform (e.g., the theoretical output of detector 26 over a complete period of the rotation of modulator 22 sampled at the IRE interval with zero phase shift between the IRE reset signal and the pattern on modulator 22) to determine the relative phase(s) between the IRE reset and the sub-pattern(s) on modulator pattern 22. During this synchronization procedure, the radiation source can be a reference lamp combined with an intensity mask to isolate one or more known encoded components. More preferably, the synchronization procedure would use a dedicated radiation source, a dedicated detector and one or more dedicated reference filters on modulator 22 to provide a well-known reference waveform for the analysis. (e.g., the system used to illuminate and/or isolate specific radiation filters described above in the FIRST-ORDER AMPLITUDE CORRECTION can be used to provide a known detector signal for analysis.) Once the relative phase between the IRE and modulator 22 is determined, a mathematical relationship between the trigger and reset signals from the IRE and the appropriate trigger and reset signals (events) to 28.adc and 28.dec, respectively, can be established. Preferably, the trigger signals to 28.adc are integer multiples or rational fractions (e.g., 4, 3, 2, 1, ½, ⅓, ¼) of the IRE incremental signals, and the trigonometric look-up table used by 28.dec is constructed with a global phase factor to account for any residual phase shift (e.g., that caused by the coarseness of the incremental signal IRE, and/or any latency between the incremental signal and the software-generated trigger event) between the software-generated ADC trigger signals and the pattern on modulator 22.

The output of the synchronization procedure would be a lookup table which defines the one-bit function generator. The one-bit function generator may contain one or more passive periods, or multiple, independent (e.g., multiple function generators having a common time base) outputs to synchronize the data acquisition to modulator patterns which include harmonics of incomplete rotational periods or applications which involve sampling multiple detectors.

Multivariate Chemometric Analyzer

Due to the ability to configure the radial position and radial width of radiation filters and filter pairs on modulator 22 for specific applications, the present invention is ideal for use as a multivariate Chemometric analyzer. Another embodiment of analyzer 100 depicted in FIG. 1A, Multivariate Chemometric Analyzer is designed to measure the concentrations of selected analytes in a sample substantially simultaneously. In general, analytes absorb, and/or scatter, and/or emit radiation as a function of their respective concentrations. In the discussion that follows, we consider an instrument designed to measure a first plurality of selected analytes that absorb radiation as a function of their respective concentrations It is understood that other embodiments of analyzer 100 designed to measure two or more analytes that scatter or emit radiation are within the scope of the invention.

Radiation source 24 provides broadband radiation encompassing at least one spectral feature from each of the selected analytes. Pre-encoder optic 36A includes at least one diffractive, refractive or filtering element to form a dispersed image 52 along a radial axis of modulator 22. Modulator 22 includes a second plurality of radiation filters and/or radiation filter pairs to encode a third plurality of selected spectral components of radiation from the source 24 to provide an encoded beam as modulator 22 is rotated about axis 40. Each filter occupies an annular region (or annular segment) having a radial position substantially defining the center wavelength of a corresponding spectral component, and a radial width substantially defining the bandwidth of a corresponding spectral component.

Post-encoder optic 36B collects and directs the encoded beam onto at least one radiation detector 26, which provides encoded signal 27 to computer 28.adc. Computer 28 includes a decoding algorithm 28.dec, which decodes signal 27 to provide the amplitudes of one or more of the encoded spectral components as inputs for application-specific function 28.asf, a Chemometric algorithm, computes the concentrations of one or more of the selected analytes.

Preferably, one or more samples or sample cells (e.g., sample 38 of FIG. 1A) are placed between source 24 and detector 26 for multivariate Chemometric analysis.

Preferably, the performance of the Chemometric algorithm can be optimized by the judicious selection of the spectral components. For example, the radial position and radial width of the radiation filters and/or radiation filter pairs on modulator 22 can be engineered to provide optimized spectral components that minimize the resulting concentration error computed by 28.asf from an intensity (measurement) error in one or more spectral components. In this manner, the encoded components resulting from the rotation of modulator 22 about rotation axis 40 provide an ideal input to the Chemometric algorithm. For a given dispersed target image 52, there are unique modulator patterns that provide ideal spectral input for a specific multivariate Chemometric application. In this manner, modulator pattern 21 of Multivariate Chemometric Analyzer corresponds to a specific target image 52 and a specific set of analytes. One method to optimize modulator 22 for Chemometric applications is described below.

Preferably, radiation source 24 includes at least one reference spectral component, where the intensity is substantially unaffected by the concentrations of the analytes, and modulator 22 includes a corresponding radiation filter to provide an encoded reference component, which is used to normalize the amplitudes the spectral components used in the Chemometric algorithm. More preferably, Multivariate Chemometric Analyzer employs two or more reference spectral components and two or more corresponding radiation filters (or filter pairs) to provide encoded reference components used by 28.asf to gauge variations in the spectral output of source 24 (e.g., the temp of a substantially blackbody radiator) and/or the spectral responsivity of detector 26. In this manner, Chemometric algorithm 28.asf can distinguish between changes in the concentrations of the analytes, and changes in the output of source 24 or changes in the responsivity of detector 26.

Preferably, a sample (e.g., sample 38 of FIG. 1A) is inserted in the optical path between source 24 and detector 26 to provide a controlled optical path of known length. More preferably, sample 38 is part of a sampling system that includes a pump and computer-controlled valves such that one or more cells can be alternately filled with a zero gas; i.e., a gas containing zero concentrations of the Chemometric analytes, and the sample gas, which may contain the analytes. Examples of zero gas include air, nitrogen argon, etc. In this manner, the amplitude of one or more spectral components filtered by the sample gas can be referenced to (or normalized by) the amplitude of one or more spectral components filtered by the zero gas.

In one embodiment of Multivariate Chemometric Analyzer, a cell containing sample 38 and detector 26 are combined into a single unit (e.g., a luft detector).

Preferably, Multivariate Chemometric Analyzer includes one or more spectral calibration filter groups (described below in Spectral-Calibration Analyzer) to gauge the alignment of target image 52 onto the radial axis of modulator 22.

Preferably, Multivariate Chemometric Analyzer includes one or more detector responsivity frequency calibration filter groups (described below in Detection-System Frequency-Dependence Compensation Analyzer) to normalize various encoded components for the frequency dependence of detector 26.

Configuration Method for Multivariate Chemometric Analyzer

In this section we describe a method (e.g., a software algorithm) for generating an optimized pattern, 21, for spatial radiation modulator 22 of Multivariate Chemometric Analyzer to analyze (e.g., identification and quantification) a group of analytes in one or more samples.

Figure 13A:
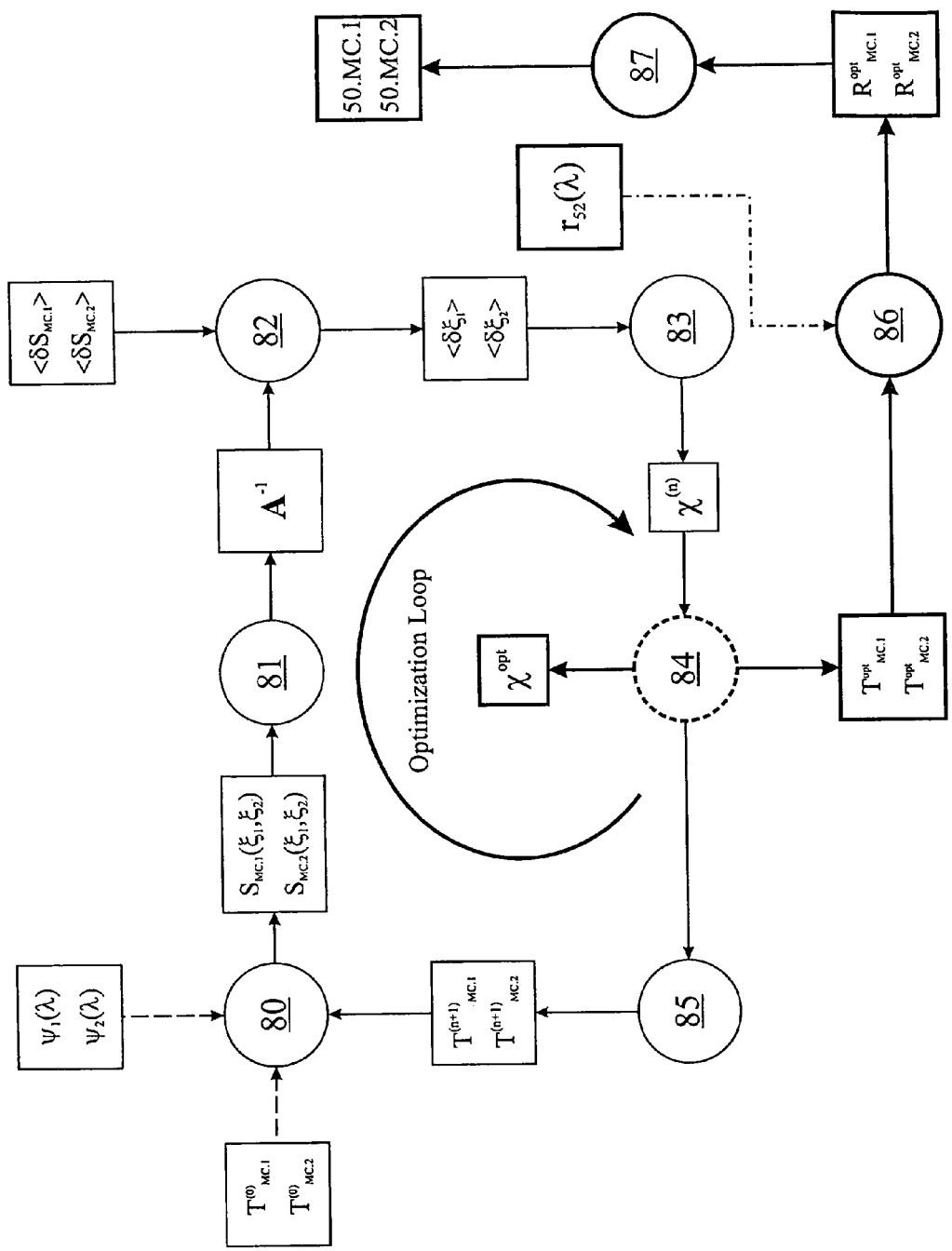
FIG. 13A is a schematic representation of one method to configuration modulator 22 for the Multivariate Chemometric Analyzer embodiment of analyzer 100.

FIG. 13A is a schematic representation of one method to configuration modulator 22 for an embodiment of Multivariate Chemometric Analyzer that measures the concentration of two analytes, $\Psi_1$ and $\Psi_2$, which absorb radiation as a function of their respective concentrations, $\xi_1$, and $\xi_2$, it being understood that the method can be generalized to other embodiments of analyzer 100 designed to measure two or more analytes that scatter or emit radiation. Such and other variations are within the scope of the invention. As shown by the vertical dashed line in FIG. 13A, the method inputs corresponding spectra for each analyte, $\psi_1(\lambda)$ and $\psi_2(\lambda)$, each having at least one concentration-dependent spectral feature in at least one of the spectral ranges of source 24, of known concentration and experimental conditions. Examples of experimental conditions include optical path length, temperature, humidity and pressure. Preferably the spectra are in an electronic format.

As shown by the horizontal dashed line in FIG. 13A, the method inputs parameters that define a set of two initial spectral windows, $T_{MC.1}^{(0)}(\lambda)$ and $T_{MC.2}^{(0)}(\lambda)$, which are defined by center wavelengths, $\lambda_0^{MC.1}$ and $\lambda_0^{MC.2}$, and bandwidths, $\Delta\lambda_{MC.1}$ and $\Delta\lambda_{MC.2}$, respectfully. Although more elaborate models, (e.g., which account for finite spectral resolution), are also within the scope of the invention, in the discussion that follows, we consider the following model for $T_{MC.1}^{(0)}(\lambda)$ and $T_{MC.2}^{(0)}(\lambda)$:

$$T_j(\lambda) = \begin{cases} 0 & \lambda < \left(\lambda_0^j - \frac{\Delta\lambda_j}{2}\right) \\ 1 & \left(\lambda_0^j - \frac{\Delta\lambda_j}{2}\right) \leq \lambda \leq \left(\lambda_0^j + \frac{\Delta\lambda_j}{2}\right) \\ 0 & \lambda > \left(\lambda_0^j + \frac{\Delta\lambda_j}{2}\right) \end{cases} \quad (12)$$

Preferably, the parameters defining the initial spectral windows, $\{\lambda_0^{MC.1}, \Delta\lambda_{MC.1}\}^{(0)}$ and $\{\lambda_0^{MC.2}, \Delta\lambda_{MC.2}\}^{(0)}$, are stored in one or more text files to be imported at the start of an optimization session, updated by the optimization procedure, and exported to an optimized spectral window file at the end of the optimization process. In this manner, the optimized spectral windows can be used as initial spectral windows for subsequent optimizations.

As shown in FIG. 13A, algorithm 80 calculates the normalized spectral component intensities $S_{MC.1}$ and $S_{MC.2}$ as a function of the analyte concentrations $$S_i = \frac{1}{S_j^0} \int d\lambda I(\lambda) T_i(\lambda) \prod_{k=1}^{2} \psi_k(\lambda; \xi_k) \quad (13)$$

where $I(\lambda)$ is the wavelength-dependent intensity of radiation emitted by source 24 that reaches detector 26 when modulator 22 is replaced with a uniformly reflective (or uniformly transmissive) substrate 23, j={MC.1,MC.2}, and $S_{MC.1}^0$ and $S^{MC.20}$ are the intensities of spectral windows in the zero concentration limit (e.g., the sample cell filled with zero gas or zero liquid)

$$S_j^0 = \int d\lambda I(\lambda) T_j(\lambda) \qquad (14)$$

The normalized intensity of the j={MC.1,MC.2} spectral component due to the absorbance of the k={$\Psi_1,\Psi_2$} analyte is defined as $$S_{jk} = e^{-\Im_{jk}(\xi_k)} \qquad (15)$$

where, the absorbance functions (which include the effects path length, pressure, temperature etc . . . ), $\Im_{jk}$, are expanded in a polynomial in the k-th analyte concentration $$\Im_{jk} = A_{jk}\xi_k + B_{jk}\xi_k^2 + C_{jk}\xi_k^3 + \ldots \qquad (16)$$

In the linear absorbance limit (i.e., the low concentration limit), the $S_{jk}$ can be approximated as $$S_{jk} \approx e^{-A_{jk}\xi_k}, \qquad (17)$$

and, the system of Chemometric equations becomes $$-\ln(S) \approx A\xi, \qquad (18)$$

which can be inverted to recovered the analyte concentrations as a function of the normalized spectral components $$\xi \approx A^{-1}[-\ln(S)], \qquad (19)$$

where, $A^{-1}$ is the inverse Chemometric coefficient matrix.

As shown in FIG. 13A, algorithm 81 inputs the normalized spectral components for different analyte concentrations and outputs the inverse Chemometric coefficient matrix, $A^{-1}$. Using $A^{-1}$ and one or more intensity errors $\delta S = \{\delta S_{MC.1}, \delta S_{MC.1}\}$ as input, algorithm 82 calculates at least one concentration error of each analyte as a function of the intensity errors of each spectral component. Preferably, algorithm 82 calculates a statistical sample of concentration errors resulting from a substantially random distribution of intensity errors. Alternatives to the statistical approach include evaluating one or more condition numbers of the inverse Chemometric coefficient matrix, $A^{-1}$. In this case, $A^{-1}$ can be used as input to algorithm 83 bypassing 82 altogether. Such and other gauges of noise transfer are within the scope of the invention.

In the linear absorbance limit, the concentration errors $\delta\xi$ are given by $$\delta\xi \equiv A^{-1}[\ln(1+\delta S)] \qquad (20)$$

where, $\delta\xi = \{\delta\xi_1, \delta\xi_2\}$ are the concentration errors (i.e., the false concentrations) of $\Psi_1$ and $\Psi_2$ in response to the intensity errors $\delta S = \{\delta S_{MC.1}, \delta S_{MC.1}\}$.

As shown in FIG. 13A, algorithm 83 inputs one or more concentration errors and outputs at least one current noise merit function $\chi^{(n)}$. Examples of noise merit function include various condition numbers of $A^{-1}$. In FIG. 13A, we consider a noise merit function is based on a statistical analysis (e.g., root-mean-square) of the concentration error obtained from random intensity error on the spectral windows $$M.F. = \sqrt{<\delta\xi_1>^2 + <\delta\xi_2>^2}, \qquad (21)$$

where, $<\delta\xi_1>$ and $<\delta\xi_2>$ are the corresponding statistical mean concentration errors of $\Psi_1$, and $\Psi_2$ calculated by 28.asf in response to a random intensity noise; i.e., a random distribution of intensity errors $\delta S_{MC.1}$ and $\delta S_{MC.2}$.

As shown by the dashed circle in FIG. 13A, algorithm 84 compares current merit function $\chi^{(n)}$ to the previous best merit function, $\chi^{opt}$. If current merit function $\chi^{(n)}$ is better than previous best merit function $\chi^{opt}$, $\chi^{opt}$ is replaced by $\chi^{(n)}$ and $T_{MC.1}^{opt}$ and $T_{MC.2}^{opt}$ are replaced by $T_{MC.1}^{(n)}$ and $T_{MC.2}^{(n)}$. On the first iteration of the Optimization Loop shown in FIG. 13A, $\chi^{opt}$, and $\{T_{MC.1}^{opt}, T_{MC.2}^{opt}\}$, are initialized with $\chi^{(0)}$, and $\{T_{MC.1}^{(0)}, T_{MC.2}^{(0)}\}$, respectively.

As shown in FIG. 13A, the Optimization Loop defined by the following algorithm sequence: 85, 80, 81, 82, 83, 84, and back to 85, repeats as algorithm 85 generates subsequent sets of spectral windows, $T_{MC.1}^{(n+1)}$ and $T_{MC.2}^{(n+2)}$, obtained by systematically varying the center wavelength and bandwidth of the initial spectral windows e.g., by searching the entire parameter space of center wavelengths and bandwidths provided by target image 52.

Once an optimum set of spectral windows has been identified, the corresponding center wavelengths and bandwidths must be mapped onto the radial axis of modulator 22. As shown in FIG. 13A, algorithm 86 inputs at least one dispersion function $\lambda_{52}(r)$ (preferably in electronic format) to relate spectral properties of target image 52 to the radial position of modulator 22. Dispersion function $\lambda_{52}(r)$ relates the wavelength of dispersed image 52 as a function of radial position on modulator 22. The dispersion function is inverted to yield $r_{52}(\lambda)$, the radial position on modulator 22 as a function of wavelength. The inverse dispersion function, $r_{52}(\lambda)$, is used by algorithm 86 to translate the set of optimized center wavelengths and bandwidths into a corresponding optimized set of annular regions (or annular segments; e.g., as shown in FIG. 11A), $R_{MC.1}^{opt}$ and $R_{MC.2}^{opt}$, on modulator 22. In this manner optimized annular regions (or annular segments) $R_{MC.1}^{opt}$ and $R_{MC.2}^{opt}$ have a substantially one-to-one correspondence to optimized spectral windows $T_{MC.1}^{opt}$ and $T_{MC.2}^{opt}$, respectively.

Once the optimized annular regions (or annular segments) $R_{MC.1}^{opt}$ and $R_{MC.2opt}$ have been identified, algorithm 87 patterns radiation filters 50.MC.1 and 50.MC.2 (or filter pairs) comprising a plurality of sub-regions (having optical characteristics substantially different from substrate 23) within each said corresponding annular region (or annular segment) to provide a corresponding set a unique modulation function, to encode the optimized spectral components. Preferably, the sub-regions are patterned to provide modulation functions that are substantially orthogonal smooth functions or digitized replicas of orthogonal smooth functions having three or more distinct levels of contrast as the spatial radiation modulator is rotated about rotation axis 40. More preferably, the modulation functions are of the form $\sin^2(m\theta + p\pi/4)$. Most preferably, the harmonics, m, are selected to be prime numbers to minimize cross-talk (i.e., maximize the inter-channel orthogonality) between the encoded optimized spectral components. In this manner the optimized spectral components encoded as modulator 22 rotates about rotation axis 40 correspond to optimized spectral windows $T_{MC.1}^{opt}$ and $T_{MC.2}^{opt}$.

Preferably, optimized pattern 21 is output in an electronic format compatible with a variety of printing and lithographic pattern generators (e.g., the design exchange format, or DXF).

Note that optimized spectral windows $T_{MC.1}^{opt}$ and $T^{MC.2opt}$ are mapped onto annular regions of modulator 22, which encompass radiation filters and/or filter pairs that encode selected spectral components of target image 52. In other words, the spectral components are defined by the overlap of target image 52 and the annular regions of the radiation filters and/or filter pairs, which are engineered from optimized spectral windows $T_{MC.1}{}^{opt}$ and $T_{MC.2}{}^{opt}$. In this manner, the optimized Chemometric encoder pattern 21 on modulator 22 of the present invention corresponds to a solution of the Chemometric optimization problem, and replaces the custom bandpass filter sets used in traditional non-dispersive chemical and fluorescence analyzers.

Hydrocarbon Example of Multivariate Chemometric Analyzer

Figure 13B:
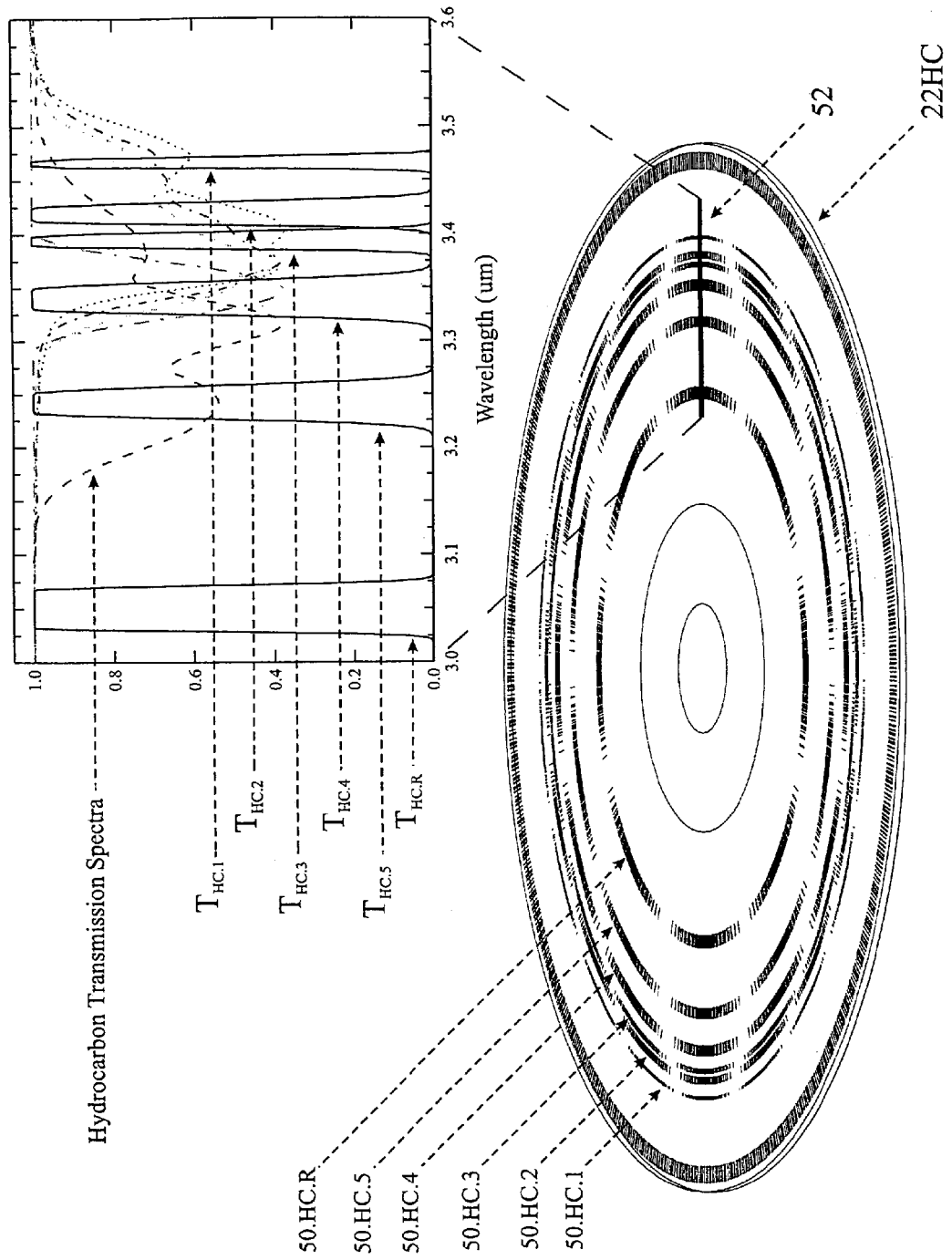
FIG. 13B shows embodiment 22HC of modulator 22, for use in the Multivariate Chemometric Analyzer embodiment of analyzer 100.

FIG. 13B and FIG. 13C illustrate a practical example of the aforementioned process, demonstrating the correspondence between the analyte spectra, the optimized spectral windows, and the radiation filters on modulator 22HC for the Chemometric analysis of five hydrocarbons.

FIG. 13C shows the respective transmission spectra of the hydrocarbons methane, propane, butane, pentane and hexane, in the 3.0 to 3.6 micron spectral range, and the optimized spectral windows $T_{HC.1}$ through $T_{HC.5}$. Optimized spectral windows $T_{HC.1}$ through $T_{HC.5}$ were obtained using the method described above. FIG. 13C also includes a reference spectral window $T_{HC.R}$, located outside the spectral range where the analytes absorb radiation to provide a measure of the overall intensity of source 24 and/or the responsivity of detector 26. Preferably, Multivariate Chemometric Analyzer employs two or more reference spectral components to gauge variations in the spectral output of source 24 and/or the spectral responsivity of detector 26.

FIG. 13B shows the optimized configuration of radiation filters 50.HC.1 through 50.HC.5, and 50.HC.R, on modulator 22HC. The dashed lines between FIG. 13C and target image 52.HC are used to illustrate the one-to-one correspondence between the Chemometric-optimized spectral windows and the engineered pattern of radiation filters on modulator 22HC.

In the description of Multivariate Chemometric Analyzer and the corresponding configuration method, the position of sample 38 was chosen for illustrative purposes and is not intended to limit the scope of the invention.

In the description of Multivariate Chemometric Analyzer and the corresponding configuration method, the number of analytes was chosen for illustrative purposes and is not intended to limit the scope of the invention.

In the description of Multivariate Chemometric Analyzer and the corresponding configuration method, the number of reference components was chosen for illustrative purposes and is not intended to limit the scope of the invention.

In the description of Multivariate Chemometric Analyzer and the corresponding configuration method, one or more radiation filters can be replaced with complementary or collective radiation filter pairs. Such and other variations are within the scope of the invention.

In the description of Multivariate Chemometric Analyzer and the corresponding configuration method, the number of target images and number of radiation detectors was chosen for illustrative purposes and is not intended to limit the scope of the invention. In some Chemometric applications, it may be advantageous to include two or more spectral ranges (target images), bandpass and/or dichroic mirrors, and two or more radiation detectors.

By changing the spectral range(s) of the dispersed images(s) 52, and designing a suitable pattern for modulator 22, the instrument and process described above for the hydrocarbons methane, propane, butane, pentane and hexane, is applicable to a wide variety of chemical species in the gas, liquid and solid phases. For example, volatile organic chemicals, solvents, water, pollutants, gasoline additives, anesthetic agents, chlorofluorocarbons (CFCs), flora, the constituents of natural gas, and chemical weapons all have chemical signatures, which can be used to quantify and discriminate. Applications to these and other chemical signatures are within the scope of the invention. The instrument and process described above for the hydrocarbons methane, propane, butane, pentane and hexane is also applicable to the discrimination and quantification of fluorescent dyes. Applications to the identification and quantification of chemical compositions based on other radiation-based spectral signatures (e.g., fluorescence, Raman lines, atomic emissions) are within the scope of the invention.

Preferably, a class of instruments sharing a substantially common platform (e.g., sharing substantially identical pre-encoder optic 36A, post-encoded optic 36B, sample cell 38, detector 26 and computer 28), can be derived from Multivariate Chemometric Analyzer, where modulator pattern 21 is designed for a specific application (i.e., the modulator pattern 21 and 28.asf are the principal differences between specific instruments in the class). In this manner, the economics of scale can be applied to the manufacturing process for a diverse line of application-specific Chemometric analyzers.

Spectral-Calibration Analyzer

One of the unique aspects of the present invention is the ability to construct complementary filter pairs that create a single encoded component where the magnitude and phase are determined by the relative proportion of radiation incident on the two filters comprising the pair. In another embodiment of radiation spectrum analyzer 100, Spectral-Calibration Analyzer, the radial position and radial width of pairs of complementary filters are chosen to probe the relative position of specific, known spectral features in target image 52 for the purpose of gauging the alignment of target image 52 onto the radial axis of modulator 22. In this manner, the magnitude and phase of the component encoded by the complementary pair 55 can be used to gauge the alignment of target image 52 on modulator 22.

Examples of known spectral features suitable to be used for spectral calibration include various absorption features of $H_2O$, $CO_2$, methane, plastics and other common chemicals, the emission spectra of common dyes, excitation laser lines, diffraction patterns (e.g., interference fringes), various Raman lines (e.g., $N_2$, $O_2$ and $H_2O$), and the spectral edges of common optical materials (e.g., glass, sapphire, ZnSe, Si, Ge, $BaF_2$, etc . . . ) and thin-film filters. These and other spectral features suitable for use in gauging the alignment of target image 52 onto the radial axis of modulator 22 are within the scope of the invention.

In the following discussion, we consider spectral calibration using absorption signatures of methane ($CH_4$) and $CO_2$ for illustrative purposes, and is not intended to limit the scope of the invention.

For the discussion that follows, it is convenient to define a detuned complementary pair radiation component:

$$S_-(\Delta) = \int d\lambda \left\{ \frac{T_1(\lambda + \Delta)}{\Delta\lambda_1} - \frac{T_2(\lambda + \Delta)}{\Delta\lambda_2} \right\} \psi_{cal}(\lambda), \tag{22}$$

and a detuned collective pair radiation component:

$$S_+(\Delta) = \int d\lambda \left\{ \frac{T_1(\lambda+\Delta)}{\Delta\lambda_1} + \frac{T_2(\lambda+\Delta)}{\Delta\lambda_2} \right\} \psi_{cal}(\lambda) \quad (23)$$

where, $\Delta$ is the vector displacement of target image 52 with respect to modulator pattern 21 along the radial axis, $\psi_{cal}(\lambda)$ is the wavelength-dependent transmission spectrum of the calibration analyte, and $T_1(\lambda)$ and $T_2(\lambda)$ are the normalized transmissions of the first and second filters comprising the pair, respectively $$T_j(\lambda) = \begin{cases} 0 & \lambda < \left(\lambda_0^j - \frac{\Delta\lambda_j}{2}\right) \\ 1 & \left(\lambda_0^j - \frac{\Delta\lambda_j}{2}\right) \leq \lambda \leq \left(\lambda_0^j + \frac{\Delta\lambda_j}{2}\right) \\ 0 & \lambda > \left(\lambda_0^j + \frac{\Delta\lambda_j}{2}\right) \end{cases} \quad (24)$$

Preferably, the complementary filter pair corresponding to $S_-(\Delta)$ is engineered such that the amplitude of $S_-(\Delta)$ is nulled (i.e., goes to zero) when target image 52 is properly aligned onto the radial axis of modulator 22

$$\lim_{\Delta \to 0} S_-(\Delta) = 0 \quad (25)$$

Preferably, the complementary filter pair corresponding to $S_-(\Delta)$ is engineered such that the amplitude and phase of $S_-(\Delta)$ is single-valued over the anticipated detuning range of target image 52 along the radial axis of modulator 22. More preferably, amplitude of the corresponding encoded component is a strong function of the detuning of target image 52 along the radial axis of modulator 22 to enable the most accurate gauge of the alignment of 52 on 22.

One method for obtaining a complementary pair optimized for spectral calibration systematically varies the respective center wavelengths and bandwidths of $T_1$ and $T_2$ to identify the parameters that minimize the merit function $$M.F. = \frac{1 + |S_-(0)|}{|S_-(\Delta_0) - S_-(-\Delta_0)|} \quad (26)$$

where, $\Delta_0$ is the anticipated maximum detuning parameter. To find the optimum complementary pair for a given calibration application, the center wavelength and bandwidth of the complementary filters are systematically varied to minimize the merit function.

Once suitable parameters for $T_1$ and $T_2$ are found, a (theoretical) corresponding normalized calibration curve, F, is generated by displacing $T_1$ and $T_2$ relative to the calibration analyte transmission spectrum along the radial axis of modulator 22. One such model for the normalized calibration curve is given by $$F(\Delta) = \frac{S_-(\Delta)}{2 - S_+(\Delta)} \quad (27)$$

where, $\Delta$ is the wavelength detuning parameter; i.e., the vector displacement of target image 52 along the radial axis of modulator 22.

Preferably, the complementary filter pair corresponding to $S_-(\Delta)$ and the collective filter pair corresponding to $S_+(\Delta)$ are engineered such that the normalized calibration curve is substantially independent of calibration analyte concentration over a range of concentrations.

Preferably, the complementary filter pair corresponding to $S_-(\Delta)$ and the collective filter pair corresponding to $S_+(\Delta)$ are engineered such that their respective annular segments exclude annular regions or annular segments occupied by application-specific filters; e.g., the optimized Chemometric filters are separated by radial position and/or annular segment from the filter pairs corresponding to $S_-(\Delta)$ and $s_+(\Delta)$.

In Spectral-Calibration Analyzer, the number and configuration of the filter pairs in the calibration groups on modulator 22 was chosen for illustrative purposes, and is not intended to limit the scope of the invention. In Spectral-Calibration Analyzer, the form of the merit function and the normalized calibration curve were chosen for illustrative purposes, and is not intended to limit the scope of the invention.

Preferably, Spectral-Calibration Analyzer includes a translation stage (e.g., component 35 of FIG. 9B) to detune the position of target image 52 along the radial axis of modulator 22 to generate an empirical version of Eqn. (27). More preferably, this translation stage is used in conjunction with a calibration gas of known concentration confined to a sample cell of known length (e.g., similar to sample cell 38 of FIG. 1A, inserted between 24 and 26) to generate one or more calibration curves for subsequent use in an instrument and/or the instrument assembly process. Most preferably, this translation stage is used in conjunction with a background analyte (e.g., $CO_2$, $CH_4$, $H_2O$, $N_2$, or $O_2$) to generate one or more calibration curves for subsequent use in an instrument and/or the instrument assembly process.

Preferably, a standard calibration gas of known concentration is contained in a sample cell of known length (e.g., sample 38 of FIG. 1A), which is located in Spectral-Calibration Analyzer's optical path between source 24 and detector 26, to properly normalize the calibration curves. More preferably, the complementary filter pair corresponding to $S_-(\Delta)$ is confined to an annular segment comprising an incomplete rotation period (as shown in FIG. 11A), and is augmented by a non-paired radiation filter that measures substantially the same portion of target image 52. Most preferably, the complementary filter pair corresponding to $S_-(\Delta)$ is confined to an annular segment comprising an incomplete rotation period, and is augmented by a collective filter pair corresponding to $S_+(\Delta)$, having substantially identical radial position and radial width as the complementary filter pair, but occupying different annular segments; e.g., the complementary pair occupies the first half-period and the corresponding collective filter pair occupies the second half-period of modulator 22 (shown below in FIG. 14C). In this manner, a normalized calibration curve can be obtained over a wide range of calibration analyte concentrations.

Preferably, the decoded amplitudes and phases from one or more complementary filter pairs are used to provide feedback to application specific function 28.asf to compensate for the effects of imperfect alignment during operation (e.g., to compensate for changes in alignment and modulator radius due to changes in temperature). More preferably, the decoded amplitudes and phases from one or more complementary pairs and the corresponding collective pairs (or non-paired filter) are used to provide feedback to application specific function 28.asf to compensate for the effects of imperfect alignment during operation; e.g., to compensate for changes in size or alignment of one or more optical components or fixtures in response to changes in the temperature.

The inclusion of translation stage 35 is an added expense to analyzer 100. It is therefore desirable to exclude motorized translation stage 35 from mass-produced instruments. Preferably, the decoded amplitude and phase from one or more complementary pairs are used to provide feedback for the alignment of pre-encoder optic with respect to modulator 22 during the assembly process. More preferably, the decoded amplitude and phase from one or more complementary pairs and the corresponding collective pairs (or non-paired filter) are used to provide feedback for the alignment of pre-encoder optic with respect to modulator 22 during the assembly process.

Preferably, the configuration of one or more complementary and collective filter pairs are optimized to probe the relative alignment of one or more spectral features of a standard calibration gas of known concentration (e.g., low concentrations of methane in nitrogen), contained in a sample cell of known length, in target image 52 with respect to modulator 22. In this manner, a standard calibration gas is used as an "alignment standard" (or gauge) to provide an assembly technician guidance (feedback) in positioning pre-encoder optic 36A with respect to modulator 22 during the assembly process. More preferably, the complementary and collective filter pairs corresponding to $S_-(\Delta)$ and $S_+(\Delta)$, respectively, are optimized to probe the relative alignment of one or more spectral features of background $CO_2$ and/or water vapor in target image 52 with respect to modulator 22. In this manner, background $CO_2$ and/or water vapor are used as an "alignment standard" (or gauge) to provide assembly technicians with guidance (feedback) in positioning pre-encoder optic 36A with respect to modulator 22 during the assembly process.

Preferably, the complementary and collective filter pairs corresponding to $S_-(\Delta)$ and $S_+(\Delta)$, respectively, are optimized to probe the relative alignment of one or more spectral features of background $CO_2$ and/or water vapor in target image 52 with respect to modulator 22 to enable an in-situ calibration process; e.g., continuously gauging the alignment of target image 52 with respect to modulator 22 (e.g., in response to changes in ambient temperature), and compensating subsequent decoded components and/or application-specific algorithm 28.asf for artifacts introduced by variations in the alignment of target image 52 with respect to modulator 22.

Figure 14A:
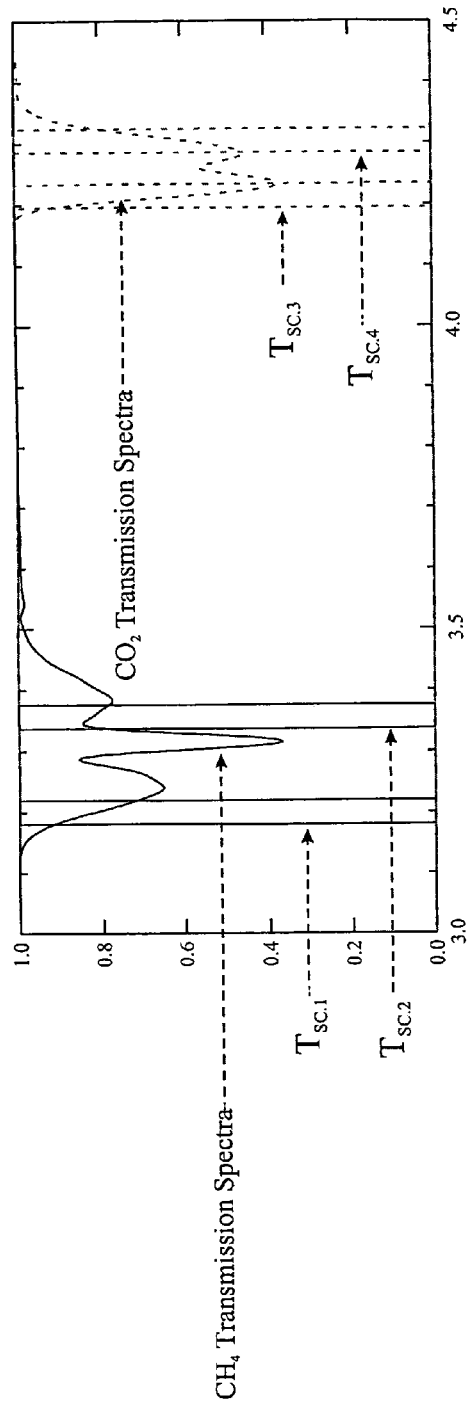
FIG. 14A illustrates the relation between the transmission spectra of methane and carbon dioxide and the optimized calibration spectral windows, for use in the Spectral-Calibration Analyzer embodiment of analyzer 100.
Figure 14B:
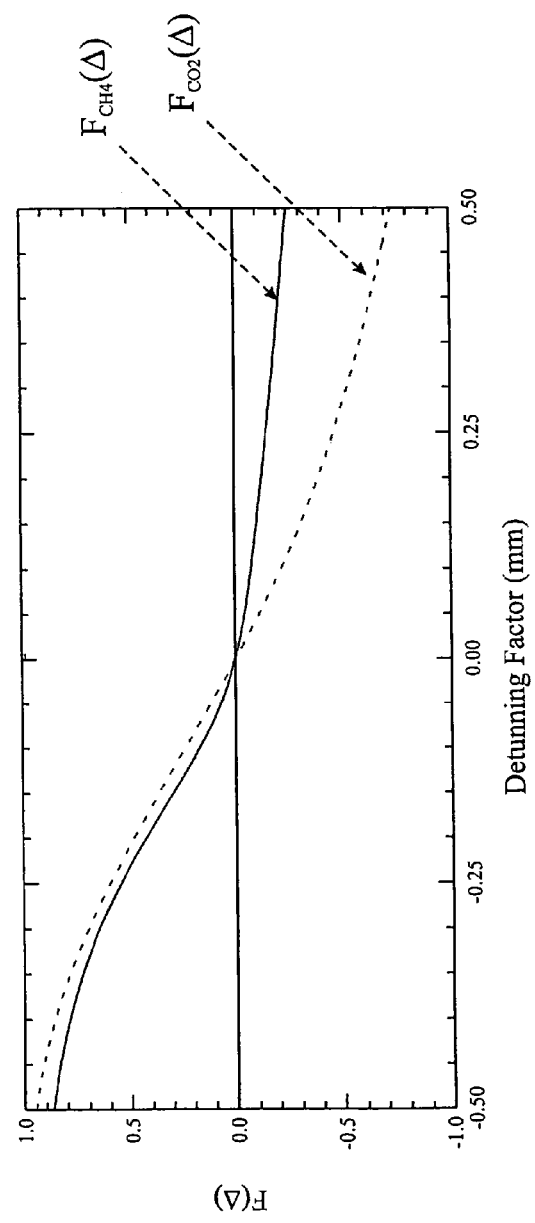
FIG. 14B shows two normalized calibration curves obtained for the spectral absorbance features of $CH_4$ and $CO_2$ in the 3.0 to 4.5 micron region, respectively, for use in the Spectral-Calibration Analyzer embodiment of analyzer 100.

FIG. 14A shows the optimized calibration spectral windows $T_{SC.1}$ through $T_{SC.4}$, and FIG. 14B shows the resulting normalized calibration curves obtained for the spectral absorbance features of $CH_4$ and $CO_2$ in the 3.0 to 4.5 micron region, respectively. Both calibration curves show single-valued behavior over a radial detuning range (i.e., the radial displacement of target image 52 with respect to modulator pattern 21SC of FIG. 14C shown below) of ±0.5 mm. The calibration curve for $CO_2$ (dashed line) is shown to be a strong function of the detuning factor (i.e., the translation of 52 with respect to perfect alignment on 22SC) for comparable concentrations of calibration gasses, enabling the spectral calibration of analyzer 100 on ambient $CO_2$.

FIG. 14C shows embodiment 22SC of modulator 22, where the transmission spectrum of $CH_4$ and $CO_2$ are used to gauge the alignment of target image 52 onto the radial axis of modulator 22SC. Pattern 21SC comprises two calibration groups, optimized to gauge the alignment of target image 52 on the surface of modulator 22SC using absorption features of $CH_4$ and $CO_2$, respectively. The first calibration group, comprising complementary filter pair 55.SC.1 and collective filter pair, 57.SC.1, probes the transmission spectrum of $CH_4$ to gauge the alignment of target image 52 on modulator 22SC. The second calibration group, comprising complementary filter pair 55.SC.2 and collective filter pair 57.SC.2, probes the transmission spectrum of $CO_2$ to gauge the alignment of target image 52 on modulator 22SC. As shown by the bold dot-dash line in FIG. 14C, modulator pattern 21SC is divided into two half-periods. Complementary filter pair 55.SC.1 and collective filter pair 57.SC.2 occupy the first half-period of modulator 22SC, and collective filter pair 57.SC.1 and complementary filter pair 55.SC.2 occupy the second half-period of modulator 22SC. In this manner, the normalized detuning factor (i.e., a point on the normalized calibration curve) can be measured over a period of rotation of modulator 22SC. The normalization of the calibration curve substantially relaxes the need for a calibration gas of known quantity. Preferably, the normalized detuning factor is compared with the normalized calibration curve to gauge the alignment of 52 onto 22SC.

FIG. 14D shows the optimized calibration spectral windows $T_{SC.1}$ through $T_{SC.4}$, and FIG. 14C shows the configuration of radiation filter pairs (55.SC.1, 55.SC.2, 57.SC.1 and 57.SC.2) on modulator 22SC to illustrate the one-to-one correspondence between the optimized calibration spectral windows and the engineered pattern of radiation filter pairs 21.

In FIG. 14C, the radiation filters comprising spectral calibration filter pairs 55.SC.1, 55.SC.2, 57.SC.1, and 57.SC.2 are non-adjacent. Spectral calibration filter pairs that are adjacent are useful for spectral features having a single predominant feature or well-separated features (e.g., excitation laser lines, diffraction maxima), and are within the scope of the invention.

The use of the 3.3 and 4.2 micron spectral absorption features of $CH_4$ and $CO_2$, respectively, in the description of Spectral-Calibration Analyzer was chosen for illustrative purposes only. Other spectral ranges, other gasses ($H_2O$ vapor, $O_2$, etc . . . ) other calibration analytes (including liquid $H_2O$, absorbent dyes, fluorescent dyes), and other transmission, scattering or emission (e.g. fluorescence) spectral features (e.g., the transmission cut-off of optical materials, or one or more thin-film filters, Raman lines, and atomic emission lines) are within the scope of the invention.

The use of collective filter pairs 57.SC.1 and 57.SC.2 in the description of Spectral-Calibration Analyzer was chosen for illustrative purposes only and is not meant to limit the scope of the invention. Other arrangements of filters and filter pairs that provide a gauge of the alignment of the target image with respect to the modulator pattern are within the scope of the invention.

The aforementioned calibration filter pairs are equally applicable to an imaging embodiment of analyzer 100, where the radial position and radial width of pairs of complementary filters (and/or collective filters) are chosen to coincide with specific spatial features of known position in target image 52 (e.g., a capillary array with one or more alignment capillaries filled with one or more fluorescent dyes). In this manner, the magnitude and phase of the component encoded by the complementary pair can be used to gauge the alignment of target image 52 on modulator 22.

Detection-System Frequency-Dependence Compensation Analyzer

One of the unique aspects of the present invention is the ability to construct groups of filters, with widely varying modulation frequencies that encode substantially identical radiation components of source 24 (e.g., by substantially occupying the same annular region of modulator 22, or using a dedicated calibration source). By selectively positioning the filters in a group and judiciously selecting their respective modulation frequencies, one can gauge the modulation frequency dependence of detector 26 and the corresponding detection electronics.

In another embodiment of radiation analyzer 100. Detection-System Frequency-Dependence Compensation Analyzer, detector 26 (comprising the detector and the associated electronics) has a responsivity (i.e., signal output vs. modulated optical intensity input) that is a function of modulation frequency. In addition to distorting the amplitudes, the frequency dependence of detection system 26 imparts a relative phase-shift between encoded components that are modulated at different frequencies, which complicates the decoding algorithm. As a further complication, the frequency dependence of detection system 26 is not static, but changes over time (e.g., in response to changes in temperature or average illumination). Detection-System Frequency-Dependence Compensation Analyzer provides an integrated mechanism to periodically calibrate the frequency dependence of detection system 26, and to compensate for distortions in the amplitude and phase of the encoded components resulting from variations in the frequency dependence of detection system 26.

Figure 15:
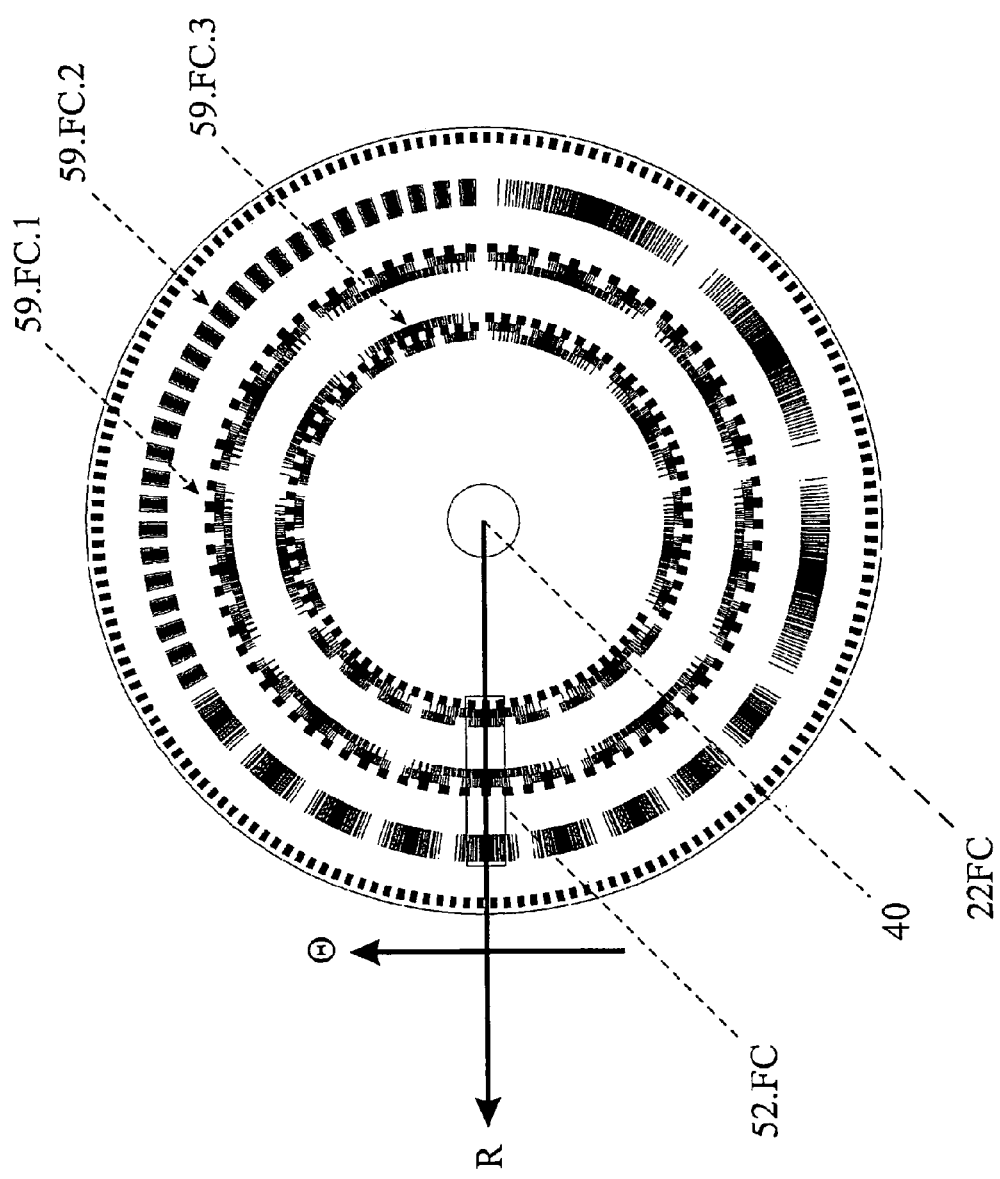
FIG. 15 is a top view of embodiment 22FD of modulator 22 of FIG. 1A, to be used with Detection-System Frequency-Dependence Compensation Analyzer.

FIG. 15 is a top view of radiation modulator 22FC to illustrate another aspect of the invention. Modulator 22FC includes three different model calibration filter groups 59.FC.1, 59.FC.2, and 59.FC.3, each comprising three filters having different modulation periods, designed to gauge the frequency dependence of detection system 26. Calibration groups 59.FC.1, 59.FC.2, and 59.FC.3 substantially measure the same radiation component of target image 52 (e.g., by restricting the calibration filters to a substantially common annular region) with 3 different frequencies to provide three encoded frequency-dependence calibration components with substantially the same amplitude.

Computer 28.dec decodes the amplitudes and phases of the encoded frequency-dependence calibration components. The decoded amplitudes and phases are used as input by computer frequency-dependence calibration algorithm 28.utl(FCA) to gauge the frequency dependence of detection system 26. Computer algorithm 28.utl(FCA) outputs two calibration curves, amplitude vs. modulation frequency, and phase vs. modulation frequency, which are then used by computer 28 to decode and normalize other decoded components (not shown on modulator 22FC). Since a quadrature analysis and re-normalization of the encoded components expends more than twice the computing power of decoding components with well-know phase and normalization, it is preferred that the calibration curves are used to generate an updated set of decoding coefficients (which are passed by 28.utl(FCA) to 28.dec as shown in FIG. 1A):

$$T_{m,p}^{j} \equiv -(1 + \delta a_m)\frac{2}{\pi M}\cos\left(\frac{4jm\pi}{M} + (p + \delta p_m)\frac{\pi}{2}\right), \quad (28)$$

where $\delta a_m$, and $\delta p_m$ are the frequency-dependent amplitude and phase corrections, respectively, that compensate encoded component {m,p} for the frequency dependence of detection system 26. The frequency-dependent amplitude and phase corrections $\delta a_m$, and $\delta p_m$, and the updated decoding coefficients, $T_{m,p}^{j}$, are recalculated from the calibration curves as often as defined by the application; e.g., triggered by one or more temperature sensors and/or timers. In this manner, the frequency dependence of detection system 26 is prevented from corrupting the results of the application-specific computer algorithm 28.asf.

FIG. 15 illustrates three groups of frequency-dependence calibration components, having different modulation frequencies, for use in Detection-System Frequency-Dependence Compensation Analyzer. Calibration group 59.FC.1 comprises three adjacent, concentric radiation filters having different modulation frequencies. Calibration group 59.FC.1 is subject to errors resulting from non-constant, non-uniform radial intensity distributions. Calibration group 59.FC.2 comprises three radiation filters occupying sequential annular segments within a common annular region. This design is preferable to 59.FC.1, but is subject to errors resulting from sub-rotational period intensity transients. Calibration group 59.FC.3 comprises three interlaced radiation filters having different modulation frequencies. This design is the most preferable, as it is substantially immune to non-uniform radial intensity distributions and sub-rotational period intensity transients.

The calibration groups shown in FIG. 15 are intended to be combined with application specific patterns; e.g., the optimized Chemometric patterns of the Multivariate Chemometric Analyzer described above. In this manner, the application specific components can be compensated for the frequency dependence of detector 26.

In modulator 22FC, the number of filters in each frequency-dependence calibration group, and the configuration of the annular regions and annular segments was chosen for illustrative purposes, and is not intended to limit the scope of the invention.

Short-Path Post-Encoder Optic

In many applications of analyzer 100 of FIG. 1, there are driving concerns that limit the length of the optical path between the modulator 22 and detector 26 (or the entrance to a sample cell). For example, a short optical path is desirable in analyzers that measure spectral components subject to interference in the uncontrolled path. Another common design constraint is the size of the detector element cross section (or sample-cell cross section), which dictates the maximum allowed spot size of the encoded beam at the surface of detector 26 (or sample-cell aperture). One of the most significant engineering challenges of the present invention is the design post-encoder optic 36B for embodiments where one or more dimensions of the detector element (or sample cell 38) cross section are substantially smaller than (e.g., less than ¼) the length of target image 52 along the radial axis of modulator 22. This challenge is compounded in embodiments of analyzer 100 of FIG. 1A, where target image 52 is a dispersed image. Preferably, post-encoder optic 36B is designed such that two or more encoded spectral components (e.g., 56.1 and 56.2 of FIG. 1A) substantially overlap one another on the surface of the detector element or the entrance to sample cell 38.

In embodiments of analyzer 100 that use a reflective modulator 22, the detector cross section (or sample cell cross section) constraint leads to a short-path constraint as well, as the spindle wobble of modulator 22 about rotation axis 40 results in the movement of the focused encoder components (e.g., 56.1 and 56.2) on the surface of the detector element (or the sample cell entrance). The spindle wobble can lead to an envelope modulation of the detected radiation (e.g., if there are spatial variations in the responsivity of detector 26), the amplitude of which increases as the optical path length between modulator 22 and detector 26 increases. If the optical path is too long, encoded beam 56 may periodically walk off the detector element entirely, leading to abrupt discontinuities in one or more of the encoded waveforms and a corresponding corruption of the decoded amplitudes. In these and other applications, it is desirable to engineer post-encoder optic 36B to provide a short optical path between modulator 22 and detector 26, and produce an encoded beam spot on the surface of detector 26, comprising the substantially overlapping images of the encoded components. Preferably, the size of the spot is substantially the same as the size of the element of detector 26, although the spot size can also be smaller than the size of the element of detector 26. More preferably, the radiation density (illumination) of each of the encoded components is substantially uniform over the area of detector 26. In this manner, the effects of spindle wobble on detected signal 27 can be minimized.

In the discussion that follows, we describe two configurations, SP1 and SP2, for a compact, Short-Path post-encoder optic for a 25.6 mm×2.0 mm dispersed image, created with (approximately) F/4 pre-encoder optics (i.e., spectrograph optics), and using a reflective embodiment of modulator 22. The dispersion axis of target image 52 is along a radial axis of modulator 22. The Short-Path post-encoder optic has a total optical-path length (on centers) of less than the diameter of modulator 22, and focuses a minimum of 20% of each encoded radiation component (or an average of 20% over all encoded components) onto a 3.0 mm×3.0 mm cross sectional area (e.g., a detector element, or a sample cell aperture).

FIG. 16A illustrates one embodiment, Configuration SP1, for a compact, short-path post-encoder-optic for use in spectrum radiation analyzer 100. Configuration SP1 was engineered for an embodiment of analyzer 100 where detector element 26.SP.1 has a cross section of 3 mm by 3 mm, and target image 52 is a dispersed image (in the 3.0 to 5.0 micron spectral range) having dimensions of 25.6 mm and 2.0 mm, parallel and perpendicular to the dispersion axis, respectively. The SP1 configuration for post-encoder optic of analyzer 100, 36B(SP1), comprises the following elements, in sequential order beginning at the target image 52 on the surface of modulator 22 and ending at detector element 26.SP.1 (in the discussion of SP1 that follows, we do not consider bandpass filter 26.SP.3 or detector window 26.SP.2):

Configuration 36B(SP1):
36B(SP1).1: a bi-conic reflector,
36B(SP1).2: a planar fold mirror, and
36B(SP1).3: a plano-convex focusing lens.

Configuration SP1 has the advantage of exploiting the chromatic dispersion of the focusing lens to provide a smaller encoded beam spot on the surface of detector 26.SP.1, but the spectral range of 36B(SP1) is limited by the transmission properties of 36B(SP1).3. Preferably, 36B(SP1).3 is integrated into detector 26.SP.1 so that the transmission of 36B(SP1).3 can be matched with the spectral responsivity of detector 26.

As shown in FIG. 16A, for 36B(SP1), the 128 dispersed radiation components encoded by modulator 22,56.SP.{1, 128}, are collected by bi-conic reflector 36B(SP1).1, reflected by fold mirror 36B(SP1).2, and focused by lens 36B(SP1).3 onto detector element 26.SP.1. As shown in FIG. 16A, radiation components 56.SP.{1,128} substantially overlap one another on the surface of detector element 26.SP.1. The total length of the on-centers optical path for 36B(SP1) is roughly 41 mm (i.e., roughly ⅔ of the radius of modulator 22).

FIG. 16B shows the collection efficiency vs. wavelength (i.e., the individual collection efficiencies of the 128 encoded spectral components) for post-encoder optic 36B(SP1) shown in FIG. 16A. The collection efficiency is defined as the fraction of radiation in a given encoded radiation component collected from target image 52 and directed onto detector element 26.SP.1 (i.e., intercepts 26.SP.1). The collection efficiencies shown in FIG. 16B for configuration SP1 include the effects of the restricted field of view (FOV) of a commercially available PbSe detector. As shown in FIG. 16B, for configuration SP1, the average collection efficiency is greater than 70%, and the range for individual encoded components is between 67% and 89%.

Bi-conic reflector 36B(SP1).1 has an illuminated aspect ratio greater than 3:1, and radii of curvature that differ by roughly a factor of two (e.g., 46 mm and 27.5 mm), with the long dimension and long radius parallel to the dispersion axis. Bi-conic reflector 36B(SP1).1 counteracts the dispersion of 52 to provide a focused encoded beam 56.SP.{1,128} of substantially overlapping components. Fold mirror 36B(SP1).2 is used to reflect the encoded beam away from modulator 22 to provide room for the placement of detector 26.SP.

Figures 16C, 16D:
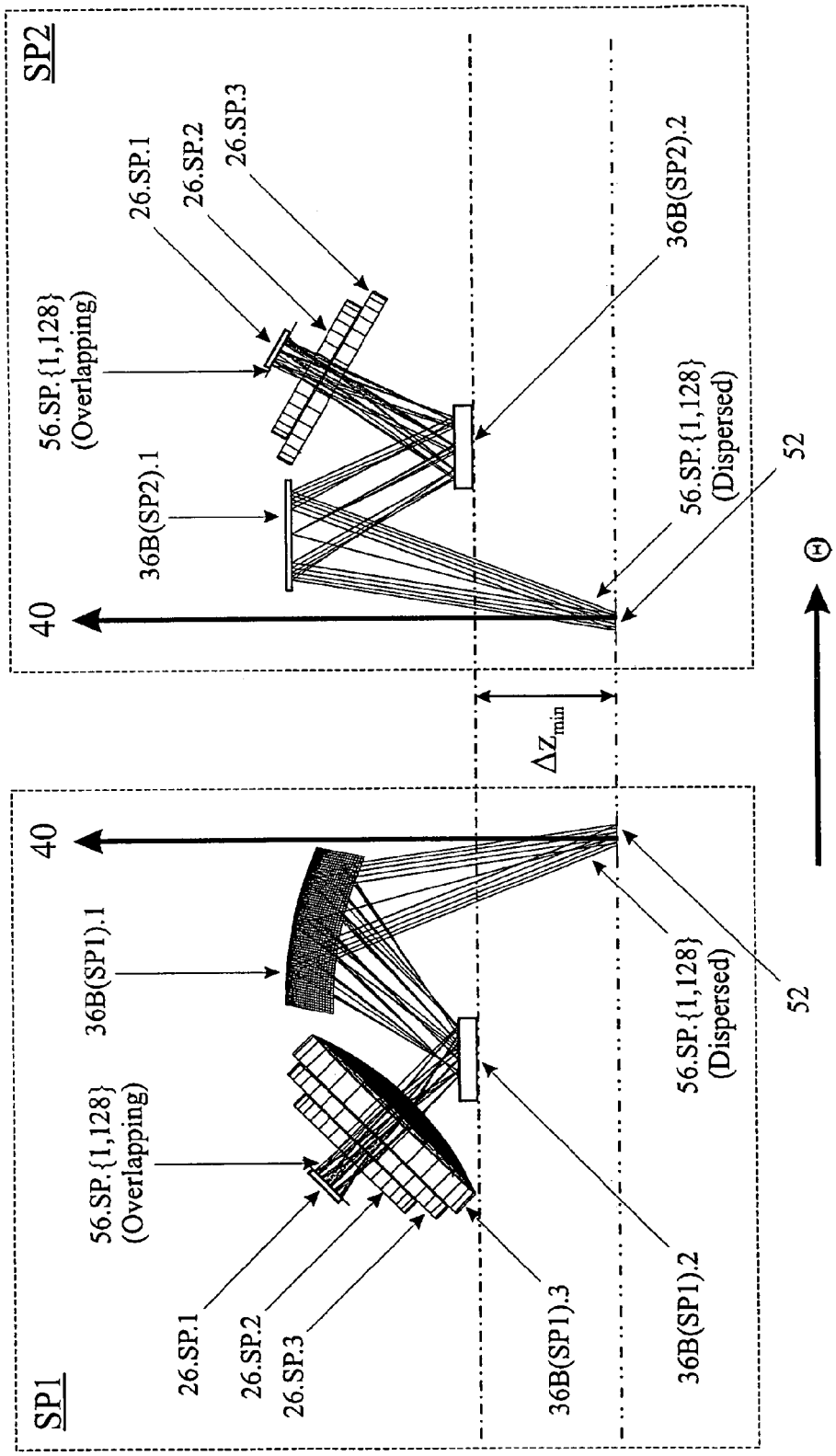
FIG. 16C is a schematic side-view of the SP1 (Short-Path) embodiment of post-encoder optic 36B of FIG. 1.
FIG. 16D is a schematic side-view of the SP2 (Short-Path) embodiment of post-encoder optic 36B of FIG. 1.

FIG. 16C is a side-view of 36B(SP1). As shown in FIG. 16C, fold mirror 36B(SP1).2 is located in a plane (shown as the dot dash line) parallel to the plane of modulator 22 (shown as the double-dot dash line). In order to minimize the size of 36B(SP1), the plane of fold mirror 36B(SP1).2 is parallel and as close to the surface of modulator 22 as practical; e.g., $\Delta z_{min}$ is the minimum clearance between modulator 22 and 36B(SP1).2 as determined by the brackets and fixtures (not shown) required to position the components of 36B(SP1) relative to modulator 22; e.g., $\Delta z_{min}$ is less than 2 inches.

Focusing lens 36B(SP1).3 is a spherical plano-convex lens with a radius of curvature of roughly 18 mm, and is used to focus the encoded beam through detector window 26.SP.2 onto detector element 26.SP.1. Preferably, the material focusing lens of 36B(SP1).3 is selected to exploit the effects of chromatic dispersion to produce a smaller, more overlapping, and/or more uniform encoded beam 56.SP.{1,128} on the surface of detector element 26.SP.1.

Configuration SP1 for post-encoder optic 36B has a total optical-path length (on centers) of 41 mm (i.e., roughly ⅔ of the radius of modulator 22).

FIG. 16D illustrates a side-view of a second configuration, SP2, for post-encoder optic 36B of analyzer 100 that uses two Fresnel bi-conic reflectors in place of the bi-conic mirror, plane mirror and the plano-convex focusing lens of 36B(SP1). Configuration SP2 was also engineered for an embodiment of analyzer 100 where detector element 26.SP.1 has a cross section of 3 mm by 3 mm, and target image 52 is a dispersed image (in the 3.0 to 5.0 micron spectral range) having dimensions of 25.6 mm and 2.0 mm, parallel and perpendicular to the dispersion axis, respectively. As shown in FIG. 16D, configuration SP2 comprises the following elements, in sequential order beginning at the target image 52 on the surface of modulator 22 and ending at detector element 26.SP.1 (in the discussion of SP2 that follows, we do not consider bandpass filter 26.SP.3 or detector window 26.SP.2):

Configuration 36B(SP2):
36B(SP2).1: a Fresnel bi-conic reflector,
36B(SP2).2: a Fresnel bi-conic reflector, Configuration SP2 has the advantage of having one fewer optical element in the design. Configuration SP2 also has the significant advantage of being comprised entirely of reflective components, which makes it useful for a variety of embodiments of analyzer 100 encoding radiation a number of different wavelength ranges. As shown in FIG. 16D, the facets of 36B(SP2).1 are engineered such that it can be located in a plane (shown as the dot dash line) parallel to the plane of modulator 22 (shown as the double-dot dash line), which significantly simplifies the design and assembly. In order to minimize the size of 36B(SP2), the plane of Fresnel bi-conic reflector 36B(SP2).2 is parallel and as close to the surface of modulator 22 as practical; e.g., $\Delta z_{min}$ is the minimum clearance between modulator 22 and 36B(SP2).2 as determined by the brackets and fixtures (not shown) required to position the components of 36B(SP2) relative to modulator 22; e.g., $\Delta z_{min}$ is less than 2 inches.

Configuration SP2 for post-encoder optic 36B also has a total optical-path length (on centers) of roughly ⅔ of the radius of modulator 22, and similar collection efficiencies. As shown in FIG. 16D, radiation components 56.SP.{1,128} substantially overlap one another on the surface of detector element 26.SP.1.

In configurations SP1 and SP2 for Short Path optic 36B, the various radii of curvature, the facets of the bi-conic Fresnel surfaces, and the spatial configuration of the individual optical elements were optimized using the User-Defined Operand (UDO) optimization procedure included with the Zemax® optical design program. The UDO optimization feature allows the user to create application-specific merit functions in the 'c' programming language. The UDO used to optimize the Short Path configurations described above, UDO.SP, uses the Zemax® ray-tracing engine to trace rays from source 24 to detector 26.SP as a function of wavelength. In UDO.SP, the total merit function, $\chi_{SP}$, is given by $$\chi_{SP} = \chi_{path} + \sum_{n=1}^{N_\lambda} \chi_n \qquad (29)$$

where, $\chi_{path}$ is the Path-Length Merit Function, the $\chi_n$ the Wavelength Efficiency Merit Functions, and the summation is over $N_\lambda$ selected spectral components of target image 52.

The Path-Length Merit Function used in UDO.SP is given by $$\chi_{path} = \exp\left(\frac{(L_{path} - L_{path}^0)}{\sigma_{path}}\right), \qquad (30)$$

where $L_{path}^0$ is the target maximum path length, $L_{path}$ is the on-centers optical path length (i.e., through the centers of the transmissive components, and to and from the centers of the reflective components of optic 36B) between target image 52 and detector element 26.SP.1, respectively, and $\sigma_{path}$ is an adjustable parameter that controls the penalty for $L_{path} > L_{path}^0$. In the optimization of SP1 and SP2, the target maximum path length was selected to be ⅔ the radius of modulator 22.

The Wavelength Efficiency Merit Functions, which measure the efficiency of post-encoder optic 36B as a function of wavelength, are given by $$\chi_n = \exp\left(\frac{(\varepsilon_n^0 - \varepsilon_n)}{\sigma_n}\right), \qquad (31)$$

where $\varepsilon_n^0$ and $\varepsilon_n$ are the target efficiency and the ray-trace efficiency computed by UDO.SP at the n-th wavelength $\lambda_n$, respectively, and $\sigma_n$ is an adjustable parameter which controls the penalty for $\varepsilon_n < \varepsilon_n^0$. In UDO.SP, detector element 26.SP.1 is given finite dimensions (e.g., 3 mm by 3 mm), and a finite field of view (FOV) (e.g., 45 deg.). The efficiency $\varepsilon_n$ is simply the fraction of rays (of at $\lambda_n$) traced from source 24 that intercept detector element 26.SP.1 with an angle of incidence less than the specified FOV. In the optimization of SP1 and SP2, 32 equally spaced wavelengths between 3 and 5 microns were traced, and the target efficiencies were all set to 70%. For each wavelength, multiple traces having different points of origin and different initial propagation vectors were used to simulate a finite source 24, and a finite entrance aperture 32.

By a judicious selection of the individual wavelength target efficiencies, $\varepsilon_n^0$, post-encoder optic 36B can be optimized to compensate for the spectral responsivity of detector 26.SP or the spectral efficiency of other optical components of analyzer 100 (e.g., source 24, pre-encoder optic 36A, etc . . . ). These and other variations are within the scope of the invention.

UDO.SP has an option to optimize the design of optic 36B to provide a more uniform illumination of the detector element for each spectral component. In this embodiment, UDO.SP substitutes the Uniform Illumination Merit Function $\langle \chi_n \rangle$ for $\chi_n$ $$\langle \chi_n \rangle = \sum_m^{N_m} \exp\left(\frac{\left(\frac{\varepsilon_n^0}{N_{in}} - \varepsilon_n^m\right)}{\sigma_n}\right) \qquad (32)$$

where $N_m$ is a parameter defining the number of equal-sized regions comprising the cross-sectional area of detector element 26.SP.1 (i.e., 26.SP.1 is diced up into $N_m$ equal-sized regions), and $\varepsilon_n^m$ is ray-trace efficiency computed by UDO.SP at the n-th wavelength and the m-th sub-area of detector 26. An embodiment of Short Path post-encoder optic 36B optimized with $\langle \chi_n \rangle$ will have substantially uniform illumination over the cross-sectional area of detector element 26.SP.1. In this manner, the effects of spindle wobble on detected signal 27 can be minimized.

With suitable substitutes for focusing lens 36B(SP1).3, post-encoder optic 36B can be used for a generalized class of dispersed images, having substantially identical angles of incidence, lengths, widths, and angles of dispersion. With minor variations, post-encoder optic 36B(SP1) can be incorporated into a wide variety of products based on analyzer 100. Since post-encoder optic configuration SP2 is comprised of all reflective components, 36B(SP2) can be incorporated into a wide variety of products based on analyzer 100, without modification, exploit the economics of scale. These and other variations are within the scope of the invention.

We note that obvious improvements can be made by introducing additional optical elements, non-spherical conic sections, refractive or diffractive elements, or gradient-index lenses to the design of 36B, and are within the scope of the invention, albeit, with a significant increase in cost and manufacturing complexity.

The dispersed image size, the pre-encoder optics F/#, the target efficiency, the position and curvature of the optical elements, the merit functions, and the number of encoded components were chosen for illustrative purposes. Other post-encoder optics, which are designed for transmissive modulators, different pre-encoder optics, different on-centers path length, different target efficiencies, different number of elements, different curvatures, different merit functions, and/ or incorporate nonlinear conic section, refractive or diffractive elements, or gradient-index lenses, are within the scope of the invention.

Encoded Filter-Photometer Analyzer

In another embodiment of analyzer 100 depicted in FIG. 1, Encoded Filter-Photometer Analyzer is a multi-channel-encoder filter-photometer that uses one or more broadband radiation sources and a collection (e.g., an array) of wavelength filters to provide a plurality of encoded spectrally filtered beams for probing one or more unknown samples.

In Encoded Filter-Photometer Analyzer, radiation from source 24 is filtered by a collection of wavelength filters to provide a first plurality of selected spectral components. Examples of sources include extended sources, multi-filament lamps, and an array of blackbody radiators. Examples of wavelength filters include multi-dielectric-layer bandpass filters, etalons and dichroic mirrors (e.g., stacked ½ and ¼ wave plates). Further examples of wavelength filters include radiometry correlation cells filled with various gasses or liquids. Further examples of wavelength filters include optical elements incorporating one or more partially transparent (or partially reflective) solids. Such and other examples of sources and wavelength filters, are within the scope of the invention.

Preferably, the collection of wavelength filters includes both analyte and reference wavelength filters to provide a first plurality of analyte and reference beams. Examples of analyte beams include radiation filtered by $CO$, $CO_2$, $NO_x$, $N_2O$, $H_2O$, $H_2S$, solvents and various hydrocarbons, including the constituents of natural gas. Due to the inherent danger, radiation filtered by chemical weapons and other toxic gasses and liquids make less practical examples of analyte beams. Further examples of analyte beams include radiation filtered by one or more multi-dielectric-layer bandpass filters or dichroic mirrors where the selected spectral components are engineered to substantially coincide with one or more significant spectral features of a corresponding analyte; e.g., the analyte beams comprise one or more optimized spectral components of Multivariate Chemometric Analyzer. Examples of reference beams include radiation filtered by $N_2$, water, a solvent, or full or partial vacuum. Further examples of reference beams include radiation filtered by one or more multi-dielectric-layer bandpass filters where the selected spectral components are engineered to minimize the coincidence with any significant spectral features of all analytes potentially in the sample.

The radiation filtered through the collection of wavelength filters is imaged with pre-encoder optic 36A to form target image 52 substantially along a radial axis of modulator 22. Target image 52 comprises a first plurality of sub-images corresponding to the radiation transmitted through the wavelength filters, which are focused (or centered) at substantially different radial positions along one or more radial axes of modulator 22. Modulator 22 has a number of radiation filters at different radii for encoding target image 52 to provide a second plurality of encoded beams as modulator 22 is rotated about rotation axis 40. Preferably, the sub-images are aligned with the radiation filters such that the encoded beams have a substantially one to one correspondence with the radiation transmitted through the individual wavelength filters.

Preferably, the encoded analyte and reference beams are propagated though (or reflected from) one or more samples. Examples of samples include ambient air, automobile exhaust, a process stream, the internal air of a cargo container, a HVAC intake, ductwork or exhaust, and natural gas. If the sample is a gas or liquid, it is preferred that the sample be bounded by a sample cell. Further examples of samples include transmissive and reflective solids.

In one embodiment of Encoded Filter-Photometer Analyzer, multiple sample cells are used to provide multiplexing from multiple gas and/or liquid samples. The configuration of pattern 21 and post-encoder optic 36B are engineered to provide application-specific groups of analyte-reference beam pairs to each of the sample cells. For example, the first sample cell contains two unknown analyte concentrations—and employs at least two analyte-reference beam pairs for the analysis, and the second sample cell contains five unknown analyte concentrations—and employs at least five analyte-reference beam pairs for the analysis. If the application calls for two or more samples to be probed with identical analyte-reference beam pairs, multiple detectors and ADCs can be used as described below. In this manner, multiple samples can be probed substantially simultaneously.

After propagating through the sample, the encoded correlation beams are collected, directed, and focused by post-encoded optic 36B onto detector 26, and computer 28 analyzes the signals generated by detector 26 in response to the encoded beams to determine the amplitudes of the encoded components. The amplitudes of the encoded components are subsequently used by application specific algorithm 28.asf to determine the presence and concentrations of one or more analytes in the sample.

Preferably, the analyte and reference beams (and their respective target sub-images) are configured as pairs in sequence along the radial axis of modulator 22 (i.e., each analyte beam is adjacent to a corresponding reference beam), or symmetric with respect to one or more symmetry radii (i.e., each analyte beam is mirrored to a corresponding reference beam about one or more symmetry radii), to comprise a analyte-reference pair having substantially identical optical paths within the sample, and/or substantially identical normalized intensity distributions on the surface of detector 26. More preferably, the analyte and reference beams of a given pair are encoded with a complementary filter pair, such that the amplitude and phase of the resulting encoded component are determined by the relative intensity of the analyte and reference beams. Most preferably, the relative modulation intensity of the complementary filters are engineered (e.g., by inserting an aperture or a neutral density filter in the path of the corresponding reference bear, or by varying the width or modulation depth of the radiation filter encoding the reference beam with respect to the radiation filter encoding the analyte beam) to null the resulting encoded component in the absence (or a nominal level) of a correlating absorption in the sample cell. In this manner, Encoded Filter-Photometer Analyzer provides a filtered photometric measurement of the highest photometric accuracy.

Preferably, the spectral range of each analyte-reference beam pair is limited (e.g., by one or more dichroic mirrors, bandpass filters, and/or cells filled with various gasses or liquids, including one or more constituents of natural gas), to isolate one or more significant spectral features of the analyte, or exclude one or more significant spectral features of one or more different (other) analytes. In this manner, the sensitivity (e.g., the amplitude of the encoded analyte-reference pair in response to a given concentration of the analyte in the sample cell), and/or the specificity (e.g., the ability to discriminate between two or more analytes) of the instrument to the analytes in the sample can be enhanced. For example, a cell filled with methane (the dominant constituent of natural gas) can be used to exclude the spectral features of methane in reference filtered components and non-methane analyte filtered components used in the analysis of natural gas.

The path of a given encoded beam through the system (including the sample or correlation cell) is actually a superposition of the paths from all optical ray traces which begin at source 24, reflect from the active area of the corresponding radiation filter on modulator 22, and reach detector 26. As a consequence, the superposition of paths changes as the pattern of the radiation filter within the active area changes as modulator 22 rotates. In the presence of absorbing analytes where the attenuation of the beam depends of the path length, the variation in the superposition of the paths can lead to a waveform distortion of an encoded component. In the present invention, these effects can be minimized by reducing the number of abrupt discontinuities along one or more axes in the pattern of the radiation filters. Preferably, the radiation filters of modulator 22 comprise the "bar-code" or "checkerboard" like patterns described above to provide one or more encoded components with a substantially constant superposition of optical paths through the system.

Figure 17A:
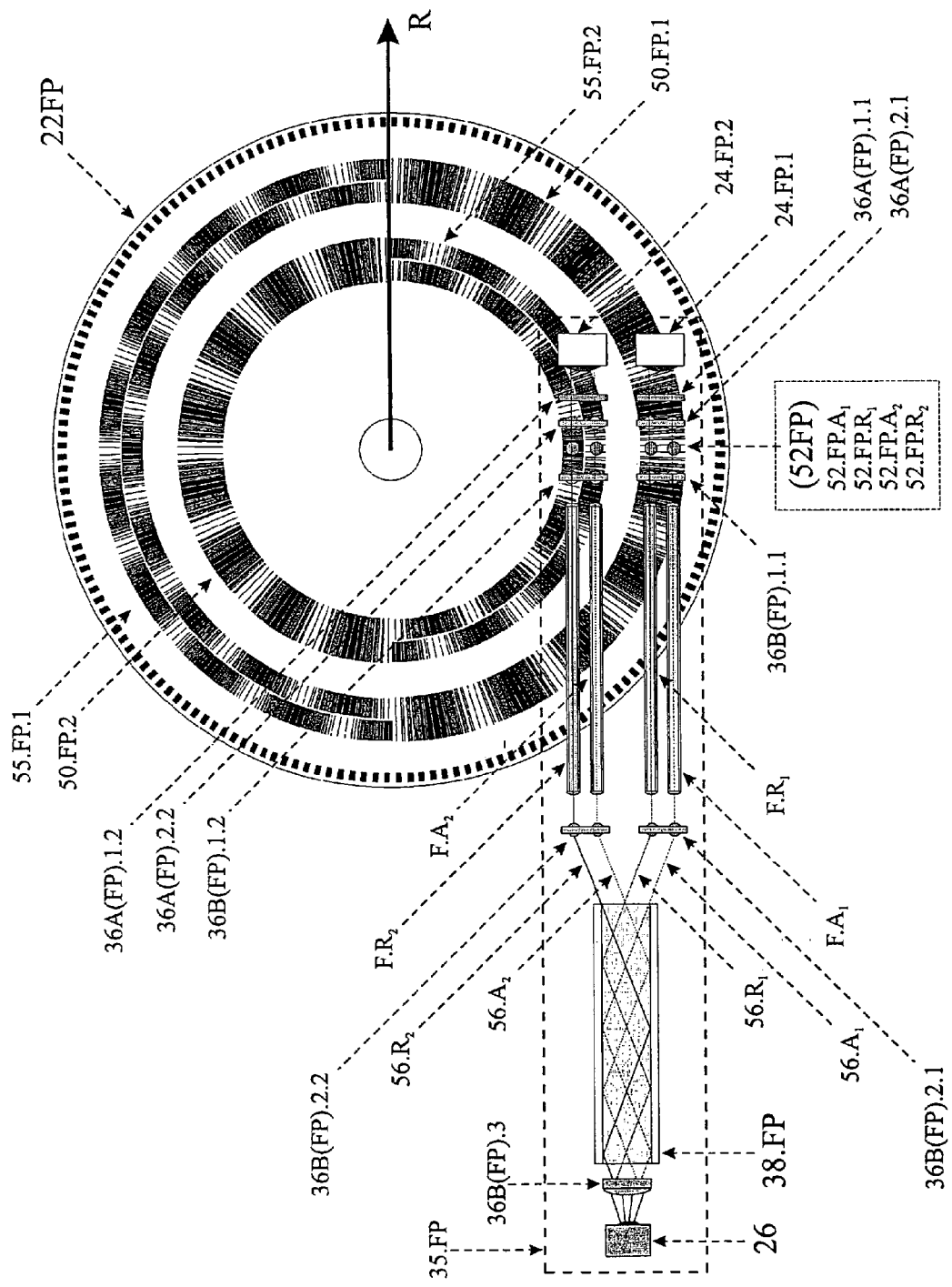
FIG. 17A is a schematic top-view of the Encoded Filter-Photometer Analyzer embodiment of radiation analyzer 100.

FIG. 17A is a schematic top view of an embodiment of Encoded Filter-Photometer Analyzer, which encodes radiation filtered by two analyte-reference correlation-cell pairs, $\{F.A_1, F.R_1\}$, and $\{F.A_2, F.R_2\}$, respectively. Correlation cell $F.A_1$ and correlation cell $F.A_2$ are filled with known concentrations of analytes $A_1$ and $A_2$, respectively. As shown in FIG. 17A, radiation is provided by two broadband or multi-spectral component radiation sources, 24.FP.1 and 24.FP.2. Radiation from source 24.FP.1 is collected and focused by pre-encoder optic 36A(FP).2.1 (e.g., a first lens pair) to form target sub-images $52.FP.A_1$ at a first point along a radial axis of modulator 22FP, and $52.FP.R_1$ at a second point along a radial axis of modulator 22FP. Similarly, Radiation from source 24.FP2 is collected and focused by pre-encoder optic 36A(FP).2.2 (e.g., a second lens pair) to form target sub-image $52.FP.A_2$ at a third point along a radial axis of modulator 22FP, and $52.FP.R_2$ at a fourth point along a radial axis of modulator 22FP. The target sub-images ($52.FP.A_1$, $52.FP.R_1$, $52.FP.A_2$ and $52.FP.R_2$) and the corresponding radiation sources (24.FP.1 and 24.F.P2) comprise target image 52 and radiation source 24, respectively.

As shown in FIG. 17A, pre-encoder optic 36A(FP) includes bandpass filter 36A(FP).1.1 to limit the spectral range of analyte-reference beam pair $\{56.A_1, 56.R_1\}$ to isolate one or more significant spectral components of analyte $A_1$, and bandpass filter 36A(FP).1.2 to limit the spectral range of analyte-reference beam pair $\{56.A_2, 56.R_2\}$ to isolate one or more significant spectral components of analyte $A_2$. For example, the bandpass filters are engineered to coincide with two of the optimized spectral windows of Multivariate Multivariate Chemometric Analyzer. In this manner, the amplitude change of the encoded analyte-reference pair in response to a given concentration of the analyte in the sample (i.e., the sensitivity) can be enhanced.

In an alternative embodiment of Encoded Filter Photometer shown in FIG. 17A, bandpass filter 36A(FP).1.1 or 36A(FP).1.2 can be replaced with a cell filled with various gasses, liquids or solids (e.g., one or more constituents of natural gas), to exclude one or more significant spectral features of one or more different (other) analytes. In this manner, the specificity (e.g., the ability to discriminate between two or more analytes) of the instrument to the analytes in the sample can be enhanced. For example, a cell filled with methane (the dominant constituent of natural gas) can be used to exclude the spectral features of methane in reference filtered components and non-methane analyte filtered components used in the analysis of natural gas.

Figure 17B:
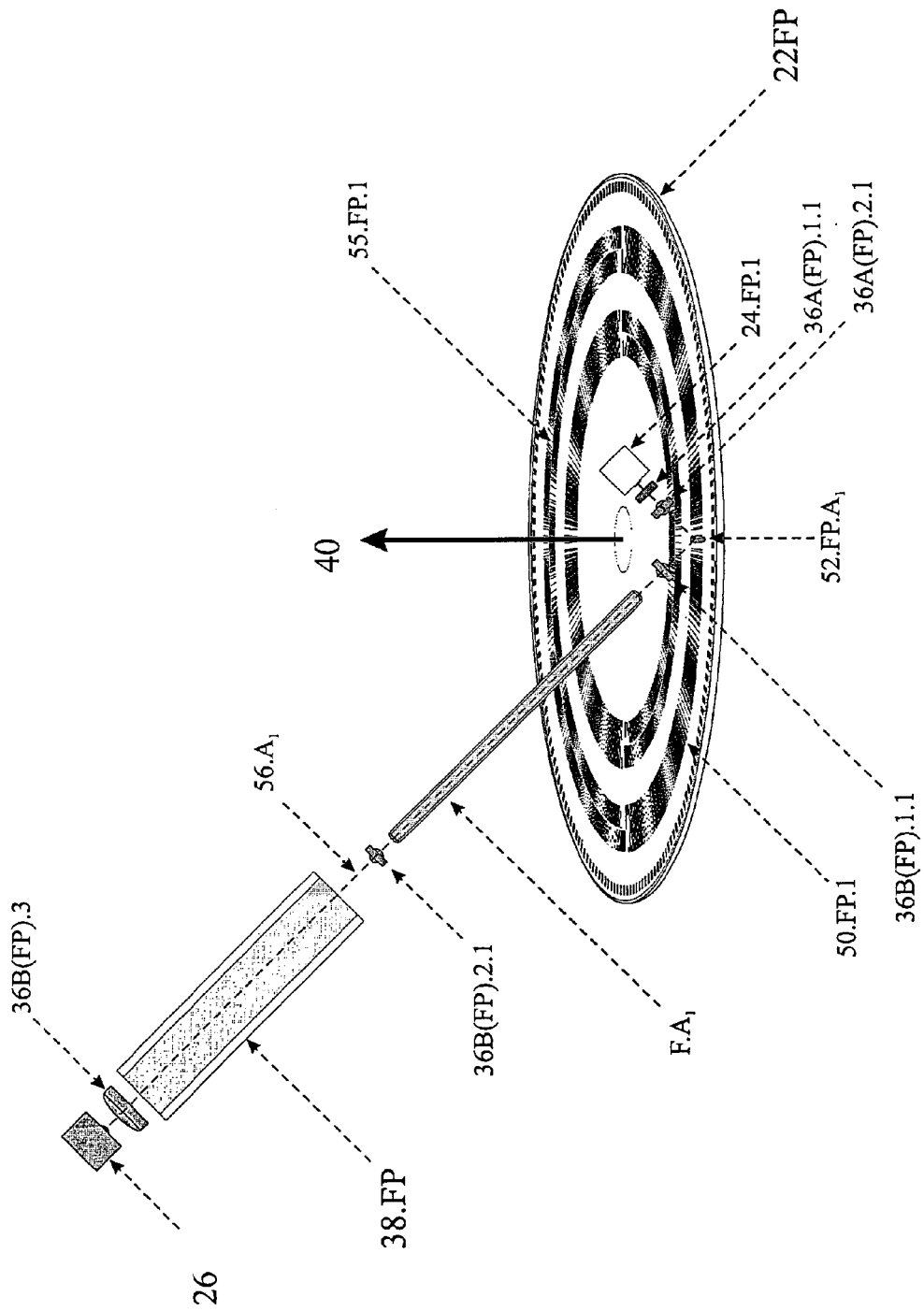
FIG. 17B is a schematic side-view of the Encoded Filter-Photometer Analyzer embodiment of radiation analyzer 100.

A schematic side view of Encoded Filter-Photometer Analyzer is shown in FIG. 17B to further illustrate the path of beam $56.A_1$ from source 24.FP.1 to detector 26. As shown in FIG. 17B, radiation from source 24.FP.1 is filtered by bandpass filter 36B(FP).1.1 and collected and focused by pre-encoder optic 36A(FP).2.1 to form sub-image $52.FP.A_1$ on the surface of modulator 22FP. As modulator 22FP is rotated about rotation axis 40, sub-image $52.FP.A_1$ is sequentially encoded by radiation filter 50.FP1 and complementary radiation filter pair 55.FP1 to provide encoded beam $50.A_1$. Encoded beam $50.A_1$ is collected by post-encoder optic 36B(FP).1.1 and directed through correlation cell $F.A_1$, which contains a known concentration of analyte $A_1$. After propagating through correlation cell $F.A_1$, the encoded beam $56.A_1$ is collected by post-encoder optic 36B(FP).2.1 and directed though sample cell SC. After propagating through sample cell SC, encoded beam 56.FP.A1 is collected by post-encoder optic 36B(FP).3 and focused onto detector 26.

As shown in FIG. 17A, the analyte and reference cells, $F.A_1$, $F.R_1$, $F.A_2$, and $F.R_2$, of Encoded Filter-Photometer Analyzer are configured such that each analyte beam is adjacent to a corresponding reference beam, to comprise an analyte-reference beam pair having substantially identical paths within sample cell 38.FP, and/or substantially identical intensity distributions on the surface of detector 26. More preferably, the analyte and reference beams of a given pair are encoded with a complementary filter pair, such that the amplitude and phase of the resulting encoded component are determined by the relative intensity of the analyte and reference beams. Most preferably, the relative modulation amplitude of the complementary filters are engineered (e.g., by inserting an aperture or a neutral density filter in the path of the corresponding reference beam, or by varying the width or modulation depth of the reference filter with respect to the analyte filter) to null (e.g., by imposing comparable amplitudes for analyte and reference beams) the resulting encoded component in the absence (or a nominal level) of a correlating absorption in the sample cell.

In FIG. 17, the order of the optical elements was chosen for illustrative purposes and is not intended to limit the scope of the invention. For example, the position of the analyte and reference cell array with respect to the encoder is arbitrary. The radiation transmitted through the correlation cells can be encoded or the radiation can be encoded and then transmitted through the correlation cells. In addition, the sample cell can be placed anywhere between source 24 and detector 26 in the beam path. These and other variations are within the scope of the invention.

In reference to FIG. 9, for Encoded Filter-Photometer Analyzer described above, the position of the collection of spectrally filtered sub-images, the position of the array of analyte and reference wavelength filters, the position of the sample cell(s), and/or other optical elements, can be controlled to align target image 52 onto modulator 22, and align the encoded correlation beams to pass through the sample cell(s) onto the detector. As shown in FIG. 17A, all of the optical components can be pre-aligned, and mounted on a common stage, 35.FP, which can be moved relative to modulator 22FP to align target image 52.FP. Preferably, source 24.FP includes a number of alignment spatial components and modulator 22FP includes a number of alignment channels to provide input to the Alignment Calibration Algorithm 28.utl(ACA), which in turn, generates one or more control signals to position one or more optical elements (e.g., 35.FP) to align target image 52.FP onto modulator 22FP.

Preferably, pre-encoder optic 36A(FP) is engineered to provide analyte and reference sub-images (e.g., $52.FP.A_1$, $52.FP.R_1$, $52.FP.A_2$ and $52.FP.R_2$) at different radial positions along different radial axes. More preferably, the mechanical fixtures (brackets) used to position the individual elements of pre-encoder optic 36A(FP) (e.g., bandpass filters, sources, lenses) are engineered (e.g., by locating analyte-reference correlation-cell pairs at different radial positions and along different radial axes) to minimize the radial separation between analyte-reference pair sub-images (e.g., {52.FP.$A_1$, 52.FP.$R_1$}, and {52.FP.$A_2$, 52.FP.$R_2$}).

Preferably, the position of the individual filaments and the position of the individual radiators are engineered in conjunction with the placement of radiation filters to simplify the design of pre-encoder optic 36A(FP); e.g., match the pitch of the filaments and/or radiators to the pitch of the radiation filter pairs on modulator 22.

Phase-Locked Noise-Rejection Analyzer

In many applications of analyzer 100 of FIG. 1, there are one or more substantially periodic noise sources in the system (e.g., source drive current, switching power supplies, 60 Hz line, back-EMF from motors and cooling fans, etc . . . ) that corrupt the encoded signal digitized by 28.adc. Without active phase locking, the phase of the periodic noise source drifts with respect to the phase of the encoded radiation components, leading to an unpredictable corruption of the decoded amplitudes. If the phase of the noise source is phase-locked with respect to the rotation of the modulator, the corruption of the digitized encoded signal can be minimized or significantly eliminated by the judicious selection of the encoding harmonics.

In another embodiment of analyzer 100, Phase-Locked Noise-Rejection Analyzer includes a Noise Search Algorithm, 28.utl(NSA) and a Noise Phase Locking Algorithm, 28.utl(NPL), to phase-lock the rotation of modulator 22 to one or more periodic noise sources in order to minimize the corruption of the encoded components.

Figure 18:
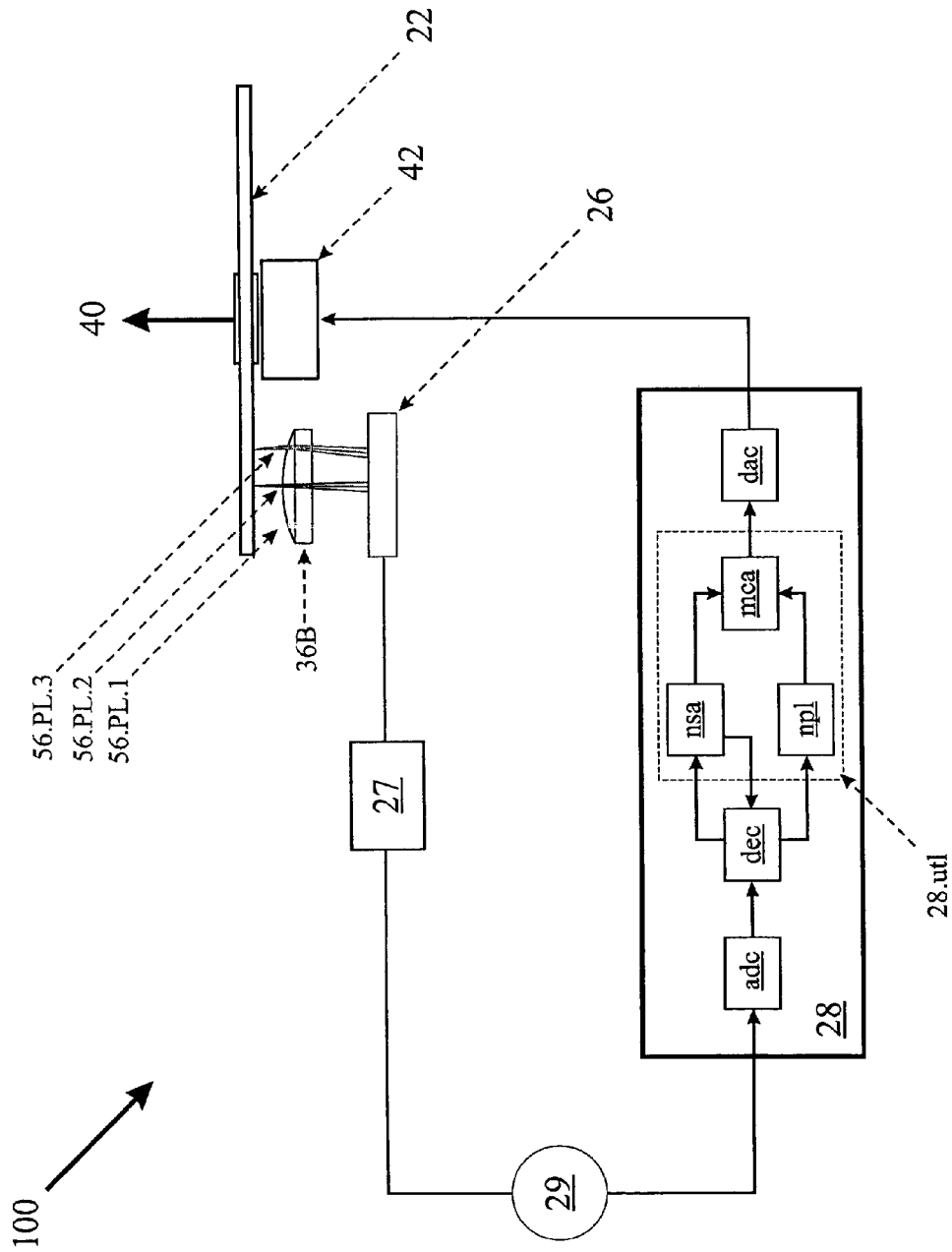
FIG. 18 is a schematic side-view of the Phase-Locked Noise-Rejection Analyzer embodiment of radiation analyzer 100.
Figure 19A:
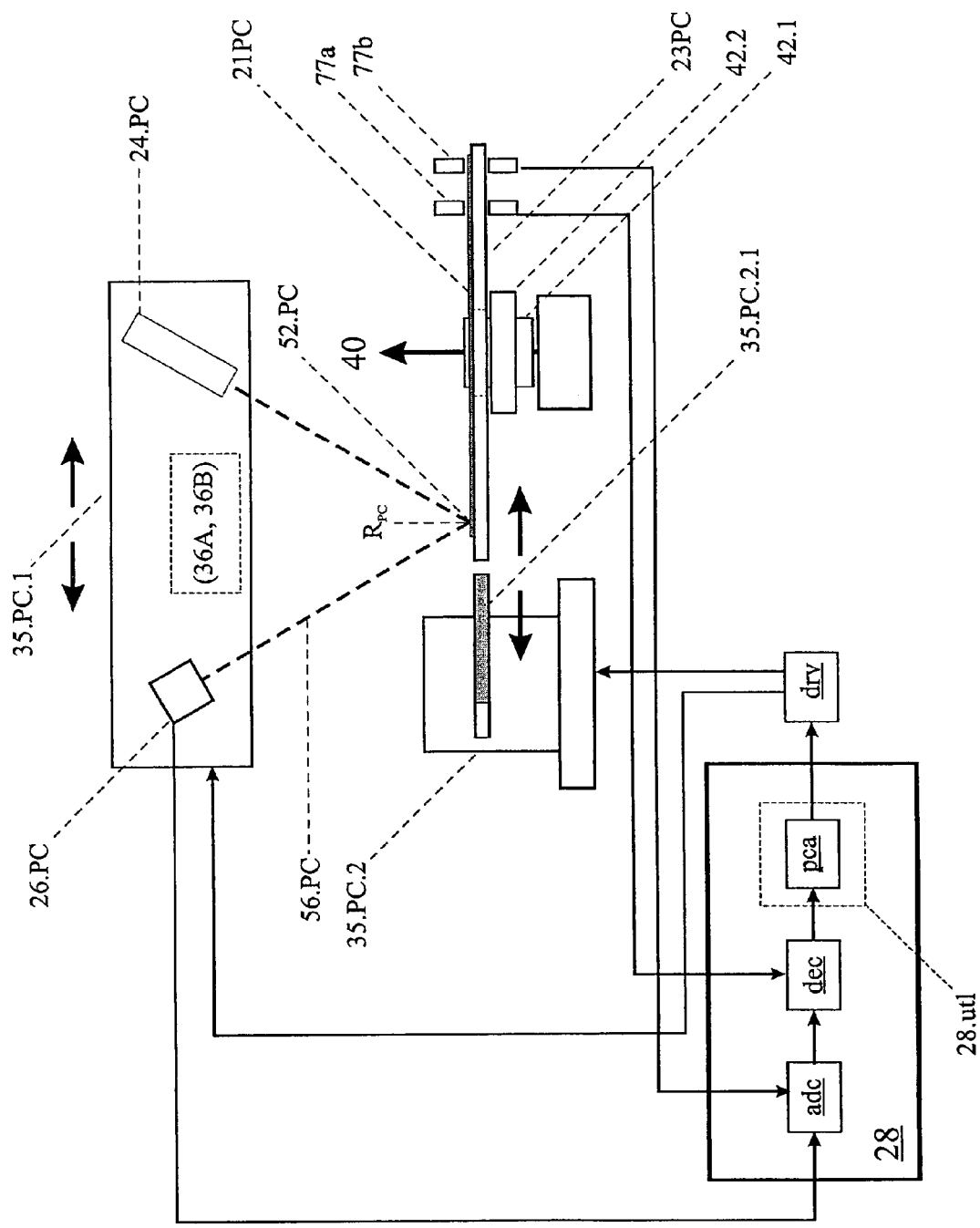
FIG. 19A is a schematic side-view of the Pattern Concentricity Analyzer embodiment of radiation analyzer 100.
Figure 19B:
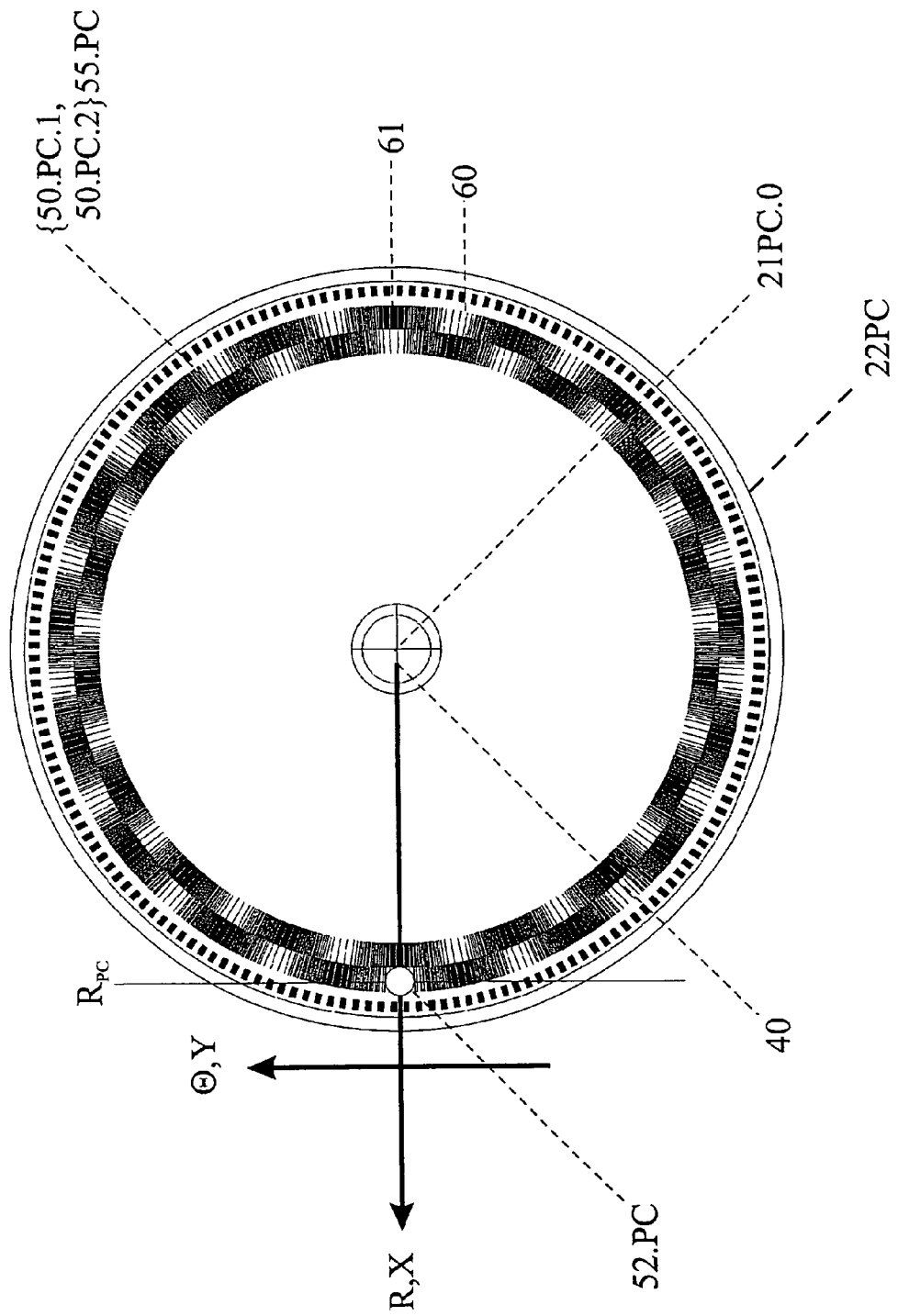
FIG. 19B is a top view of one embodiment of modulator 22 to be used with Pattern Concentricity Analyzer.

FIG. 18 is a schematic illustration of Phase-Locked Noise-Reduction Analyzer. As shown in FIG. 18, modulator 22 includes radiation filters to encoded radiation from source 24, to provide an encoded beam 56.PL as modulator 22 rotates about rotation axis 40. The modulation functions of the radiation filters are engineered to be harmonics of the rotation period of modulator 22. As such, the encoded beam comprises a set of encoded harmonics, 56.PL.1, 56.PL.2, and 56.PL.3. Encoded beam 56.PL is directed to detector 26 by post-encoder optic 36B, and computer 28 analyzes signal 27 generated by detector 26 in response to encoded beam 56.PL and corrupted by one or more substantially periodic noise sources, 29.

As shown in FIG. 18, computer 28 includes a Motor Control Algorithm 28.utl(MCA) and a digital-to-analog converter 28.dac to vary the speed of motorized spindle 42. In addition to decoding encoded components 56.PL.{1,2,3}, computer 28 decodes the amplitude and phases of a set of noise-tracking harmonics, which are also harmonics of the rotation period of modulator 22, but are not in the set of encoded harmonics. The noise tracking harmonics are provided to 28.dec by Noise Search Algorithm 28.utl(NSA). Preferably, the set of noise-tracking harmonics are interspersed with encoding harmonics of 56.PL.{1,2,3} to enable 28.utl(NSA) to better detect periodic noise source 29. More preferably, set of noise-tracking harmonics substantially correspond to the anticipated frequencies of one or more periodic noise sources (e.g., 29) at one or more default (or ideal) speeds of motorized spindle 42. Preferably, if periodic noise source 29 contains overtone harmonics (e.g., the periodic noise source is a square wave having odd-harmonic overtones), the set of encoding radiation filters providing 56.PL.{1,2,3} is engineered to omit the fundamental and one or more significant overtones of phase-locked periodic noise source 29.

At start-up, and whenever necessary thereafter, Noise Search Algorithm 28.utl(NSA) systematically varies the speed of motorized spindle 42 (e.g., by sending commands to 28.utl(MCA)), and 28.dec decodes the amplitude and phase of the noise-tracking harmonics until a spindle motor speed is found that maximizes the decoded amplitude of one or more noise-tracking harmonics. Computer 28 then uses the amplitude and phase of the dominant noise-tracking harmonic as input to Noise Phase Locking Algorithm (e.g., a phase-locked loop), 28.utl(NPL), which outputs a control signal to 28.utl (MCA), which controls the speed of motorized spindle 42 via 28.dac to stabilize or lock the phase of the dominant noise-tracking harmonic. In this manner, periodic noise source 29 is phase-locked with respect to the rotation of modulator 22, and therefore, is rendered substantially orthogonal to encoded components 56.PL.{1,2,3}.

In one embodiment of Phase-Locked Noise-Reduction Analyzer, the speed of motorized spindle 42 is synchronized with one or more pneumatic pumps in a closed-loop sampling system. In this manner, artifacts resulting from mass-density oscillations driven by the pneumatic pump can be minimized, compensated for, or analyzed.

Pattern-Concentricity Analyzer

One of the most critical tasks in the assembly of analyzer 100 is the mounting of modulator 22 onto motorized spindle 42. For the analyzer to operate properly, pattern 21 on modulator 22 must be substantially concentric with the axis of rotation 40. If modulator pattern 21 is not concentric with rotation axis 40, the selected radiation components will experience an unwanted secondary modulation as the annular regions of the radiation filters oscillate back and forth along the radial axis as modulator 22 is rotated about rotation axis 40.

In another embodiment of analyzer 100, Pattern-Concentricity Analyzer gauges the concentric alignment (i.e., the concentricity) of pattern 21 on modulator 22 with respect to axis of rotation 40. In Pattern-Concentricity Analyzer, pre-encoder optic 36A forms the target image of at least one alignment radiation component (e.g., the image of a He—Ne laser beam) onto an encoding plane along an encoding axis. Modulator 22 is located in the encoding plane and includes at least one complementary filter pair to provide an encoded alignment beam as modulator 22 is rotated about rotation axis 40. Preferably, the radiation filters comprising the alignment filter pair are substantially adjacent to one another. More preferably, the radial width of the alignment filter pair is substantially equal to the width of the alignment target image. Most preferably, the width of the image of the alignment component (i.e., the alignment target image) is twice as large as the maximum anticipated displacement of the center of modulator pattern 21 with respect to axis of rotation 40.

Fig. PCA is a schematic illustration of Pattern-Concentricity Analyzer, which gauges the concentric alignment of modulator pattern 21PC with respect to rotation axis 40. Radiation source 24.PC provides at least one radiation component for probing the concentricity of pattern 21PC. Pre-encoder optic 36A collects radiation from source 24.PC and forms target image 52.PC on the surface of modulator 22PC. As shown in Fig. PCB, in addition to application specific radiation filters and filter pairs (not shown), modulator 22PC includes complementary radiation filter pair 55.PC (comprising 50.PC.1 and 50.PC.2) to encode target image 52.PC as modulator 22PC rotates about rotation axis 40. As shown in FIG. PCA, encoded beam 56.PC is collected by post-encoder optic 36B and directed onto detector 26.PC. Preferably, radiation source 24.PC is sufficiently collimated as to make optics 36A and 36B unnecessary. Computer 28 analyzes the signals generated by detector 26.PC in response to encoded alignment beam 56.PC to determine concentricity of modulator pattern 21PC with respect to rotation axis 40.

Fig. PCB illustrates the difference between the center of the modulator patter, 21PC.0, and rotation axis 40. The vector displacement of pattern center 21PC.0 relative to rotation axis 40 is defined as the concentricity error. Modulator pattern 21PC is said to be concentric with respect rotation axis 40 in the limit where the concentricity error goes to zero.

For the discussion that follows, we define the ideal border radius, $R_{PC}$, as the radial position of the border between 50.PC1 and 50.PC2 when modulator pattern is concentric with respect to rotation axis 40. Preferably, pre-encoder optics 36A substantially positions alignment target image 52.PC in the encoding plane at ideal border radius $R_{PC}$.

As shown in Fig. PCA, radiation source 24.PC, pre-encoder optics 36A, post-encoder optics 36B, and detector 26.PC are mounted on translation stage 35.PC.1, aligned substantially parallel to the radial axis of motorized spindle 42, to allow one to precisely position alignment target image 52.PC on the surface of modulator 22PC at ideal border radius $R_{PC}$.

Computer 28 includes Pattern Concentricity Algorithm, 28.utl(PCA), which analyzes the amplitude and phase of encoded alignment component 56.PC as a function of the rotation angle to determine the displacement vector of the center of modulator pattern 21PC with respect to rotation axis 40. For example, if the alignment component is centered at the ideal border radius, the amplitude of encoded alignment component 56.PC is nulled when modulator patter 21PC is concentric with respect to rotation axis 40. If pattern 21PC is not concentric with respect to rotation axis 40, the sign of the phase change and the angular positions of the amplitude zero-crossings of the encoded alignment component provide all of the information needed to determine the displacement vector of the center of modulator pattern 21PC with respect to axis of rotation 40. If the magnitude of the displacement vector is less than one-half the width of the image of the alignment component, the magnitude of the displacement vector is substantially proportional to the maximum amplitude of the encoded alignment component.

Preferably, pattern-spindle concentricity Pattern-Concentricity Analyzer is combined with actuator mechanism 35.PC.2 for moving modulator into place. As shown in Fig. PCA, computer 28 includes a control signal from hardware driver to actuator mechanism 35.PC.2. Actuator mechanism 35.PC.2 includes contact probe 35.PC.2.1 for moving modulator 22PC along the radial axis. Computer 28 moves the contact probe in response to the angular dependence of encoded alignment component 56.PC. The process continues until the amplitude of encoded alignment component 56.PC is substantially independent of the rotation angle of modulator 22PC, preferably zeroed. As an alternative to using actuator mechanism 35.PC.2, 28.utl(PCA) can used to control audio or optical signals to provide an assembly technician with feedback as modulator pattern 21PC is hand positioned (e.g., tapped) into substantial concentric alignment.

Preferably, pattern-spindle concentricity Pattern-Concentricity Analyzer is combined with a mechanism for securing modulator 22 to motorized spindle 42 (e.g., using a UV-curing epoxy and a triggered flash lamp). As shown in Fig. PCA, motorized spindle includes epoxy seat 42.2 which is covered with a UV-curing epoxy. Modulator disc 22PC is placed on top of epoxy seat 42.2, and the alignment process begins. Once modulator pattern 21PC is substantially concentric with respect to rotation axis 40 (e.g., the concentricity error is similar to the radial run-out of motorized spindle 42), a UV lamp is triggered to cure the epoxy and secure modulator 22PC onto motorized spindle 42.

Preferably, motorized spindle 42 and modulator 22PC can be removed from Pattern-Concentricity Analyzer and installed into other embodiments of analyzer 100. In this manner, source 24.PC, pre-encoder optic 36A.PC, post-encoder optic 36B.PC, detector 26.PC, computer 28 and mechanisms 35.PC.1 and 35.PC.2 comprise an assembly tool (e.g., a centering station).

EXAMPLES

The present invention will be further described by the following examples, which should be referenced to analyzer 100 of FIG. 1A, unless stated otherwise. For easier reference, embodiments described below in the examples of a particular element or system in FIG. 1A or other figures herein are typically given composite symbols, such as the number of the element in FIG. 1A or other figures herein, followed by a decimal point and a number or followed by letters. For example, 100.1 is the number in an example below of one embodiment of the analyzer 100, where this embodiment is different from another embodiment 100.2 of the analyzer 100. Where an embodiment includes more than one components, the composite symbol comprises the number of the element in FIG. 1A or other figures herein, followed by a decimal point, a first number or letters indicating an embodiment of the element, and followed by another decimal point and a second number to indicate a particular component of such embodiment. In example 1, for example, 36B.1.1 and 36B.1.2 indicate the first and the second components respectively of the first embodiment of post-encoder optic 36B in FIG. 1A or other figures herein. These composite symbols are not shown in FIG. 1A or other figures herein to simplify the figures. Additional components introduced by the examples will be given unique symbols.

These examples are intended to embody the invention but not to limit its scope. In all of the examples described below, it is preferred that each of the modulation functions are smooth functions or digitized replicas of smooth functions having three or more distinct levels of contrast as the spatial radiation modulator is rotated about rotation axis 40. Most preferably, the modulation functions are of the form $\sin^2(m\theta + p\pi/4)$.

Example 1

The first example of the multi-purpose analyzer 100 depicted in FIG. 1A, analyzer 100.1, is a multi-spectral-component encoded source with a high-intensity, collimated beam, which is used to measure radiation absorbing gasses and vapors in one or more long, open paths, such as gasses and vapors in FIG. 1A at 38 where the gasses and vapors are not confined by any enclosure. Examples of long, open paths include the atmosphere, the restricted air space between microwave transceivers, the line of sight between buildings or highway overpasses, between remote objects on the battlefield, and along the perimeter of a military compound or industrial facility. Radiation source 24.1 is a collimated radiation beam having a plurality of selected spectral components (e.g., a carbon dioxide laser). Pre-encoder optic 36A.1 includes at least one diffractive or refractive element to separate the selected spectral components to form target image 52.1 along a radial axis of modulator 22.1. Preferably, pre-encoder optic 36A.1 includes a variable attenuator to precondition or preset the intensities of the selected components. Target image 52.1 is a dispersed image comprising selected spectral components focused at substantially different points along one or more radial axes of modulator 22.1. Modulator 22.1 includes a number of radiation filters that encode the selected spectral components to provide an encoded beam comprising a plurality of encoded spectral components as modulator 22.1 is rotated about rotation axis 40. Preferably, target image 52.1 is aligned with the radiation filters such that the encoded components have a substantially one to one correspondence with the selected spectral components. Preferably, a first post-encoder optic 36B.1.1 includes at least one diffractive or refractive element to substantially re-collimate the encoded components (e.g., 36A.1 and 36B.1.1 comprise at least one grating pair, prism pair or prism-grating combination). In this manner, the encoded beam can be propagated over a long, open path to a remote reflector or various target objects providing diffuse or specular reflectance and directed back to detector 26.1. Examples of remote reflectors include a retro-reflector, a simple mirror, a satellite, or various target objects providing diffuse or specular reflectance. A second post-encoder optic, 36B.1.2 (not shown in FIG. 1A), collects the encoded radiation beam and directs it back to detector 26.1. Computer 28.1 analyzes the signal generated by detector 26.1 in response to the encoded beam to determine amplitudes of the encoded components. In this manner, the spectral transmission properties of the open path between analyzer 100.1 and the remote reflector can be used as input to a Chemometric analysis to provide a chemical composition analysis of the long, open path; e.g., to detect flammable or toxic chemical, including chemical and biochemical weapons.

In a related embodiment of analyzer 100.1, the encoded beam is propagated over a long distance to at least one remote detector RD26.1 (similar to detector 26.1, but located at a remote location) shown in dotted lines in FIG. 1A. To simplify FIG. 1A, the optic for conveying the encoded beam to the remote detector RD26 is not shown. Preferably, the signals generated by RD26 in response to the encoded beam are sent back (not shown) to analyzer 100.1 for analysis by computer 28.1, which determines the amplitudes of the encoded components. More preferably, remote detector RD26 is augmented by a remote computer RC28 to comprise a remote receiver, and the timing and alignment signals are dispatched (e.g., via microwave signal, fiber optic or one or more additional encoded laser beams) to the remote receiver such that the detector signal can be analyzed at the remote location by RC28. Most preferably, the encoded beam is split up with a beam splitter and distributed along with the timing and alignment signals to a number of remote receivers. In this manner, the detector signals can be analyzed at each of the remote locations to provide substantially simultaneous spectral analysis in a number of different sample paths (e.g., in grid, perimeter, elevation, and/or fan-out patterns).

In another embodiment of analyzer 100.1, the collimated, encoded beam is launched into an optical fiber, waveguide, light pipe or purged (or evacuated) tubing and distributed to one or more remote sampling stations such that the uncontrolled path of the encoded beam is substantially limited outside of the remote sampling station. Preferably, each of the remote sampling stations include at least one remote detector RD26.1 and a remote computer RC28 (with the same decoding functionality as computer 28) for analyzing the signals generated by the detector and the timing and alignment signals. In this manner, the data acquired at the remote locations can be properly analyzed.

Preferably, pre-encoder optic 36A.1 and post-encoder optic 36B.1.1 can be substantially simplified by engineering source 24.1 to provide selected components spatially separated from one another (e.g., spatial variations in the gain medium or replace the partial mirror of a laser with a patterned array of dichroic mirrors). More preferably, source 24.1 is engineered to provide selected components at spatial locations that substantially match the pattern of radiation filters and filter pairs on modulator 22.1.

In reference to FIG. 9A. for the analyzer described above, the position of one or more optical element can be controlled to align target image 52.1 onto modulator 22.1. Preferably, modulator 22.1 includes one or more alignment radiation filters or filter pairs to encode one or more alignment components of source 24.1. The alignment components provide input to the Alignment Calibration Algorithm 28.utl(ACA).1, which in turn, generates one or more control signals to position one or more optical elements to properly align target image 52.1 onto modulator 22.1.

Example 2

The second example of the multi-purpose analyzer 100 depicted in FIG. 1A, analyzer 100.2, is a compact spectrum analyzer which uses a collection of bandpass filters or a linear variable filter (LVF) to provide a plurality of selected radiation components. In analyzer 100.2, the radiation source comprises a broad band or multi-wavelength source filtered by a linear array of two or more bandpass filters (or a linear array of two or more correlation radiometry filters; e.g., a collection of physical gas or liquid samples) or a linear variable filter (LVF). Taken together the radiation source and the collection of bandpass filters or LVF comprise extended source 24.2, having a number of spatial components corresponding to the radiation transmitted through (or reflected from) the individual bandpass filters or specific positions along the LVF. The radiation filtered by the array of bandpass filters or LVF is imaged by pre-encoder optic 36A.2 to form target image 52.2 substantially along a radial axis of modulator 22.2. Target image 52.2 comprises the sub-images of the radiation transmitted through (or reflected from) the collection of different bandpass filters or selected portions of LVF focused at substantially different points along said radial axis of modulator 22.2. Modulator 22.2 has a number of radiation filters at different radii for encoding the spatial components to provide an encoded beam as modulator 22.2 is rotated about the rotation axis 40. Preferably, the spatial components are aligned with the radiation filters such that the encoded components have a substantially one to one correspondence with the radiation transmitted through the individual bandpass filters or selected portions of the LVF. The encoded beam is collected, directed and focused with post-encoder optic 36B onto detector 26. Computer 28 then analyzes the signal generated by detector 26 in response to the encoded beam to determine the amplitudes of the encoded components. A sample or sample cell (e.g., sample 38 shown as a dashed line box in FIG. 1A) can be inserted between the source 24.2 and detector 26. In this manner, the spectral properties of a sample can be measured.

In reference to FIG. 9A. for the analyzer 100.2 described above, the position of the collection of bandpass filters or LVF (and/or other optical elements) can be controlled to align target image 52.2 onto modulator 22.2. Preferably, extended source 24.2 includes a number of alignment spatial components (e.g., a non-transmitting mask which obscures the border between individual bandpass filters or selected portions of the LVF) and modulator 22.2 includes a number of alignment channels to provide input to the alignment calibration algorithm 28.utl(ACA).2, which in turn, generates one or more control signals to position one or more optical elements to align target image 52.2 onto modulator 22.2.

Example 3

The third example of the multi-purpose analyzer 100 depicted in FIG. 1A, analyzer 100.3, is a spectrum analyzer, which is used for both analyzing and providing feedback to simultaneously control the center wavelengths of a number of tunable radiation sources. Radiation source 24.3 comprises a plurality of spectral components, where each spectral component corresponds to a distinct radiation source and is characterized by an intensity and a center wavelength. For example, radiation source 24.3 may be an optical fiber containing a plurality of optical signals, where each signal corresponds to a different radiation source. Radiation emitted by source 24.3 is imaged by pre-encoder optic 36A.3 to form a target image 52.3 onto modulator 22.3. Target image 52.3 comprises a plurality of sub-images focused at substantially different points along a radial axis of modulator 22.3, where each sub-image corresponds to a distinct radiation source. Pre-encoder optic 36A.3 comprises at least one diffractive element such that a change in the center wavelength of any one of the distinct radiation sources will cause the corresponding sub-image to move substantially along the radial axis of modulator 22.3. Modulator 22.3 has a number of radiation filter pairs (similar to 55.1 in modulator 22D of FIG. 7) at different radii for encoding the spectral components to provide an encoded beam as modulator 22.3 is rotated about rotation axis 40.3. The radiation filter pairs each comprise radiation filters having modulation functions that are complementary or out of phase so that the amplitude and phase of the encoded component is determined by the relative proportion of radiation incident on the two filters. The encoded beam is collected, directed and focused by post-encoder optic 36B.3 onto detector 26.3 and computer 28.3 analyzes the signals generated by the detector in response to the encoded beam. Computer 28.3 computes the amplitudes and phases of the encoded components from the signals generated by detector 26.3 in response to the encoded beam. Preferably, computer 28.3 generates a number of distinct control signals for adjusting the center wavelengths of the distinct radiation sources in response to the signals generated by detector 26.3 to tune the sources. Preferably, the radiation filters comprising each pair are substantially adjacent to one another, and the border between the adjacent radiation filters is substantially located at the radius which correspond to the radial position of a corresponding sub-image for the nominal or desired center wavelength for the corresponding tunable radiation source. In this manner, the amplitudes of the encoded components are zeroed (or nulled) when the center wavelengths of the radiation sources are tuned to the nominal or desired center wavelengths. Any deviation of a given tunable source from the preferred configuration results in a signal (in its corresponding modulation channel) in which the sign and amplitude of the decoded signal indicates the direction and magnitude of the displacement of the center wavelength, respectively. In such manner, the decoded signal can be used as a feedback mechanism to preserve the tunable sources in the optimum configuration. Thus, where temperature or other environmental changes cause the center wavelength to drift, the decoded signal may be used for tuning the tunable radiation source in order to maintain a stable and constant center wavelength, such as by changing the temperature or current of the source.

In reference to FIG. 9A. for the analyzer 100.3 described above, the position of one or more optical elements can be controlled to align target image 52.3 onto modulator 22.3. Preferably, source 24.3 includes a number of alignment spectral components (e.g., a reference laser or a number of lines of a gas or impurity spectrum) and modulator 22.3 includes a number of alignment channels to provide input to the alignment calibration algorithm 28.utl(ACA).3, which in turn, generates one or more control signals to position one or more optical elements to align target image 52.3 onto modulator 22.3.

Preferably, the intensities of the distinct radiation sources are measured from time to time. For this purpose, 28.utl(ACA).3 can be used to generate one or more control signals to reposition one or more optical elements to move target image 52.3 along the radial axis from its default position to a detuned position. This in turn collectively moves the sub-images corresponding to the individual radiation sources along the radial axis. Computer 28.3 would then compare the decoded amplitudes obtained from the default position of target image 52.3 to the decoded amplitudes obtained from the detuned position of target image 52.3 to determine the intensities of the distinct radiation sources. More preferably, an array of patterns similar to {55.3, 50.22}, and {55.4, 50.23} shown in modulator 22E of FIG. 8 are used to allow one to measure both the center wavelength and the total intensity (i.e., the spectral intensity distribution) of each encoded radiation component without detuning the position of target image 52.3.

Example 4

The fourth example of the multi-purpose analyzer 100 depicted in FIG. 1A, FIG. 1A, analyzer 100.4, is a fluorescence imaging analyzer with the speed and sensitivity of a PMT. Radiation source 24.4 is an extended source comprising the emission from a collection of different fluorescent samples. For example, the lanes of a multi-lane electrophoresis or the samples of a fluorescent labeled assay. Radiation emitted by source 24.4 is imaged by pre-encoder optic 36A.4 to form target image 52.4 (an extended image) substantially along a radial axis of modulator 22.4. Target image 52.4 comprises the sub-images of the collection of different fluorescent samples focused at substantially different points along said radial axis of modulator 22.4. Modulator 22.4 includes a number of radiation filters which encode the radiation emitted by the fluorescent samples to provide an encoded beam comprising a plurality of encoded spatial components as modulator 22.4 is rotated about rotation axis 40. Preferably, target image 52.4 is aligned with the radiation filters such that the encoded components have a substantially one to one correspondence with the different fluorescent samples. In other words, pre-encoder optic 36A.4 images each of the different fluorescent samples to a corresponding sub-image of the target image 52.4 on modulator 22.4, where the sub-images preferably do not overlap on the modulator. The sub-images are preferably dispersed along a radial axis of the modulator 22.4 such that each encoded spectral component (or a group of encoded spectral components within a bandwidth) from a corresponding sub-image corresponds to one and only one of the different fluorescent samples.

The encoded beam is collected, directed and focused by post-encoder optic 36B.4 onto detector 26.4, a photo-multiplier tube (PMT), and the signals generated by the PMT in response to the encoded beam are analyzed by computer 28.4 to determine the amplitudes of the encoded components. Preferably, the spectral properties of the different fluorescent samples are measured by inserting a spectrometer or other wavelength filtering device between post-encoder optic 36B.4 and the PMT and scanning or varying the wavelength of the radiation transmitted to the PMT. More preferably, a spectrograph or other wavelength separating device is used to direct a number of selected spectral components of the encoded beam to an equal number of PMTs. Most preferably, computer 28.4 would include a sufficient number of analog-to-digital converters (ADCs) such that the signals generated by the PMTs in response to the encoded beam could be analyzed substantially simultaneously. In this manner, the spectral properties of the collection of fluorescent samples can be measured substantially simultaneously with the speed and sensitivity of a PMT.

If necessary, analyzer 100.4 can be combined with the interlaced excitation mechanism of analyzer 300 (described in FIG. 10) to determine the excitation properties (e.g., the excitation spectrum) of the different fluorescent samples substantially simultaneously.

The field of view of a given sample is governed by the superposition of all optical ray traces which begin at the sample (in a corresponding sample plane, comprising part of source 24.4), reflect from the active area of the corresponding radiation filter, and reach detector(s) 26.4. As a consequence, the field of view changes as the pattern of the radiation filter within the active area changes as modulator 22.4 rotates. For non-homogeneous samples, or samples with abrupt boundaries, rotation-dependent variations in the field of view can lead to a waveform distortion of an encoded response component. In the present invention, these effects can be minimized by reducing the number of abrupt discontinuities along one or more axes in the pattern of the radiation filters. Preferably, the radiation filters of modulator 22.4 comprise the "bar-code" or "checker-board" like patterns described above to provide one or more encoded components with a substantially constant field of view along one or more axes in the sample plane.

In reference to FIG. 9A. for the analyzer 100.4 described above, the position of the imaged fluorescence can be controlled by moving one or more optical elements to align target image 52.4 onto modulator 22.4. Preferably, source 24.4 includes a number of alignment spatial components (e.g., a number of known fluorescent species distributed at known spatial positions within 24.4) and modulator 22.4 includes a number of alignment channels to provide input to the alignment calibration algorithm 28.utl(ACA).4, which in turn, generates one or more control signals to position one or more optical elements to align target image 52.4 onto modulator 22. More preferably, the alignment spatial components would also have known spectral emission properties for calibrating the wavelength filtering device or the wavelength separating device.

Example 5

The fifth example of the multi-purpose analyzer 100 depicted in FIG. 1A, analyzer 100.5, is a spectrum analyzer which encodes both a dispersed image having a plurality of selected spectral components and an extended image comprising the radiation transmitted through or reflected from one or more bandpass filters and/or dichroic beam splitters. This approach may be useful in situations where the radiation path through the analyzer may contain interfering gasses and vapors (or liquids) which can unpredictably affect the accuracy of the spectral measurements. In such instances it is preferable to minimize the optical path through the analyzer for those spectral components which are subject to the interference. Carbon dioxide ($CO_2$) is a well know case in point. Dispersive instruments used in applications where high transmission accuracy is desired in the $CO_2$ spectral region typically include a nitrogen purge of the instruments uncontrolled path, i.e., the optical path not including the sample or sample cell. Analyzer 100.5 presents an alternative to this approach.

In Analyzer 100.5, the radiation source is a broad-band or multi-wavelength source having plurality of selected spectral components in two distinct spectral regions SR1 and SR2. SR1 contains those spectral components which are subject to the interference in the uncontrolled path. Preferably, analyzer 100.5 includes a dichroic mirror and one or more bandpass filters or a linear-variable filter (LVF) to filter the radiation in SR1. Taken together, the radiation source, the dichroic mirror, and the collection of bandpass filters or LVF comprise source 24.5, having a number of spatial components corresponding to the radiation transmitted through (or reflected from) the individual bandpass filters or positions along the LVF. The radiation in SR2, which is not subject to the interference, is designated source 24.5.2. Pre-encoder optics, 36A.5 includes sub-optics, 36A.5.1 and 36A.5.2, for independently imaging 24.5.1 and 24.5.2, respectively, onto modulator 22.5. Sub-optic, 36A.5.1 forms a first target image 52.5.1, substantially along a first radial axis of modulator 22.5, and sub-optic 36A.5.2, which includes a diffractive or refractive element, forms a second target image 52.5.2, substantially along a second radial axis of modulator 22.5. Target image 52.5.1 comprises selected spectral components of 24.5.1 focused at substantially different points along the first radial axis of modulator 22.5. Target image 52.5.2, a dispersed image, comprises selected spectral components of 24.5.2 focused at substantially different points along the second radial axis of modulator 22.5.

Modulator 22.5 has a number of radiation filters at different radii for encoding the radiation components of 24.5.1 and 24.5.2 to provide two encoded beams (56.5.1 and 56.5.2, respectively) as modulator 22.5 is rotated about the rotation axis 40. Preferably, target image 52.5.1 is aligned with the radiation filters such that the encoded components of 56.5.1 have a substantially one to one correspondence with the selected spectral components of 24.5.1. Preferably, target image 52.5.1 is aligned with the radiation filters such that the encoded components of 56.5.2 have a substantially one to one correspondence with the selected spectral components of 24.5.2. Post-encoder optics, 36B.5 includes sub-optics, 36B.5.1 and 36B.5.2, for manipulating 56.5.1 and 56.5.2, respectively. 56.5.1 is collected, directed and focused with 36B.5.1 onto a first detector 26.5.1, and 56.5.2 is collected, directed and focused with 36B.5.2 onto a second detector 26.5.2. Preferably, computer 28.5 includes two ADCs for sampling the signals from detectors 26.5.1 and 26.5.2. Computer 28.5 then analyzes the signals generated by detector 26.5.1 and detector 26.5.2 in response to encoded beams, 56.5.1 and 56.5.2, respectively to determine the amplitudes of the encoded components in both spectral ranges. A sample or sample cell (e.g., sample 38 shown as a dashed line box in FIG. 1A FIG. 1A) can be inserted between the radiation source and the dichroic mirror for spectral analysis; i.e., the sample is within the confines of source 24.5. Preferably, the total uncontrolled path for the spectral components of SR1 is made as small as possible to minimize the interference. In this manner, the spectral properties of a sample can be measured in the presence of interfering gasses or vapors.

Example 6

The sixth example of the multi-purpose analyzer 100 depicted in FIG. 1A, analyzer 100.6, is compact spectrum analyzer that uses a collection of discrete radiation sources to provide a multi-spectral-component encoded source for analyzing a sample. Examples of discrete sources include laser diodes, light-emitting diodes or lamp/filter combinations. Preferably, radiation source 24.6 comprises a linear array of discrete sources. The radiation emitted by the array of sources is imaged to form target image 52.6 substantially along a radial axis of modulator 22.6. Preferably, the array of sources is positioned close to and along the radius of modulator 22.6 such that target image 52.6 is formed without needing pre-encoder optic 36A. Target image 52.6 comprises spatial components, the sub-images of the radiation emitted by the individual sources, which are focused (or centered) at substantially different points along said radial axis of modulator 22.6. Modulator 22.6 has a number of radiation filters at different radii for encoding the spatial components to provide an encoded beam as modulator 22.6 is rotated about the rotation axis 40.6. Preferably, the spatial components are aligned with the radiation filters such that the encoded components have a substantially one to one correspondence with the radiation emitted by the individual discrete sources. The encoded beam is collected, directed and focused with post-encoder optic 36B.6 onto detector 26.6. Computer 28.6 then analyzes the signal generated by detector 26.6 in response to the encoded beam to determine the amplitudes of the encoded components. A sample or sample cell can be inserted between the source 24.6 and detector 26.6. In this manner, the spectral properties of a sample can be measured.

In reference to FIG. 9A. for analyzer 100.6 described above, the position of the array of discrete sources, and/or other optical elements, can be controlled to align target image 52.6 onto modulator 22.6. Preferably, source 24.6 includes a number of alignment spatial components and modulator 22.6 includes a number of alignment channels to provide input to the Alignment Calibration Algorithm 28.utl(ACA).6, which in turn, generates one or more control signals for hardware driver 28.6.*drv* to position one or more optical elements (e.g., a common structure onto which the array of discrete sources are mounted) to align target image 52.6 onto modulator 22.6.

Example 7

In some applications, it is necessary to measure the intensities of two or more groups of selected spectral components in two or more distinct spectral regions. For practical reasons, these spectral regions are often distinguished by the wavelength response characteristics of various radiation detectors. For example, a Mercury Cadmium Telluride (HgCdTe or MCT) responds to radiation roughly between 8 and 12 microns, a Lead Selenide (PbSe) detector responds to radiation roughly between 3 and 5 microns, a Lead Sulfide (PbS) detector responds to radiation roughly between 1 and 3 microns, an Indium Gallium Arsenide (InGaAs) detector responds to radiation roughly between 0.7 and 2.2 microns, and a photo-multiplier tube (PMT) responds to radiation roughly between 0.2 and 0.7 microns. In a given applications it may be necessary to measure selected spectral components in various combinations of these detector-specific spectral regions.

The seventh example of the multi-purpose analyzer 100 depicted in FIG. 1A, analyzer 100.7, is a spectrum analyzer which uses a modulator 22.7 with one or more radiation filters which simultaneously encode selected spectral components in two distinct spectral regions. Radiation source 24.7 comprises selected spectral components in two distinct spectral regions, SR1 and SR2. Pre-encoder optic 36A.7 collects the radiation emitted by radiation source 24.7 and forms two target images, 52.7.1 and 52.7.2. In one embodiment, pre-encoder optic 36A.7 may contain one or more gratings having two or more distinct grove frequencies. In this manner, the multi-groove-frequency grating would disperse two distinct spectral regions substantially along the same optical path (i.e., dispersed images 52.7.1 and 52.7.2 would overlap one another). Target image 52.7.1 comprises selected spectral components from SR1, and target image 52.7.2 comprises selected spectral components from SR2. The selected spectral components of 52.7.1 are focused at substantially different points along a radial axis of modulator 22.7. Similarly, the selected spectral components of 52.7.2 are focused at substantially different points along a radial axis of modulator 22.7. If required, pre-encoder optic 36A can be engineered such that 52.7.1 and 52.7.2 are separated along the radial axis, or projected along two different radial axes. Such and other variations are within the scope of the invention. Modulator 22.7 has a number of radiation filters at different radii for encoding the spectral components to provide two coinciding encoded beams, 56.7.1 and 56.7.2, as modulator 22.7 is rotated about the rotation axis 40. Preferably, target images 52.7.1 and 52.7.2 are aligned with the radiation filters such that the encoded components have a substantially one to one correspondence with the selected spectral components of SR1 and SR2. More preferably, modulator 22.7 is an "array-like" pattern comprising a large number of substantially orthogonal radiation filters substantially adjacent to one another, forming a substantially gapless encoding grid to simultaneously probe both spectral ranges of radiation source 24.7. Most preferably, the individual widths of the radiation filters in modulator 22.7 are engineered to provide encoded spectral components with constant wavelength bandwidth or constant energy bandwidth in a given spectral range. Using the "array-like" pattern of modulator 22.7, 56.7.1 and 56.7.2 contain substantially complete spectra in spectral ranges SR1 and SR2, respectively. Encoded beams 56.7.1 and 56.7.2 are collected, separated and focused with post-encoder optic 36B.7 onto detectors 26.7.1 and 26.7.2, respectively; e.g. using one or more dichroic mirrors. Preferably, detector 26.7.1 responds to the selected spectral components or SR1 and detector 26.7.2 responds to the selected spectral components or SR2. Preferably, computer 28.7 has two ADCs for sampling the signals from detectors 26.7.1 and 26.7.2 substantially simultaneously. Computer 28 then analyzes the signal generated by the two detectors in response to the two encoded beams to determine the amplitudes of selected encoded components in the two spectral ranges substantially simultaneously. A sample or sample cell can be inserted between the source 24.7 and modulator 22.7. In this manner, the spectral properties of a sample in two distinct spectral ranges can be measured simultaneously.

The spectral regions cited in the example above where chosen for clarity and are not meant to limit the scope of the invention.

Example 8

The eighth example of the multi-purpose analyzer 100 depicted in FIG. 1A, analyzer 100.8, is a multi-spectral-component encoded source with a high-intensity, collimated beam which can be used to excite radiation emitting or radiation scattering samples (e.g., gas clouds, contaminated water, contaminated surfaces, contaminated soils). Radiation source

24.8 is a collimated radiation beam having a plurality of selected excitation components (e.g., an argon-ion or other multi-excitation-line laser, or multiple independent excitation sources). Pre-encoder optic 36A.8 includes at least one diffractive or refractive element to separate the selected spectral components to form target image 52.8 along a radial axis of modulator 22.8. Preferably, pre-encoder optic 36A.8 includes a variable attenuator to precondition or preset the intensities of the selected components. Target image 52.8 is a dispersed image comprising selected spectral components focused at substantially different points along one or more radial axes of modulator 22.8. Modulator 22.8 includes a number of radiation filters which encode the selected spectral components to provide an encoded beam comprising a plurality of encoded spectral components as modulator 22.8 is rotated about rotation axis 40. Preferably, target image 52.8 is aligned with the radiation filters such that the encoded components have a substantially one to one correspondence with the selected spectral components. Preferably, a first post-encoder optic 36B.8.1 includes at least one diffractive or refractive element to substantially re-collimate the encoded components (e.g., 36A.8 and 36B.8.1 each comprises at least one grating pair, prism pair or prism-grating combination). In this manner, the encoded beam can be propagated over a distance to excite a remote sample 38 (e.g., a gas cloud or contaminated surfaces), or excite one or more optically dense samples (e.g., contaminated surfaces, contaminated water, and contaminated soils). The sample 38 (shown as a dashed line box in FIG. 1A) may or may not be confined in an enclosure.

In response to the encoded excitation beam, the sample 38 emits encoded response radiation, which is collected and directed by a second post-encoder optic 36B.8.2 (e.g., a telescope for remote samples, or a microscope for optically dense samples, not shown in FIG. 1A) back to detector 26.8. Computer 28.8 analyzes the signal generated by detector 26.8 in response to the encoded response beam to determine amplitudes of the encoded components. In this manner, the excitation properties of the sample can be used as input to one or more Chemometric analyses to determine the chemical composition of the sample; e.g., to detect flammable or toxic chemicals, including chemical or biochemical weapons.

In another embodiment of analyzer 100.8, the collimated, encoded beam is launched into an optical fiber, waveguide, light pipe or purged (or evacuated) tubing and distributed to one or more remote sampling stations such that the uncontrolled path of the encoded excitation beam is substantially limited outside of the remote sampling station. The remote sampling station includes one or more remote samples that emit or scatter encoded response radiation in response to the encoded excitation beam. Preferably, each of the remote excitation stations includes at least one remote detector RD26 and a remote computer RC28 (with the same decoding functionality as computer 28) for analyzing the encoded response radiation. Preferably, the timing and alignment signals are dispatched to the remote sampling stations for use by RD28 to analyze the signals from RD26. In this manner, the data acquired at the remote locations can be properly analyzed.

Preferably, pre-encoder optic 36A.8 and post-encoder optic 36B.8.1 can be substantially simplified by engineering source 24.8 to provide selected components spatially separated from one another (e.g., spatial variations in the gain medium or replace the partial mirror of a laser with a patterned array of dichroic mirrors). More preferably, source 24.8 is engineered to provide selected components at spatial locations that substantially match the pattern of radiation filters and filter pairs on modulator 22.8.

In reference to FIG. 9A. for the analyzer described above, the position of one or more optical element can be controlled to align target image 52.8 onto modulator 22.8. Preferably, modulator 22.8 includes one or more alignment radiation filters or filter pairs to encode one or more alignment components of source 24.8. The alignment components provide input to the Alignment Calibration Algorithm 28.utl(ACA).8, which in turn, generates one or more control signals to position one or more optical elements to properly align target image 52.8 onto modulator 22.8.

Example 9

The ninth example of the multi-purpose analyzer 100 depicted in FIG. 1A, analyzer 100.9, is an imaging analyzer which uses one or more radiation excitation sources and imaging optics (e.g., optics designed to provide a line image or multiple sub-images for each excitation source) to provide an array of encoded excitation beams (each excitation beam having substantially constant spot size and substantially uniform illumination along one or more axes) for exciting a collection of samples. Examples of excitation sources include gas lasers, glass lasers, laser diodes, light-emitting diodes and lamp/filter combinations. Examples of collections of samples include an array of gas or liquid sample cells, a multi-lane electrophoresis, the wells or blots of a fluorescent labeled assay, regions in a non-homogeneous mixture, and pharmaceuticals on an assembly line. The radiation emitted by radiation excitation source 24.9 is imaged with pre-encoder optic 36A.9 to form target image 52.9 substantially along a radial axis of modulator 22.9. Target image 52.9 comprises an array of sub-images (or a line image, which is a continuum of sub-images) of radiation source 24.9, which are focused (or centered) at substantially different points along said radial axis of modulator 22.9. Modulator 22.9 has a number of radiation filters at different radii for encoding the sub-images to provide an array of encoded excitation beams as modulator 22.9 is rotated about rotation axis 40. Preferably, the sub-images are aligned with the radiation filters such that the encoded excitation beams have a substantially one to one correspondence with the radiation comprising the individual sub-images. The encoded excitation beams are collected, directed and focused with post-encoder optic 36B.9.1 onto a collection of samples. If more than one excitation source is used, analyzer 100.9 can be combined with Excitation Interlacing Optic (described above) to provide a unique encoding for each sample/excitation combination. Preferably, the array of encoded excitation beams is aligned with the collection of samples such that each sample is excited with one encoded excitation beam from each excitation source.

In response to the excitation radiation, each said sample emits or scatters one or more response beams of radiation. Preferably, the array of encoded excitation beams is aligned with the collection of samples such that a substantially one-to-one correspondence exists between a given encoded response component and a given sample/excitation combination (i.e., each sample emits or scatters one encoded response beam for each excitation source. Excitation cross-talk, resulting from an encoded excitation beam exciting more than one sample, is to be avoided.). The encoded response beams are collected, directed, and focused by post-encoded optic 36B.9.2 onto detector 26.9, a photo-multiplier tube (PMT), and the signals generated by the PMT in response to the encoded beam are analyzed by computer 28.9 to determine the amplitudes of the encoded components.

Preferably, the spectral properties of the different fluorescent samples are.measured by inserting a spectrometer or other wavelength filtering device between post-encoder optic 36B.9 and the PMT and scanning the wavelength of the radiation transmitted to the PMT. More preferably, a spectrograph or other wavelength separating device is used to direct a number of selected spectral components of the encoded beam to an equal number of PMTs. Most preferably, computer 28.9 would include a sufficient number of analog-to-digital converters (ADCs) such that the signals generated by the PMTs in response to the encoded beam could be analyzed substantially simultaneously. In this manner, the spectral properties of the response of a collection of samples to one or more sources of excitation radiation can be measured substantially simultaneously with the speed and sensitivity of a PMT.

The field of illumination in a given sample plane is governed by the superposition of excitation ray traces which begin at source 24.9, reflect from the active area of the corresponding radiation filter, and reach the corresponding sample. As a consequence, the field of illumination (on the sample, in the sample plane) changes as the pattern of the radiation filter within the active area changes as modulator 22.9 rotates. For non-homogeneous samples, or samples with abrupt boundaries, rotation-dependent variations in the field of illumination can lead to a waveform distortion of an encoded response component. In the present invention, these effects can be minimized by reducing the number of abrupt discontinuities along one or more axes in the pattern of the radiation filters. Preferably, at least one of the radiation filters of modulator 22.9 comprises the "bar-code" or "checker-board" like patterns described above to provide one or more encoded excitation components with a substantially constant field of illumination along one or more axes in the sample plane.

In reference to FIG. 9A. for analyzer 100.9 described above, the position of the array of excitation sub-images, the position of the array of encoded excitation beams, the position of the ample collection, and/or other optical elements, can be controlled to align target image 52.9 onto modulator 22, and align the encoded excitation beams onto the sample collection. Preferably, source 24.9 includes a number of alignment spatial components and modulator 22 includes a number of alignment channels to provide input to the alignment calibration algorithm 28.utl(ACA).9, which in turn, generates one or more control signals to position one or more optical elements (e.g., a common structure onto which the array of discrete sources are mounted analogous to 35.FP shown in FIG. 17A) to align target image 52.9 onto modulator 22.

Example 10

The tenth example of the multi-purpose analyzer 100 depicted in FIG. 1A, analyzer 100.10, is a multi-spectral-component encoded source with a high-intensity, collimated beam which is used to probe optically dense samples such as liquids or solids (e.g., drinking water, pharmaceuticals, walls, contaminated soils, and luggage and packages on a baggage conveyer). The sample 38 may be placed at any point in the optical path between source 24.10 and the detector 26.10, such as in the location shown in FIG. 1A, except that the beam from the source may be scattered by the sample instead of passing through it, and the scattered radiation conveyed to the detector. Radiation source 24.10 is a collimated radiation beam having a plurality of selected spectral components (e.g., a carbon dioxide laser, an argon ion laser, or other multi-line laser). Pre-encoder optic 36A.10 includes at least one diffractive or refractive element to separate the selected spectral components to form target image 52.10 along a radial axis of modulator 22.10. Preferably, pre-encoder optic 36A.10 includes a variable attenuator to precondition or preset the intensities of the selected components. Target image 52.10 is a dispersed image comprising selected spectral components focused at substantially different points along one or more radial axes of modulator 22.10. Modulator 22.10 includes a number of radiation filters which encode the selected spectral components to provide an encoded beam comprising a plurality of encoded spectral components as modulator 22.10 is rotated about rotation axis 40. Preferably, target image 52.10 is aligned with the radiation filters such that the encoded components have a substantially one to one correspondence with the selected spectral components. Preferably, a first post-encoder optic 36B.10.1 includes at least one diffractive or refractive element to substantially re-collimate the encoded components (e.g., 36A.10 and 36B.10.1 each comprises at least one grating pair, prism pair or prism-grating combination). In this manner, the encoded beam can be used to probe optically-dense samples. A second post-encoder optic 36B.10.2 collects the encoded radiation beam and directs it back to detector 26.10. Preferably, a sample (e.g., sample 38 shown as a dashed line box in FIG. 1A) is placed between post-encoder optic 36B.10.1 and post-encoder optic 36B.10.2. Computer 28.10 analyzes signal 27.10 generated by detector 26.10 in response to encoded beam 56.10 to determine amplitudes of the encoded components. In this manner, the spectral transmission of the optically-dense sample can be used as input to a Chemometric analysis to provide a chemical composition analysis of the sample; e.g., to detect flammable or toxic chemicals, including chemical or biochemical weapons.

In a related embodiment of analyzer 100.10, the encoded beam is propagated over a long distance to at least one remote detector RD26 (similar to detector 26.10, but located at a remote location). Preferably, the signals generated by RD26 in response to the encoded beam are sent back to analyzer 100.10 for analysis by computer 28.10, which determines the amplitudes of the encoded components. More preferably, remote detector RD26 is augmented by a remote computer RC28 to comprise a remote receiver, and the timing and alignment signals are dispatched (e.g., via microwave signal, fiber optic or one or more additional encoded laser beams) to the remote receiver such that the detector signal can be analyzed at the remote location by RC28. Most preferably, the encoded beam is split up with a beam splitter and distributed along with the timing and alignment signals to a number of remote receivers. In this manner, the detector signals can be analyzed at each of the remote locations.

In another embodiment of analyzer 100.10, the collimated, encoded beam is launched into an optical fiber, waveguide, light pipe or purged (or evacuated) tubing and distributed to one or more remote sampling stations such that the uncontrolled path of the encoded beam is substantially limited outside of the remote sampling station. Preferably, each of the remote sampling stations include at least one remote detector RD26 and a remote computer RC28 (with the same decoding functionality as computer 28) for analyzing the signals generated by the detector and the timing and alignment signals. In this manner, the data acquired at the remote locations can be properly analyzed.

Preferably, pre-encoder optic 36A.10 and post-encoder optic 36B.10.1 can be substantially simplified by engineering source 24.10 to provide selected components spatially separated from one another (e.g., spatial variations in the gain medium or replace the partial mirror of a laser with a patterned array of dichroic mirrors). More preferably, source 24.10 is engineered to provide selected components at spatial locations that substantially match the pattern of radiation filters and filter pairs on modulator 22.10.

In reference to FIG. 9A. for the analyzer described above, the position of one or more optical element can be controlled to align target image 52.10 onto modulator 22.10. Preferably, modulator 22.10 includes one or more alignment radiation filters or filter pairs to encode one or more alignment components of source 24.10. The alignment components provide input to the Alignment Calibration Algorithm 28.utl(ACA) .10, which in turn, generates one or more control signals to position one or more optical elements to properly align target image 52.10 onto modulator 22.10.

Example 11

The eleventh example of the multi-purpose analyzer 100 depicted in FIG. 1A, analyzer 100.11, is a spectrum analyzer employing radiation filters and radiation filter pairs to identify and quantify (different, labeling, distinct, signatures) various fluorescence spectra from a number of dye-labeled beads dispersed in a fluid.

In Analyzer 100.11, radiation source 24.11 is superposition of fluorescence from a number of dye-labeled beads dispersed in a fluid. Pre-encoder optics, 36A.11, which includes a diffractive or refractive element, forms a dispersed target image 52.11, substantially along a radial axis of modulator 22.11. Modulator 22.11 has a number of radiation filters at different radii for encoding the selected radiation components of 24.11.1 to provide an encoded beam as modulator 22.11 is rotated about the rotation axis 40.11. Preferably, target image 52.11 is aligned with the radiation filters such that the encoded components have a substantially one to one correspondence with the selected spectral components of 24.11. Post-encoder optics, 36B.11, collects, directs and focuses the encoded beam onto detector 26.11. Computer 28.11 includes an ADC for sampling the signals from detector 26.11. Computer 28.11 then analyzes the signals generated by detector 26.11 in response to encoded beams to determine the amplitudes of the encoded components. Computer 28.11 subsequently uses the decoded amplitudes in one or more Chemometric algorithms to determine the presence and intensity of fluorescence from one or more labeling dyes. In this manner, the presence and concentration of one or more chemicals (or biochemicals) that alter the intensity of one or more labeling dyes (e.g., by enabling or disabling one or more fluorescence quenching mechanisms) can be determined.

Preferably, modulator pattern 21.11 includes one or more complementary filter pairs to enable computer 28.11 to employ Chemometric algorithms using one or more wavelength-first-derivative basis functions to discriminate between fluorescence from two or more labeling dyes having similar fluorescence spectra, by means such as by determining the zero-crossings of the spectra, which may be different for different labeling dyes, even though they have similar fluorescence spectra. More preferably, modulator pattern 21.11 includes one or more complementary filter pairs and one or more filters (or collect filter pairs), occupying annular segments within the same annular region (e.g., patterns similar to those of modulator 22E of FIG. 8), to enable computer 28.11 to simultaneously discriminate and quantify fluorescence from two or more labeling dyes having similar fluorescence spectra.

Example 12

The twelfth example of the multi-purpose analyzer 100 depicted in FIG. 1A, analyzer 100.12, is a multi-spectral-component encoded source with a high-intensity, collimated beam that can be used to identify and quantify gasses, vapors and particulates contained within one or more enclosed paths based on analyses of absorption, scattering or fluorescence. Examples of enclosed paths include the ductwork of an HVAC system, the tank of a tanker truck or railcar, a gas pipeline (e.g., natural gas), the hold of a container ship, cargo containers, and subway tunnels.

Radiation source 24.12 is a collimated radiation beam having a plurality of selected spectral components (e.g., a carbon dioxide laser, an argon-ion laser, or other multi-line laser). Pre-encoder optic 36A.12 includes at least one diffractive or refractive element to separate the selected spectral components to form a target image along a radial axis of modulator 22.12. Preferably, pre-encoder optic 36A.12 includes a variable attenuator to precondition or preset the intensities of the selected components. Target image 52.12 is a dispersed image comprising selected spectral components focused at substantially different points along said radial axis of modulator 22.12. Modulator 22.12 includes a number of radiation filters which encode the selected spectral components to provide an encoded beam comprising a plurality of encoded spectral components as modulator 22.12 is rotated about rotation axis 40. Preferably, target image 52.12 is aligned with the radiation filters such that the encoded components have a substantially one to one correspondence with the selected spectral components. Preferably, a first post-encoder optic 36B.12.1 includes at least one diffractive or refractive element to substantially re-collimate the encoded components (e.g., 36A.12 and 36B.12.1 each comprises at least one grating pair, prism pair or prism-grating combination). In this manner, the encoded beam can be propagated through a long, enclosed path to a remote reflector and directed back to detector 26.12. Examples of remote reflectors include a retro-reflector, a simple mirror, metallic ductwork, or various target objects providing diffuse or specular reflectance. A second post-encoder optic 36B.12.2 collects the encoded radiation beam and directs it back to detector 26.12. Computer 28.12 decodes signal 27.12 generated by detector 26.12 to determine amplitudes of the encoded components, which are subsequently used as inputs for one or more Chemometric analyses. In this manner, the chemical composition of the closed path can be determined. This information can then be used to alert to the presence of specific gasses and vapors; e.g., flammable or toxic chemicals, including chemical and biochemical weapons.

In one embodiment, the containers of a container ship can be equipped with optical windows such that the internal air space can be probed. More preferably, the location of the optical windows is standardized such that the closed path comprises the sum of the internal air spaces of at least two containers positioned side-by-side or end-to-end in the cargo hold. More preferably, the containers are equipped with sample cell 38.12 (cell 38 shown as a dashed line box in FIG. 1A), which spans the internal volume between the standardized optical windows. More preferably, the sample cells are equipped with absorbing media 37.12. More preferably, the sample cells are equipped with heating mechanism 39.12 (mechanism 39 shown as a dashed line box in FIG. 1A) to desorb chemical trapped by the adsorbing media. Most preferably, absorbing media 37.12 is heated by a laser or other wireless means to desorb the adsorbed chemical. In this manner, a large number of containers can be efficiently probed for toxic chemicals and contraband prior to entering port.

In a related embodiment of analyzer 100.12, the encoded beam is propagated through a closed path to at least one remote detector, RD26.12, (similar to detector 26, but located at a remote location). Preferably, the signals generated by RD26 in response to the encoded beam are sent back to analyzer 100.12 for analysis by computer 28.12, which determines the amplitudes of the encoded components. More preferably, remote detector RD26.12 is combined with remote computer RC28.12 to comprise a remote receiver, and the timing and alignment signals are dispatched to the remote receiver such that the detector signal can be analyzed at the remote location by RC28. Most preferably, the encoded beam is split up with a beam splitter and distributed along with the timing and alignment signals to a number of remote receivers; e.g., distributed throughout an HVAC system, pipeline network, or the hold of a container vessel. In this manner, the detector signals can be analyzed at each of the remote locations, and a number of closed paths can be simultaneously probed for the presence and concentration of gasses, vapors and particulates; e.g., flammable or toxic chemicals, including chemical and biochemical weapons.

Preferably, pre-encoder optic 36A.12 and post-encoder optic 36B.12.1 can be substantially simplified by engineering source 24.12 to provide selected components spatially separated from one another (e.g., spatial variations in the gain medium or replace the partial mirror of a laser with a patterned array of dichroic mirrors). More preferably, source 24.12 is engineered to provide selected components at spatial locations that substantially match the pattern of radiation filters and filter pairs on modulator 22.12.

If source 24.12 has an emission repetition rate that is comparable to or less than the data acquisition rate, it is preferred that the rotation of modulator 22.12 be synchronized with the repetition rate to minimize aliasing effects on the decoded amplitudes.

In reference to FIG. 9A. for the analyzer described above, the position of one or more optical element can be controlled to align target image 52.12 onto modulator 22.12. Preferably, modulator 22.12 includes one or more radiation filters or filter pairs to encode one or more spectral components in source 24.12 to provide input to the alignment calibration algorithm 28.utl(ACA).12, which in turn, generates one or more control signals to position one or more optical elements to properly align target image 52.12 onto modulator 22.12.

Example 13

The thirteenth example of the multi-purpose analyzer 100 depicted in FIG. 1A, analyzer 100.13, is a multi-spectral-component encoded source with a collimated beam that is combined with non-encoded radiation beam to provide a heat source, which is used to identify and quantify gasses and vapors desorbed from a surface (or absorbing media 37.13, with 37 shown in dashed line box in FIG. 1A) by a heat source 39.13 (heating mechanism 39 shown as a dashed line box in FIG. 1A), or produced in a plasma initiated by the heat source (e.g., spectral analysis of a laser cutting torch). The desorbed material then form a sample 38.13 that is probed by analyzer 100.13 as described below.

Radiation source 24.13 is a high-energy collimated radiation beam having a plurality of selected spectral components (e.g., a carbon dioxide laser). Radiation source 24.13 includes a beam splitter (not shown in FIG. 1A) to separate the collimated radiation beam to provide two or more radiation beams having substantially different intensities and/or powers. The first beam 24.13.1 comprises selected spectral components having intensities substantially appropriate for spectral analysis. The second beam 24.13.2 comprises radiation having intensities substantially appropriate for desorbing chemicals from a sample surface or initiating a plasma.

Pre-encoder optic 36A.13 includes at least one diffractive or refractive element to separate the selected spectral components from 24.13.1 to form a target image along a radial axis of modulator 22.13. Target image 52.13 is a dispersed image comprising selected spectral components focused at substantially different points along said radial axis of modulator 22.13. Modulator 22.13 includes a number of radiation filters which encode the selected spectral components to provide an encoded beam comprising a plurality of encoded spectral components as modulator 22.13 is rotated about rotation axis 40. Preferably, target image 52.13 is aligned with the radiation filters such that the encoded components have a substantially one to one correspondence with the selected spectral components. Preferably, a first post-encoder optic 36B.13.1 includes at least one diffractive or refractive element to substantially re-collimate the encoded components (e.g., 36A.13 and 36B.13.1 comprise at least one grating pair, prism pair or prism-grating combination). Radiation beam 24.13.2 is used to desorb chemicals adsorbed on a sample surface. The desorbed chemicals are subsequently probed with the encoded radiation beam (originating from 24.13.1). A second post-encoder optic 36B.13.2 collects the encoded radiation beam and directs it back to detector 26.13. Computer 28.13 decodes signal 27.13 generated by detector 26.13 to determine amplitudes of the encoded components, which are subsequently used as inputs for one or more Chemometric analyses. In this manner, the chemical composition of the containers can be determined. This information can then be used to alert to the presence of specific gasses and vapors; e.g., flammable or toxic chemicals, including chemical and biochemical weapons.

In one application, cargo containers (e.g., from a container ship, train, airplane, or truck) can be equipped with a sample cell accessible through one or more optical windows. The sample cell comprises a fixed path, a mirror and an adsorbing media. Preferably, the adsorbing media is exposed to the internal atmosphere of the container for the duration of the voyage to maximize the probability that one or more target chemicals (e.g., chemical weapons, contraband, etc . . . ) are absorbed in sufficient quantity for detection. Radiation beam 24.13.2 is used to heat the adsorbing media, and encoded radiation beam 24.13.1 is used to probe the contents of the sample cell 38.13. Preferably, the sample is scanned for flammable gasses prior to heating to minimize the risk of explosion. In this manner, a large number of containers can be safely and efficiently probed for toxic chemicals and contraband.

Preferably, pre-encoder optic 36A.13 and post-encoder optic 36B.13.1 can be substantially simplified by engineering source 24.13 to provide selected components spatially separated from one another (e.g., spatial variations in the gain medium or replace the partial mirror of a laser with a patterned array of dichroic mirrors). More preferably, source 24.13 is engineered to provide selected components at spatial locations that substantially match the pattern of radiation filters and filter pairs on modulator 22.13.

In reference to FIG. 9A. for the analyzer described above, the position of one or more optical element can be controlled to align target image 52.13 onto modulator 22.13. Preferably, modulator 22.13 includes one or more alignment radiation filters or filter pairs to encode one or more alignment components of source 24.13. The encoded alignment components are analyzed to provide input to the alignment calibration algorithm 28.utl(ACA).13, which in turn, generates one or more control signals to position one or more optical elements to properly align target image 52.13 onto modulator 22.13.

Example HS.1

The next example is based on the Hyper-Spectral Imaging Analyzer described above in FIGS.12A and 12B. Radiation source 24.HS.1 is a multi-lane (or multi-capillary), four-dye-labeled electrophoresis (other examples of radiation source 24.HS.1 include a multi-well microtiter plate, or multi-gel-blot microarray) responding to one or more components of excitation radiation. Radiation emitted or scattered by source 24.HS.1 is imaged by pre-encoder optic 536A.HS.1 to form target image 52.HS.1 on modulator 22.HS.1. Target image 52.HS.1 comprises a plurality of dispersed sub-images, corresponding to the excited electrophoresis lanes (or capillaries), with their respective dispersion axes substantially separated from one another (or carefully interlaced) along a common radius of modulator 22.HS.1. Preferably, analyzer 100.HS.1 includes a bandpass filter that transmits selected spectral components from each dispersed sub-image, while preventing the dispersed sub-images from interfering with one another. Modulator 22.HS.1 includes a plurality of sub-patterns for encoding the dispersed sub-images. Each sub-pattern includes a number of radiation filters to encode the selected spectral components as modulator 22.HS.1 is rotated about rotation axis 40. Preferably, the selected spectral components are sufficient to determine the individual concentration of each of the four dyes used in the electrophoresis. Preferably, target image 52.HS.1 is aligned with modulator 22.HS.1 such that the encoded components have a substantially one to one correspondence with the selected spectral components for each lane (or capillary). In other words, each lane will have its corresponding encoded component, where the encoded components for different lanes are substantially orthogonal to one another. The encoded beam comprising all of the encoded components from all the lanes is collected, directed and focused with post-encoder optic 36B.HS.1 onto detector 26.HS.1, e.g., a photo-multiplier tube (PMT). Computer 28 then analyzes the signal generated by detector 26.HS.1 in response to the encoded beam to determine the amplitudes of the encoded components. Since the encoded components corresponding to the different lanes are substantially orthogonal to one another, it is possible determine the amplitudes of the encoded components from the output of detector 26.HS.1. Application-specific analytical function 28.asf then uses the decoded amplitudes to determine the individual concentrations of the four dyes in each of the lanes (or capillaries) as a function of time to generate a corresponding four-color electropherograms.

If necessary, analyzer 100.HS.1 can be combined with the interlaced excitation mechanism (described in FIG. 10A) to determine the excitation properties (e.g., the excitation spectrum) of the different electrophoresis lanes (or capillaries). It is typical for each of the four dyes to have a unique excitation/response spectrum (or matrix). In this manner, the selected spectral components can be measured as a function of the excitation components substantially simultaneously to enhance the instruments specificity to the four dyes.

In reference to FIG. 9A. for analyzer 100.HS.1 described above, it is preferable that excitation radiation scattered from the individual lanes or capillaries be used as alignment components. Preferably, the bandpass filter attenuates the intensity of the alignment components such that the amplitude of the encoded alignment components are similar to the nominal encoded amplitudes of the selected spectral components. Preferably, each sub-pattern on modulator 22.HS.1 would include one or more alignment filter pairs centered at the preferred or expected position of the alignment component(s) to provide input to the alignment calibration algorithm 28.utl (ACA).HS.1. Preferably, 28.utl(ACA).HS.1 would compare the alignment signals to one or more calibration curves (generated as described above) to generate calibration coefficients which quantify the alignment error for each dispersed image in target image 52.HS.1. Application-specific analytical function 28.asf would then use the calibration coefficients to compensate the encoded components for the alignment error. Most preferably, alignment calibration algorithm 28.utl (ACA) would generate one or more control signals to position one or more optical elements to properly align target image 52.HS.1 onto modulator 22.HS.1.

The number of excitation components, electrophoresis lanes (or capillaries), and the number of dyes was chosen for illustrative purposes, it being understood that arbitrary numbers of excitation components, electrophoresis lanes (or capillaries), and dyes are within the scope of the invention.

Example FP.1

The next example is based on Encoded Filter-Photometer Analyzer described above in FIGS.17A and 17B. Analyzer 100.FP.1 uses one or more broadband radiation sources and an array of correlation cells (i.e., target and reference cells filled with various gasses or liquids) to provide an array of encoded correlation beams (comprising target(s) and reference beams) for probing an unknown sample. Examples of target beams include radiation filtered by CO, $CO_2$, $NO_x$, $N_2O$, $H_2O$, $H_2S$ and various hydrocarbons, including the constituents of natural gas. Due to the inherent danger, radiation filtered by chemical weapons and other toxic gasses and liquids make less practical examples of target beams. Examples of reference beams include radiation filtered by $N_2$, water, a solvent or vacuum. Examples of samples include ambient air, automobile exhaust, a process stream and natural gas. Such and other examples of samples, and target and reference beams, are within the scope of the invention.

In analyzer 100.FP.1, one or more broadband radiation sources are coupled into the array of target and reference cells (e.g., by using one or more of the following components: a cylindrical lens, a lens array, a diffractive optic, or by using an array of sources butted into one or more correlation cells). The radiation transmitted through the array of target and reference cells, which comprises extended radiation source 24.FP.1, is imaged with pre-encoder optic 36A.FP.1 to form target image 52.FP.1 substantially along a radial axis of modulator 22.FP.1. Target image 52.FP.1 comprises an array of sub-images corresponding to the radiation transmitted through the target and reference cells of radiation source 24.FP.1, which are focused (or centered) at substantially different points along said radial axis of modulator 22.FP.1. Modulator 22.FP.1 has a number of radiation filters at different radii for encoding the sub-images to provide an array of encoded correlation beams as modulator 22.FP.1 is rotated about rotation axis 40. Preferably, the sub-images are aligned with the radiation filters such that the encoded correlation beams have a substantially one to one correspondence with the radiation transmitted through the individual target and reference cells (i.e., correlation cells).

The encoded correlation beams are collected, directed and focused with post-encoder optic 36B.FP.1 through one or more samples (e.g., sample 38 shown as a dashed line box in FIG. 1A, a sample cell in a process stream, a sample cell in a pipeline, and an open path ambient air measurement).

Preferably, the target and reference cells are interlaced in the manner illustrated in FIG. 10A such that each target beam is adjacent to a corresponding reference beam, to comprise a target/reference pair having substantially identical paths within the sample cell, and/or substantially identical intensity distributions on the surface of detector 26.FP.1. More preferably, the target and reference beams of a given pair are encoded with a complementary filter pair, such that the amplitude and phase of the resulting encoded component are determined by the relative intensity of the target and reference beams in the manner illustrated in FIGS. 17A and 17B. Most preferably, the relative modulation intensity of the complementary filters is engineered (e.g., by inserting a neutral density filter in the path of the corresponding reference beam, by varying the width or modulation depth of the reference filter with respect to the target filter) to null the resulting encoded component in the absence (or a nominal level) of a correlating absorption in the sample cell. In this manner, analyzer 100.FP.1 provides a correlation radiometry measurement of the highest photometric accuracy.

Preferably, the spectral range of the target and reference beam pair are limited (preferably together) by one or more dichroic mirrors or bandpass filters to isolate the dominant spectral features of the target chemical. In this manner, the sensitivity (e.g., the amplitude of the encoded target/reference pair in response to a given concentration of the target chemical in the sample cell) of the instrument to one or more target chemicals in the sample cell can be enhanced.

After propagating through the sample cell, the encoded correlation beams are collected, directed, and focused by post-encoded optic 36B.FP.1.2 onto detector 26.FP.1, and the signal generated by 26.FP.1 in response to the encoded beams is analyzed by computer 28.FP.1 to determine the amplitudes of the encoded components. The amplitudes of the encoded components are subsequently used by application specific algorithm 28.FP.1.asf(e.g., correlation radiometry algorithm) to determine the presence and concentrations of one or more target chemicals in the sample. If one or more sample cell is probed, multiple detectors and ADCs can be used as described previously (e.g., see Example 9). In this manner, multiple samples can be probed substantially simultaneously.

The path of a given encoded beam through the system (including the sample or correlation cell) is actually a superposition of the paths from all optical ray traces which begin at source 24.FP.1, reflect from the active area of the corresponding radiation filter on modulator 22.FP.1, and reach detector 26.FP.1. As a consequence, the superposition of paths changes as the pattern of the radiation filter within the active area changes as modulator 22.FP.1 rotates. In the presence of absorbing analytes (samples or targets) where the attenuation of the beam depends of the path length, the variation in the superposition of the paths can lead to a waveform distortion of an encoded component. In the present invention, these effects can be minimized by reducing the number of abrupt discontinuities along one or more axes in the pattern of the radiation filters. Preferably, at least one of the radiation filters of modulator 22.FP.1 comprises the "bar-code" or "checker-board" like patterns described above to provide one or more encoded components with a substantially constant superposition of optical paths through the system.

In reference to FIG. 9A. for analyzer 100.FP.1 described above, the position of the array of correlation sub-images, the position of the array of target and reference cells, the position of the sample cell(s), and/or other optical elements, can be controlled to align target image 52.FP.1 onto modulator 22, and align the encoded correlation beams to pass through the sample cell(s) onto the detector. Preferably, source 24.FP.1 includes a number of alignment spatial components and modulator 22 includes a number of alignment channels to provide input to the alignment calibration algorithm 28.utl (ACA).FP.1, which in turn, generates one or more control signals to position one or more optical elements (e.g., a common structure onto which the array target and reference cells are mounted) to align target image 52.FP.1 onto modulator 22.

In the preceding example, the order of the optical elements was chosen for illustrative purposes and is not intended to limit the scope of the invention. For example, the position of the target and reference cell array with respect to the encoder is arbitrary. The radiation transmitted through the correlation cells can be encoded or the radiation can be encoded and then transmitted through the correlation cells. In addition, the sample (e.g., sample 38 38 shown as a dashed line box in FIG. 1A) can be placed anywhere between source 24.FP.1 and detector 26.FP.1 in the beam path. These and other variations are within the scope of the invention.

While the invention has been described above by reference to various embodiments, it will be understood that different combinations, changes and modifications may be made without departing from the scope of the invention which is to be defined only by the appended claims and their equivalents. Thus, instead of using the specific optical elements in the specific order as described, including the placement of a sample cell, or sample collection in the beam path, other optical elements, optical systems, or arrangements may be used without departing from the scope of the invention. For example, the pre-encoder optic 36A used in FIG. 1 to form a dispersed image, could be a focusing grating, a plane grating and focusing mirror or lens, a grating pair, prism pair or prism-grating combination, a grating pair, prism pair or prism-grating combination and a focusing mirror or lens, a prism and focusing mirror or lens, and the pre-encoder optic 36A used in FIG. 1 to form an extended image can include a simple focusing mirror or lens, a camera lens system, an interferometer, or a focusing mirror or lens and collection of bandpass filters or a linear variable filter. In addition, various light pipes, waveguides and optical fibers (and collections thereof) can be used to bring the input radiation from or direct the encoded signal to a number of remote sampling stations. When considering analyzer systems that measure radiation emitted or scattered by a sample or collection of samples in response to excitation radiation, the position of the encoder before the sample or after the sample is somewhat arbitrary. In the first case, the excitation radiation is directly encoded, and the response radiation is (subsequently or indirectly) encoded. In the latter case the response radiation is directly encoded. For a sufficiently fast and linear excitation response, the response radiation is encoded exactly the same in either case.

Where the modulator 22 of FIG. 1A and the modulators of the various other embodiments in the other figures are designed to be rotated about axis 40 to encode corresponding radiation components, the filters on the modulators occupy annular regions of the disk as shown in the various figures of this application. This invention, however, is not limited to such implementation. Instead of annular regions, the filters, such as filters 50a, 50d may form four linear rows on the surface of the modulator, and the modulator may be reciprocated linearly along a direction substantially parallel to the rows of filters, or rotated as a drum. The target image 52 is then projected in a direction with its length transverse (preferably perpendicular) to the direction of the rows of filters so that the image overlaps preferably all four rows of the filters. Such and other variations are within the scope of the invention.

Where the radiation filters and filter pairs of analyzer 100 of FIG. 1A are described having a continuum or three or more distinct levels of contrast, the various embodiments and examples described above can be embodied using binary modulation encoding, albeit with substantially lower performance. Such and other variations are within the scope of the invention.

The numerous embodiments of the invention should be considered as design strategies that can be used in various combinations to facilitate a given spectroscopy or imaging application. In particular, modulator patterns comprising various combinations of radiation filters and filter pairs shown in this document are within the scope of the invention.

What is claimed is:

1. A two dimensional spatial radiation modulator adapted to be rotated about a rotation axis to modulate at least one component of an incident radiation beam to encode said beam, said modulator comprising:

a substrate and at least one annular region substantially encompassing a plurality of non-contiguous sub-regions having optical characteristics substantially different from said substrate, said annular region comprising at least two annular segments, each said segment comprising a fractional rotation period of said modulator, said sub-regions in a first annular segment being patterned to form at least one pair of radiation filters located at different radii from said rotation axis and having substantially complementary modulation functions, said pair producing in response to the beam a first encoded component with a characteristic determined by the relative intensities of radiation from the beam incident on the at least one pair of filters;

said sub-regions in a second annular segment being patterned to form at least one radiation filter that produces in response to the beam a second encoded component with a characteristic determined by the total intensity of radiation from the beam incident on said at least one radiation filter.

2. The modulator of claim 1, wherein said characteristic of the first encoded component comprises a signal magnitude and phase and said characteristic of the second encoded component comprises a signal magnitude and phase.

3. The modulator of claim 1, wherein at least one of said annular segments subtends an angle of about 180 degrees to the rotation axis.

* * * * *